(12) United States Patent
Ohishi et al.

(10) Patent No.: US 6,801,247 B1
(45) Date of Patent: Oct. 5, 2004

(54) VIBRATION REDUCTION DEVICE AND VIBRATION DETECTING DEVICE AND MICRO SIGNAL PROCESSING DEVICE FOR USE IN VIBRATION REDUCTION DEVICE

(75) Inventors: Sueyuki Ohishi, Tokyo (JP); Fumiya Taguchi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 08/989,762

(22) Filed: Dec. 12, 1997

(30) Foreign Application Priority Data

| Dec. 12, 1996 | (JP) | ............................................. 8-331848 |
| Dec. 12, 1996 | (JP) | ............................................. 8-331856 |
| Apr. 11, 1997 | (JP) | ............................................. 9-093479 |
| Jun. 25, 1997 | (JP) | ............................................. 9-168273 |
| Sep. 24, 1997 | (JP) | ............................................. 9-258857 |

(51) Int. Cl.[7] ............................................. H04N 5/228
(52) U.S. Cl. ................................................ 348/208.1
(58) Field of Search .......................... 348/208; 396/52, 396/53, 55; 327/72, 73, 560, 561, 563; 330/9

(56) References Cited

U.S. PATENT DOCUMENTS 5,473,374 A * 12/1995 Shimizu et al. ............. 348/363
5,617,176 A * 4/1997 Matsuzawa et al. .......... 396/55

OTHER PUBLICATIONS

Unofficial translation—JP 08–082820.*
English abstract of JP 08–082820.
English abstract of JP 07–218953.
English abstract of JP 02–183217.

* cited by examiner

Primary Examiner—Wendy R. Garber
Assistant Examiner—Rashawn N. Tillery
(74) Attorney, Agent, or Firm—Staas & Halsey LLP

(57) ABSTRACT

A vibration detecting device for detecting vibration in a camera, a video movie camera or the like, a vibration reduction device and a micro signal processing circuit. The vibration detecting device comprises a vibration detector for detecting a vibration to output a vibration detecting signal, a calculator for performing a predetermined operation based on the vibration detecting signal, and a controller for determining whether or not an operation output signal of the calculator exceeds a predetermined range. The controller is provided with an operation signal generator for generating an operation signal when the operation output signal exceeds the predetermined range, and the calculator is provided with an initializing portion for returning the operation output signal into the predetermined range based on the operation signal. In the vibration detecting circuit, a DC offset component can be suppressed.

36 Claims, 32 Drawing Sheets

| ELAPSED TIME t (MULTIPLE OF TIME CONSTANT τ) τ=25.5ms (max42.5ms) | VOLTAGE ACROSS CONDENSER (RATIO TO STATIONARY VALUE) [%] | VOLTAGE OBTAINED BY MULTIPLYING VOLTAGE DIFFERENCE AGAINST STATIONARY VALUE BY GAIN/ CORRESPONDING ANGULAR VELOCITY [V] |
|---|---|---|
| 5τ (127.5ms) (212max) | 99.326 | 3.37 |
| 6τ (153.0ms) (255max) | 99.752 | 1.24 |
| 7τ (178.5ms) (298max) | 99.908 | 0.460 (460mV) →4.60deg/sec |
| 8τ (204.0ms) (340max) | 99.966 | 0.168 (168mV) →1.68deg/sec |
| 9τ (229.5ms) (383max) | 99.987 | 0.0620 (62.0mV) →0.620deg/sec |
| 10τ (255.0ms) (425max) | 99.995 | 0.0227 (22.7mV) →0.227deg/sec |

VIBRATION REDUCTION DEVICE AND VIBRATION DETECTING DEVICE AND MICRO SIGNAL PROCESSING DEVICE FOR USE IN VIBRATION REDUCTION DEVICE

The entire disclosure of Japanese Patent Application Nos. 8-331848, 8-331856, 9-093479, 9-168273, 9-258857 including specifications, claims, drawings and summaries is incorporated herein by reference in their entirety.

BACKGROUND OF THE INVENTION

1. Field of the Invention

The present invention relates to a vibration detecting device for detecting vibration in a camera or an image pickup device for a video movie or the like, and a vibration reduction device for compensating the vibration. The invention also relates to a micro signal processing circuit which can be used in a vibration detecting circuit.

2. Related Background Art

For example, as a prior-art vibration detecting device known is a device which detects acceleration or angular velocity occurring in an apparatus by using an acceleration sensor, an angular velocity sensor or the like. In general, because the acceleration sensor or the angular velocity sensor itself outputs only a slight voltage in relation to a given vibration, an appropriate amplifier is provided outside the sensor for emitting a necessary voltage.

However, the vibration detecting sensor, especially a vibration sensing gyroscope of piezoelectric type generally used in a camera or the like outputs a remarkably unstable output for several tens to hundreds of milliseconds immediately after power turns on, and generates a low-frequency output drift even after the power turns on. Also, a voltage under the state in which no vibration is given (hereinafter, referred to as a stationary output voltage) is not always constant, and remarkably much varied with variation among vibration sensing gyroscopes or change in operational environment, especially with operation temperature. Such variation in output when power turns on is considerably large as compared with a level of an output signal for the vibration to be originally detected in accordance with the acceleration or the angular velocity, and in some case excessively large.

As a vibration detecting device in which an influence of the variation in output when power turns on is minimized, for example, a vibration detecting circuit disclosed in a publication of Japanese Patent Application Laid-Open No. 7-218953 is heretofore known. The vibration detecting circuit is constituted of an angular velocity sensor, a high pass filter for cutting an output of a tolerably low frequency relative to a frequency of a vibration to be detected from an output of the angular velocity sensor and an amplifying portion for amplifying a signal passed through the high pass filter.

FIG. 20 is a circuit diagram showing a vibration detecting circuit in the prior-art vibration detecting device. A vibration sensing gyroscope 1 detects an angular velocity caused by vibration in the device with a piezoelectric element. A circuit 2 is a three-dimensional low pass filter circuit for removing high-frequency components from an output of the vibration sensing gyroscope 1. In a circuit 3, a capacitor C4 and a resistor R4 constitute a high pass filter for removing low-frequency components which are not caused by the vibration, and an operational amplifier OP2 and resistors R6 and R7 constitute an amplifying circuit which amplifies an output signal of the circuit 2 in a non-inverting manner. The cut-off frequency which is a low frequency to be determined by the capacitor C4 and the resistor R4, needs to be sufficiently low relative to the frequency of the vibration to be detected, so that the cut-off frequency has no influence on the vibration which occurs in the apparatus. For the purpose, a numeric value of the cut-off frequency is, for example, set to about 0.1 Hz.

A switch SW1 is an analog switch which shifts the cut-off frequency to a high frequency when it is on and which is maintained on for a predetermined time after power is turned on so as to minimize an influence exerted on an output signal Vout by the variation in output when the power supply to the vibration sensing gyroscope 1 is started. When the switch SW1 is turned off, the low frequency of the cut-off frequency is determined by the capacitor C4 and the resistor R4. A power circuit 4 supplies a stable power to the vibration sensing gyroscope 1 and the circuits 2 and 3. In one chip computer (hereinafter, referred to as the MCU) 5, the output signal Vout from the circuit 3 is digitized by a built-in A/D converter 5a, the vibration occurring in the apparatus is detected, and also an operation of the power circuit 4 is controlled in accordance with a control signal PC of a control signal generator 5d. Further, in the MCU 5 the turning on/off of the analog switch SW1 is controlled in accordance with an operation signal SSW of an operation signal generator 5b.

Also, in each of vibration detecting devices disclosed in publications of Japanese Patent Application Laid-Open Nos. 7-253604 and 8-82820, an output of a vibration sensing gyroscope and a reference voltage are differentially amplified by a differential amplifying portion, and a vibration occurring in the apparatus is detected from the output. An influence of an output drift of the vibration sensing gyroscope when power turns on and an influence of variations in stationary output voltage among individual vibration sensing gyroscopes are eliminated by controlling the output differentiated/amplified by changing the reference voltage within a dynamic range of the output.

However, the prior-art vibration detecting device has a first problem with the dynamic range of the vibration to be detected and a detecting resolution.

For example, when an angular velocity of a vibration is detected in a camera which uses a silver salt (or silver halide) film and has a function of reducing the vibration, at the time of usually shooting, a stationary object, a maximum value of the vibration angular velocity is approximately 20° to 30° per second though it varies depending on the individual users. On the other hand, when the camera pans, flows or picks up an object moving at a high speed, a very large angular velocity occurs as compared with in the case of shooting the stationary object. For example, the angular velocity exceeding 50° per second occurs. When considering even the angular velocity which may occur at the time of shooting the object other than the stationary object, the dynamic range of the angular velocity up to 50° per second or more needs to be secured.

In the camera having the vibration reducing function and using the silver salt film, a video movie or the like, as shown in FIG. 20, the detected output signal Vout is quantized to a digital value by using the A/D converter 5a, and the vibration reduction is usually performed based on the quantized vibration signal. In this case, since a quantization unit of the A/D converter 5a is finite, the resolution per bit of quantization needs to be increased by setting large an amplification factor for amplifying the output of the vibration sensing gyroscope 1. For the purpose, to enhance a ratio (S/N) of the signal to be detected with a noise included in the output of the operational amplifier OP2, a gain of the amplifying circuit constituted of the operational amplifier OP2, the resistors R6 and R7 and the like needs to be set large. However, since the output range of the operational amplifier OP2 is limited, the dynamic range of the angular velocity that can be detected is decreased when the resolution per bit of quantization is enhanced. In this manner, when priority is given to the dynamic range of the vibration to be detected, the resolution per bit of quantization or the ratio S/N is deteriorated. On the other hand, when priority is given to the resolution per bit of quantization or S/N, the dynamic range of vibration which can be detected is disadvantageously narrowed.

Secondly, a problem is caused by a time constant of the high pass filter.

The cut-off frequency of the high pass filter constituting the vibration detecting device has to be set sufficiently low relative to the frequency bandwidth of the vibration to be detected. For example, when the camera using the silver salt film or the video movie is used, the dominant frequency bandwidth of the vibration is said to be about 1 Hz to 15 Hz. In this case, the cut-off frequency of the high pass filter which is determined by the capacitor C4 and the resistor R4 should be suppressed low, for example, around 0.1 Hz. Therefore, the time constant determined by the capacitor C4 and the resistor R4 becomes very large. As a result, it takes so much time as cannot be ignored until the output signal Vout is stabilized. In the vibration detecting device described in the publication of Japanese Patent Application Laid-Open No. 7-218953, the output of the vibration sensing gyroscope 1 behaves unstably when power turns on. For this, in the vibration detecting device, to secure the stability of the output signal Vout, when power is turned on, the analog switch SW1 shown in FIG. 20 is turned on for a predetermined period of time.

FIG. 21 is a timing chart when power turns on in the prior-art vibration detecting device.

At a time t0, by setting high the control signal PC as shown in FIG. 21, the power supply circuit 4 is operated, thereby supplying power to the vibration sensing gyroscope 1 and the circuits 2 and 3 via a power line Vdd. During a period of time from t1 to t2, by setting high the operation signal SSW, the influence of a large variation in output when power turns on in the vibration sensing gyroscope 1 is suppressed by the turning-on of the analog switch SW1. A signal detected by the vibration sensing gyroscope 1 after setting low the operation signal SSW at a time t2 is amplified by the amplifier constituted of the operational amplifying portion OP2 and the like, and a signal which substantially represents the vibration applied to the apparatus is outputted as the output signal Vout.

For example, when the vibration shown in FIG. 21 (the angular velocity vibration in a form of sinusoidal wave) is applied to the apparatus and at the time t2 the analog switch SW1 is turned off, then the output signal Vout starts to be outputted with its angular velocity at the time t2 being substantially 0V. Namely, the output signal Vout does not have a wave form in which Vout assumes zero (0V) when the angular velocity is zero, but, as shown in FIG. 21, a waveform which is shifted upward. In other words, a signal which is obtained by offsetting the vibration angular velocity applied to the vibration sensing gyroscope 1 by a certain error is outputted. The error (hereinafter, referred to as the offset error) does not have a constant value, and varies with an elapse of time. The time constant is determined by the capacitor C4 and the resistor R4, and the center of the amplitude of the output signal Vout approaches 0V. For this, when the apparatus is used with the vibration applied thereto, due to the time constant determined by the capacitor C4 and the resistor R4, a vibration detecting error occurs in the output signal Vout. As a result, to detect a precise angular velocity, it needs to take time from when power turns on until the offset error is reduced to a tolerable quantity. The time elapsed until the offset error can be ignored was intolerably large in a field to which the vibration detecting device is applied, especially in the camera using the silver salt film.

In the publication of Japanese Patent Application Laid-Open No. 7-218953, to reduce the offset error, substantially at the center of the amplitude of the output signal Vout, the analog switch SW1 is again turned on from time t3 to t4, thereby reducing the amplitude to a vicinity of 0V (zero volt). However, since this countermeasure for reducing the offset error is not effective for all the amplitude waveforms, and the offset error surely occurs.

Also, in the vibration detecting device proposed by the publications of Japanese Patent Application Laid-Open Nos. 7-253604 and 8-82820, since the reference voltage and the output of the vibration sensing gyroscope are differentially amplified, the change in reference voltage is amplified by the differential amplifier. The amplification factor of the differential amplifier is usually set in such a manner that a micro output of the vibration sensing gyroscope is amplified to provide a necessary vibration detecting resolution. Therefore, a micro change in reference voltage is amplified at the amplification factor and outputted. Also, in the vibration detecting device proposed in the publication of Japanese Patent Application Laid-Open No. 7-253604, to suppress the influence of the output drift of the vibration sensing gyroscope when power turns on and the influence of the variations in stationary output voltage among the vibration sensing gyroscopes, the reference voltage is changed to adjust and the differentially amplified output within its output dynamic range. As a result, the resolution for changing the reference voltage as a nicked quantity in changing the reference voltage needs to be high to some degree. The circuit related to the reference voltage is difficult to design, which increases the cost.

Another prior-art vibration reduction device is disclosed, for example, in a publication of Japanese Patent Application Laid-Open No. 2-183217. In the vibration reduction device, a vibration which occurs in a camera or a video camera is detected by an angular velocity sensor or another sensor, and a vibration reduction lens is moved in a direction reverse to the direction of the vibration detected by the sensor to compensate the vibration.

An example of a camera provided with a vibration reduction device is described with reference to FIG. 26.

FIG. 26 is a block diagram showing a general constitution of a camera provided with a vibration reduction device.

A camera body 101 is provided with a battery 103 for supplying power to the camera body 101 and a lens barrel 102, a camera body DC/DC converter 104, a camera body CPU 105 for executing a main control of the camera body, a main switch 112 for turning on a camera power, a half-stroke switch 111 which turns on in a first stroke (half-pressed condition) of a release button, a full-stroke switch 110 which turns on in a second stroke (full-pressed condition) of the release button, an operation switch 100 and a power-supply control switch 130 as a semiconductor switch and the like.

The lens barrel 102 is provided with a lens barrel CPU 119 for executing a main control of the lens barrel, a lens barrel DC/DC converter 120, two-bit selection switches 131 and 132 for selecting a vibration reduction control mode, vibration detectors 113 and 114 for detecting the vibration and emitting an output signal in accordance with a quantity of the vibration, a first lens group 125, a second lens group 126, a third lens group (hereinafter, the vibration reduction lens) 127 for being driven in a direction vertical or substantially vertical to an optical axis to compensate the vibration, a stop blade 128, motors 123 and 124 for driving the vibration reduction lens 127, control circuits 121 and 122 for driving and controlling the motors 123 and 124, respectively, and the like.

In the prior-art vibration reduction device, the vibration of a image surface formed on a plane is decomposed into components of mutually orthogonal X and Y axes, and a vibration reduction mechanism portion is operated along respective axial directions to nullify the direction of the vibration. For this, since the two motors 123 and 124 are necessary as drive sources for driving the vibration reduction lens 127 along two axes, there are provided two vibration detectors 113 and 114 and two control circuits 121 and 122. The vibration detector 113 is now described.

FIG. 27 is a block diagram showing an example of the vibration detecting circuit in the prior-art vibration reduction device.

The vibration detector 113 shown in FIG. 26 is, as shown in FIG. 27, provided with a vibration detecting circuit constituted of an angular velocity sensor (vibration sensing gyroscope 201), a low pass filter (hereinafter, referred to as the LPF) 202 connected to the angular velocity sensor 201, a high pass filter (referred to as the HPF) 203 connected to the LPF 202, an amplifier (AMP) 204 connected to the HPF 203 and an A/D converter 205 connected to the AMP 204.

The angular velocity sensor 201 detects a vibrating condition as the angular velocity, and outputs an output signal based on the angular velocity. The output signal is transmitted to the next LPF 202.

The LPF 202 is a filter which blocks a high-frequency component of the output signal of the angular velocity sensor 201. The signal having its high-frequency component cut off is transmitted to the next HPF 203.

The HPF 203 is a filter for blocking a low-frequency component of the signal whose high-frequency component has been blocked by the LPF 202. The signal having its low-frequency component cut off is transmitted to the next amplifier 204.

The amplifier 204 amplifies the signal whose low-frequency component has been blocked by the HPF 203, and the amplified signal is transmitted to the next A/D converter 205.

The A/D converter 205 converts the analog signal whose low-frequency component is blocked by the HPF 203 into a digital signal and outputs the digital signal.

In the aforementioned sequence of analog signal processing circuit, the signal indicative of the frequency of the vibration in the camera or the like is processed. Therefore, the frequency of the processed signal ranges from several herz to decades of herz.

The analog-processed data has a dimension of angular velocity. Therefore, when based on the data the vibration reduction lens 127 is operated, a reference value of the angular velocity (detecting device output reference value) $\omega 0$ (hereinafter, referred to as omega zero) needs to be calculated. By calculating the omega zero, at the time of panning at a constant speed, its condition different from the vibrating condition can be reflected in the compensating operation. The vibration reduction lens 127 is operated in accordance with a compensation quantity which is proportional to a difference between the omega zero and the processed data of the detected angular velocity. The omega zero is calculated from an equation: $\omega 0 = (1/T)\Sigma\omega(t)$. This is obtained by averaging the sum of angular velocities $\omega(t)$ at respective times from 0 to T with the time T. The ideal angular velocity data used in the equation is the data which is detected when the output of the angular velocity sensor 201 is stabilized and the camera is determined not to be in the vibrating condition. Also, the longer the time (detecting time) T for averaging is, the more stable the data is.

The camera body 101 and the lens barrel 102 are, as shown in FIG. 26, electrically interconnected by electric contacts 115, 116, 117 and 118. The electric contact 115 is a contact for supplying power from the battery 103 via the power-supply control switch 130 to the lens barrel 102. The electric contact 116 electrically supplies the output of the camera body DC/DC converter 104 to the lens barrel 102. The electric contact 117 is for communication between the camera body CPU 105 and the lens barrel CPU 119. The electric contact 118 connects a ground (GND) line to a cathode terminal of the battery 103.

An operation of the prior-art vibration reduction device is now described.

When the main switch 112 and then the half-stroke switch 111 are turned on, an L-level signal is transmitted to associated terminals of the camera body CPU 105. Subsequently, when the full-stroke switch 110 is turned on, the L-level signal is transmitted to an associated terminal of the camera body CPU 105. When the half-stroke switch 111 is turned on, the camera body CPU 105 activates and controls the camera body DC/DC converter 104, thereby supplying power via the electric contact 116 to the lens barrel CPU 119.

The lens barrel CPU 119 transmits a power-supply request signal via the electric contact 117 to the camera body CPU 105. The camera body CPU 105 turns on the power-supply control switch 130, and the battery 103 supplies power via the electric contact 115 to the lens barrel DC/DC converter 120. Also, the lens barrel CPU 119 receives the power supply from the electric contact 116 to activate the lens barrel DC/DC converter 120. The lens barrel DC/DC converter 120 supplies power to the control circuits 121 and 122 and the motors 123 and 124.

When the setting switch 132 is turned on, an L-level signal is transmitted to a terminal D1 of the lens barrel CPU 119. When the setting switch 131 is turned on, the L-level signal is transmitted to a terminal D2 of the lens barrel CPU 119. On the other hand, when the setting switch 132 is turned off, the terminal D1 of the lens barrel CPU 119 has an H level, while when the setting switch 131 is turned off, the terminal D2 of the lens barrel CPU 119 has an H level.

When the terminal D1 has an L level and the terminal D2 has an H level, for the vibration reduction control mode a mode in which compensating operation is performed only during exposure is selected. When the terminal D1 has an H level and the terminal D2 has an L level, for the vibration reduction control mode a mode in which the compensating operation is performed during and except the exposure time period is selected. When the terminal D1 has an H level and the terminal D2 has an H level, for the vibration reduction control mode a mode in which no vibration reduction operation is performed is selected.

The vibration detectors 113 and 114 analog-process the output signal indicative of the quantity of detected vibration, and transmits the processed signal to the lens barrel CPU 119. When the mode for performing the compensating operation during and except the exposure time period is selected as the vibration reduction control mode and the half-stroke switch 111 is turned on, then the lens barrel CPU 119 calculates a drive quantity of the vibration reduction lens 127 based on the analog-processed data.

The vibration detectors 113 and 114 output the output signal indicative of the quantity of detected vibration from when power is supplied. The lens barrel CPU 119 starts detecting omega zero from when the vibration detectors 113 and 114 output the output signal. The time necessary for detecting omega zero is about two seconds when there is a sufficient detecting time. However, when shooting immediately after power turns on, even two seconds cannot be secured. In this case, omega zero is detected as long as possible. When a user shoots, the lens barrel CPU 119 calculates a compensation quantity based on the data of omega zero which have been detected just before the shooting. Based on the compensation quantity, the motors 123 and 124 are feedback-controlled.

Based on the computed compensation quantity, the lens barrel CPU 119 instructs the control circuits 121 and 122 to drive the motors 123 and 124. The rotary movement of the motors 123 and 124 is converted to a linear movement, thereby driving the vibration reduction lens 127.

Additionally, when the mode for performing the compensating operation only during the exposure is selected as the vibration reduction control mode and the full-stroke switch 110 is turned on, then the vibration reduction lens 127 is driven only during the exposure.

FIG. 28 is a circuit diagram showing an example of the vibration detecting circuit in the prior-art vibration reduction device.

The vibration detecting circuit shown in FIG. 28 is provided with a first step of a three-dimensional LPF (DC-coupled) 10 constituted of capacitors C111, C112 and C113, resistors R111, R112 and R113 and an operational amplifier OP111, a second step of a first-dimensional HPF (AC-coupled) 20 constituted of a capacitor C121 and a resistor R121, and a third step of a 100-times amplifier 30 constituted of a capacitor C131, a resistor R131 and an operational amplifier OP131.

In FIG. 28, in the first step of the LPF 10, an input angular velocity signal has its high-frequency component cut off, and a signal phase in a pass band is delayed at the same time. Since the phase delay causes an error in the vibration reduction control, the phase delay is desirably close to zero. For this, the cut-off frequency of the LPF 10 is set to a degree to which the phase delay can be ignored, for example, to about 300 Hz. The signal whose high-frequency component has been cut off is transmitted to the second step of HPF 20.

FIG. 29 is a block diagram showing another example of the vibration detecting circuit in the prior-art vibration reduction device.

An output signal indicative of a vibration quantity outputted from an angular velocity sensor 201 originally includes a low-frequency signal (a drift component over a long period of time), and its minimum detecting amplitude is small. If the output signal outputted from the angular velocity sensor 201 is multiplied by the gain in the amplifier 204 without any signal processing, a component of an output signal from the amplifier 204 is saturated by a low-frequency component and cannot be used. To block the low-frequency component, as shown in FIG. 28, the HPF 20 having a cut-off frequency of, for example, about 0.6 Hz is used. In this manner, in the circuit constitution shown in FIG. 28, the signal whose low-frequency and high-frequency components have been cut off is amplified in the third step of the amplifier 30. The amplifier 30 constitutes a non-inverting amplifying circuit and multiplies a 101-times gain.

In the processing of the output signal outputted from the angular velocity sensor 201 in the circuit constitution shown in FIG. 28, when an excessively large input signal is applied to the amplifier 30, the signal multiplied by the gain in the amplifier 30 is outputted from the amplifier 30.

FIG. 30 schematically shows a condition in which the output voltage of the angular velocity sensor exceeds its dynamic range.

The dynamic range of the output voltage indicative of the vibration quantity emitted from the angular velocity sensor 201 is limited by the power source voltage and the circuit constitution of the output step. Therefore, as shown by an arrow P in FIG. 30, in some case at the time of panning or other manipulation of the camera, the output voltage from the amplifier 30 exceeds its dynamic range (shown by a broken line), and is saturated. If the saturated condition is let as it is, the output voltage approaches a reference point without limitation in a manner which accords with the time constant of the circuit because of the characteristics of the HPF (AC-coupled) 20. However, since the time constant of the HPF 20 is of the order of several seconds, a considerable time is necessary until the output voltage from the amplifier 30 reaches the reference point. Immediately after an excessively large vibration occurs, a usual vibration reduction cannot be performed. To avoid this problem, in the vibration detecting circuit shown in FIG. 28, the time constant of the HPF 20 is shortened by an analog switch SW141.

FIG. 31 diagrammatically shows a condition in which the output voltage of the angular velocity sensor is returned to within the dynamic range.

When the output voltage outputted from the angular velocity sensor 201 is saturated and the analog switch SW141 is turned on, then as shown in FIG. 31, the output voltage from the amplifier 30 can be returned to the reference point in a short time T (about 20 ms).

FIG. 32 is a circuit diagram showing another example of the vibration detecting circuit in the prior-art vibration reduction device.

The vibration detecting circuit shown in FIG. 32 is provided with a first-step inverting amplifier 60 which is constituted of a capacitor C261, a resistor R261 and an operational amplifier OP261, also serves as an LPF and which cuts a direct current, a second step of a reverse amplifier 70 which is constituted of a capacitor C271, resistors R271, R272 and R273 and an operational amplifier OP271 and also serves as an LPF, an HPF 50 which is constituted of a capacitor C251 and a resistor R251 and blocks a direct current, and the like.

In the vibration detecting circuit shown in FIG. 32, since a portion interconnected with the resistor which is multiplied by the gain of the input of the operational amplifier OP261 is insulated by the capacitor C251 in a direct current manner, an offset adjustment is unnecessary. In this circuit arrangement, the offset output of the operational amplifier OP261 in the first step is not multiplied by the gain of the first-step inverting amplifier 60. When the gain of the first step is sufficiently large and the gain of the next step is lowered, then an output of offset voltage is naturally small.

The time constant of the HPF 50 is determined by the resistor R251 and the capacitor C251, and the resistor R251 has a function of setting the gain together with the resistor R261.

In the prior-art vibration detecting circuit shown in FIG. 28, when the input offset voltage has an influence on the operational amplifier OP131 of the final step between the HPF 20 and the amplifier 30, the offset voltage is multiplied by the gain in the operational amplifier OP131 and outputted. Also, when the input bias current has an influence on the operational amplifier OP131 in the final step, by turning on and off the analog switch SW141, the balance in bias current between a plus terminal and a minus terminal of the operational amplifier OP131 is changed. The change in balance of the bias current causes a change in voltage, which is outputted as an output of the operational amplifier OP131. To prevent the output from being saturated, in the vibration detecting circuit shown in FIG. 28, the offset adjustment is made by a variable resistor R144, but the cost of the offset adjustment cannot be ignored.

Also, in the prior-art vibration detecting circuit shown in FIG. 32, when the gain of the inverting amplifier 70 associated with the offset is reduced, the gain needs to be increased in the inverting amplifier 60 of the first step. As a result, the capacity of the capacitor C251 for setting the time constant of the HPF 50 is accordingly increased. When the capacity of the capacitor C251 is increased and the output voltage is saturated, a converging time is lengthened when analog switches SW261 and SW281 are turned on.

FIG. 40 is a table showing voltages and corresponding angular velocities when a voltage difference against a stationary value at an elapsed time t is multiplied by the gain (100 times) when a step voltage of E=5V is transmitted to the HPF 50 at a time 0.

For example, to suppress a variation voltage in amplifier output to 168 mV (1.68 deg/sec) or less, a time during which the analog switch SW81 is turned on needs to be 340 ms at maximum.

The aforementioned vibration detecting circuit shown in FIG. 29 is constituted of the angular velocity sensor 201 for detecting the vibrating condition as an angular velocity and emitting an output signal in accordance with the angular velocity, the AMP 204 for receiving an output signal of the angular velocity sensor 201 and amplifying the output signal, the LPF 202 for receiving an output signal of the AMP 204 and blocking a high-frequency component in the output signal and the A/D converter 205 for receiving an output signal of the LPF 202, converting the output signal from an analog signal to a digital signal and emitting the converted signal.

Since the vibration detecting circuit shown in FIG. 29 is not provided with an HPF, a low-frequency component can be processed as information. However, because no HPF is disposed in the vibration detecting circuit, an error caused by a DC offset component of the circuit itself is amplified. Also, the output signal indicative of the vibration quantity from the angular velocity sensor 201 includes a low-frequency signal (drift component over a long period of time). As shown in FIG. 29, if the output signal of the angular velocity sensor 201 is multiplied by the gain as it is in the amplifier 204, the output signal of the amplifier 204 is saturated by the low-frequency component and cannot be used. For this reason, the vibration detecting circuit is difficult to use for detecting the vibration.

In a camera electronic circuit, since a battery constitutes a power supply, a power voltage in a processing circuit or the like usually tends to be reduced to save power. Generally, in a commercial operational amplifier, an input common-mode voltage range is narrowed when the power voltage is low. Also, in some range of input voltage, a transistor inside the operational amplifier does not operate. When the vibration detecting circuit shown in FIG. 29 is constituted of the commercial operational amplifier, the range of the input voltage is predetermined by its standard. Therefore, the vibration detecting circuit needs to be constituted in such a manner that processing can be performed in the predetermined standard range.

Usually in the operational amplifier, to increase its stability and enlarge its band by applying a negative feedback, an output signal is fed back to an inverting (−) input terminal. In this case, since an imaginary short is established, the inverting input terminal and a non-inverting (+) input terminal are operated to keep the same electric potential. In the vibration detecting circuit shown in FIG. 29, when the operational amplifier is used in a non-inverting input format, the input signal as well as the input voltage are changed on the inverting input terminal and the non-inverting input terminal. If the input signal to the operational amplifier is dispersed, there is a possibility that a signal exceeding its standard range is inputted, even when the operational amplifier is intended to operate within the standard range. Especially, the angular velocity sensor for detecting the vibration (piezoelectric vibration sensing gyroscope) 201 has a large dispersion in output voltage relative to the reference voltage. For this reason, when an output voltage exceeding the input voltage range of the operational amplifier is applied, in the operational amplifier having some performance the input common-mode voltage range is probably exceeded. As a result, the selection of the operational amplifier is limited, thereby increasing the cost.

SUMMARY OF THE INVENTION

An object of an aspect of the invention is to provide a vibration detecting circuit which can firstly ensure a dynamic range while enhancing a detecting resolution as high as possible, secondly reduce an offset error caused by a time constant of a high pass filter and which can thirdly facilitate a circuit design of a reference voltage and reduce its cost.

To attain the object, a first mode of the invention provides a vibration detecting device which includes a vibration detector for detecting a vibration and outputting a vibration detecting signal, a calculator for performing a predetermined operation based on the vibration detecting signal and a controller for determining whether or not an operation output signal of the calculator exceeds a predetermined range. The controller is provided with an operation signal generator for generating an operation signal when the operation output signal exceeds the predetermined range. The calculator is provided with an initializing portion for returning the operation output signal back to the predetermined range based on the operation signal.

According to a second mode of the invention, in the vibration detecting device of the first mode, the controller is provided with a compensating portion for compensating the operation output signal based on the operation output signal before and after being returned by the calculator.

According to a third mode of the invention, the vibration detecting device of the first or second mode is further provided with a high pass filter for removing a low-frequency component from the vibration detecting signal. The initializing portion is provided with an amplifying portion for amplifying an output of the high pass filter.

According to a fourth mode of the invention, the vibration detecting device of the first or second mode includes a low pass filter for removing a high-frequency component from the vibration detecting signal and a high pass filter for removing a low-frequency component from an output of the low pass filter. The initializing portion is provided with an amplifying portion for amplifying an output of the high pass filter.

A fifth mode of the invention provides a vibration detecting device which includes a vibration detector for detecting a vibration and outputting a vibration detecting signal, an output signal generator for generating an output signal, a calculator for performing a predetermined operation based on the vibration detecting signal and the output signal to generate an operation output signal, a controller for controlling the output signal generator based on the operation output signal and an operation signal generator for generating an operation signal for controlling the output signal generator. The output signal generator is provided with an output signal level variable portion which can vary a level of the output signal based on the operation signal.

According to a sixth mode of the invention, in the vibration detecting device of the fifth mode, the controller determines whether or not the operation output signal exceeds a predetermined range and, when the operation output signal exceeds the predetermined range, makes the operation signal generator generate the operation signal to adjust in such a manner that the operation output signal is in the predetermined range.

According to a seventh mode of the invention, in the vibration detecting device of the sixth mode, the controller is provided with a compensating portion for compensating the operation output signal based on the operation output signal before and after being adjusted.

According to an eighth mode of the invention, in the vibration detecting device of the fifth mode, the controller determines whether or not the operation output signal exceeds a predetermined range, the operation signal generator generates the operation signal when the operation output signal exceeds the predetermined range, the output signal level variable portion varies the level of the output signal by a predetermined level based on the operation signal, and the controller adjusts the operation output signal in the predetermined range.

According to a ninth mode of the invention, in the vibration detecting device of the eighth mode, the controller is provided with a compensating portion for compensating the operation output signal based on the operation output signal before and after being adjusted and the predetermined level.

According to a tenth mode of the invention, in the vibration detecting device of the eighth mode, the controller is provided with a compensating portion for compensating the operation output signal based on the operation output signal before and after being adjusted.

According to an eleventh mode of the invention, in the vibration detecting device of the fifth mode, the controller determines whether or not the operation output signal is deviated from a predetermined reference level, the operation signal generator generates the operation signal when the operation output signal is deviated from the predetermined reference level, and the controller adjusts the operation output signal to the predetermined reference level or its vicinity.

According to a twelfth mode of the invention, the vibration detecting device of the fifth mode is provided with a power supply portion for supplying a power at least to the vibration detector. The controller makes the operation signal generator generate the operation signal when the power supply portion starts supplying the power to the vibration detector, and adjusts the operation output signal of the calculator to a predetermined reference level or its vicinity.

A thirteenth mode of the invention provides a vibration detecting device which includes a vibration detector for detecting a vibration and emitting a vibration detecting signal, an output signal generator for generating at least first and second output signals, a calculator for performing a predetermined operation based on the first output signal and/or the second output signal and the vibration detecting signal to generate an operation output signal, a controller for controlling the output signal generator based on the operation output signal and an operation signal generator for generating an operation signal for controlling the output signal generator. The output signal generator is provided with an output signal level variable portion which varies a level of the first output signal and/or the second output signal based on the operation signal.

According to a fourteenth mode of the invention, in the vibration detecting device of the thirteenth mode, the output signal generator is provided with at least first and second output signal generators, the operation signal generator generates first and second operation signals for controlling the first and second output signal generators, and the output signal level variable portion is provided with a first output signal level variable portion which can vary a level of the first output signal based on the first operation signal and a second output signal level variable portion which can vary a level of the second output signal based on the second operation signal.

According to a fifteenth mode of the invention, in the vibration detecting device of the thirteenth or fourteenth mode, the controller determines whether or not the operation output signal exceeds a predetermined range, and when the operation output signal exceeds the predetermined range, makes the operation signal generator generate the operation signal so as to vary a level of the first output signal and/or the second output signal to adjust the operation output signal in the predetermined range.

According to a sixteenth mode of the invention, in the vibration detecting device of the thirteenth or fourteenth mode, the controller is provided with a compensating portion for compensating the operation output signal based on the operation output signal before and after being adjusted.

According to a seventeenth mode of the invention, in the vibration detecting device of the thirteenth or fourteenth mode, the controller determines whether or not the operation output signal exceeds a predetermined range, the operation signal generator generates the operation signal when the operation output signal exceeds the predetermined range, the output signal level variable portion varies the level of the first output signal and/or the second output signal based on the operation signal by a predetermined level, and the controller adjusts the operation output signal in the predetermined range.

According to an eighteenth mode of the invention, in the vibration detecting device of the seventeenth mode, the controller is provided with a compensating portion for compensating the operation output signal based on the operation output signal before or after being adjusted and the predetermined level.

According to a nineteenth mode of the invention, in the vibration detecting device of the seventeenth mode, the controller is provided with a compensating portion for compensating the operation output signal based on the operation output signal before and after being adjusted.

According to a twentieth mode of the invention, in the vibration detecting device of the thirteenth or fourteenth mode, the operation signal generator generates the operation signal at predetermined timing, and the controller adjusts the operation output signal to a predetermined reference level or its vicinity.

According to a twenty-first mode of the invention, the vibration detecting device of the thirteenth or fourteenth mode is provided with a power supply portion for supplying a power at least to the vibration detector. The predetermined timing is a timing corresponding to a time when the power supply portion starts supplying the power to the vibration detector.

According to a twenty-second mode of the invention, in the vibration detecting device of the twentieth or twenty-first mode, the controller coarsely adjusts the operation output signal to the predetermined reference level or its vicinity based on the first output signal, and finely adjusts the operation output signal to the predetermined reference level or its vicinity based on the second output signal.

According to a twenty-third mode of the invention, the vibration detecting device of either one of the fifth to twenty-second modes is provided with a low pass filter for removing a high-frequency component from the vibration detecting signal. The calculator is provided with an amplifying portion for amplifying an output of the low pass filter and an output signal of the output signal generator.

According to a twenty-fourth mode of the invention, in the vibration detecting device of either one of the fifth to twenty-third modes, the operation signal generator generates a digital signal, and the output signal generator is provided with a D/A converter for outputting an analog signal based on the digital signal.

According to a twenty-fifth mode of the invention, in the vibration detecting device of either one of the fifth to twenty-fourth modes, the calculator is provided with an adder for adding the output signal of the output signal generator and the vibration detecting signal.

According to a twenty-sixth mode of the invention, in the vibration detecting device of either one of the fifth to twenty-fourth modes, the calculator is provided with an adding amplifier performing an addition of the output signal of the output signal generator and the vibration detecting signal and amplifying the added signal.

According to a twenty-seventh mode of the invention, the vibration detecting device of either one of the fifth to twenty-fourth modes is provided with a low pass filter for removing a high-frequency component from the vibration detecting signal. The calculator is provided with an adding amplifier for performing an addition of an output signal of the low pass filter and the output signal of the output signal generator and amplifying the added signal.

According to a twenty-eighth mode of the invention, in the vibration detecting device of either one of the fifth to twenty-fourth modes, the calculator is provided with a subtracter for subtracting the output signal of the output signal generator and the vibration detecting signal.

According to a twenty-ninth mode of the invention, in the vibration detecting device of either one of the fifth to twenty-fourth modes, the calculator is provided with a subtracting amplifier for performing a subtraction of the output signal of the output signal generator and the vibration detecting signal and an amplification.

According to a thirtieth mode of the invention, the vibration detecting device of either one of the fifth to twenty-fourth modes is provided with a low pass filter for removing a high-frequency component from the vibration detecting signal. The calculator is provided with a subtracting amplifier for performing subtraction of an output signal of the low pass filter and the output signal of the output signal generator and an amplification.

An object of another aspect of the invention is to provide a vibration reduction device which can first minimize without making an offset adjustment an offset component multiplied by a gain and emitted at a final step of a processing circuit when a vibration detecting signal is processed in the processing circuit and which can secondly quickly converge an output voltage to an amplifying reference voltage before the output voltage is saturated.

To attain the object, a thirty-first mode of the invention provides a vibration reduction device which includes a vibration reduction optical system for compensating a vibration by driving at least a portion of a photographing optical system in a direction vertical to an optical axis, a drive portion for driving the vibration reduction optical system, a vibration detector for detecting the vibration and emitting an output voltage corresponding to a vibration quantity and a controller for driving and controlling the drive portion. The vibration reduction device is provided with a DC voltage generator for generating a DC voltage and a calculator for performing a predetermined operation based on the output voltage of the vibration detector and the DC voltage to emit an output signal. The controller is provided with an operation signal generator for generating an operation signal when the output signal is not in a predetermined range. The DC voltage generator generates the DC voltage based on the operation signal, and the calculator adjusts the output signal in the predetermined range based on the output voltage of the vibration detector and the DC voltage. According to the invention of the thirty-first mode, when the output signal of the calculator is not in the predetermined range, the controller makes the DC voltage generator generate the DC voltage, and the calculator performs the arithmetic operation based on the DC voltage and the output voltage of the vibration detector, so that the output voltage of the vibration detector is in the predetermined range. Therefore, the offset component can be minimized without making the offset adjustment, while the output voltage of the vibration detector can be quickly converged to the vicinity of the reference voltage.

According to a thirty-second mode of the invention, in the vibration reduction device of the thirty-first mode, the predetermined range does not exceed a dynamic range of the output signal of the calculator. According to the invention of the thirty-second mode, the predetermined range does not exceed the dynamic range. Therefore, when an excessively large vibration is transmitted to the vibration detector, the signal can be captured in the dynamic range before the output voltage exceeds the dynamic range, and the output signal can be quickly converged to the vicinity of the reference voltage.

According to a thirty-third mode of the invention, in the vibration reduction device of the thirty-first or thirty-second mode, the vibration detector, the calculator and the controller are DC-coupled. According to the invention of the thirty-third mode, since the vibration detector, the calculator and the controller are DC-coupled, the vibration detecting signal included in the low-frequency component can be effectively used.

According to a thirty-fourth mode of the invention, in the vibration reduction device of either one of the thirty-first to thirty-third modes, the DC voltage generator is provided with a DC voltage value variable portion for varying a DC voltage value based on the operation signal. According to the invention of the thirty-fourth mode, since the DC voltage generator is provided with the DC voltage value variable portion which can vary the DC voltage value, the output signal can be in a predetermined range based on the DC voltage which can be varied to an optional voltage value and the vibration detecting signal.

According to a thirty-fifth mode of the invention, in the vibration reduction device of the thirty-fourth mode, the controller is provided with a pulse width modulating portion for generating an operation signal, and the DC voltage value variable portion is provided with a switch for operating in accordance with the operation signal. According to the invention of the thirty-fifth mode, since the controller is provided with the pulse width modulating portion for generating the operation signal and the DC voltage value variable portion is provided with the switch for operating in accordance with the operation signal, the DC voltage generated by the DC voltage generator can be varied to an optional voltage value by the switch which operates in response to the operation signal.

According to a thirty-sixth mode of the invention, in the vibration reduction device of either one of the thirty-first to thirty-third modes, the controller is provided with a pulse width modulating portion for generating an operation signal, and the DC voltage generator is provided with a switching portion for operating based on the operation signal and switching an output voltage of a DC voltage source and a low pass filter for smoothing a switched rectangular wave. According to the invention of the thirty-sixth mode, the DC voltage generator is provided with the switching portion for operating based on the operation signal and switching the output voltage of the DC voltage source and the low pass filter for smoothing the switched rectangular wave, the DC voltage generated by the DC voltage generator is set to an effective voltage value and can be changed to a smoothed DC voltage.

According to a thirty-seventh mode of the invention, in the vibration reduction device of either one of the thirty-fourth to thirty-sixth modes, the operation signal generator generates the operation signal before the output signal exceeds the dynamic range, and the DC voltage value variable portion, the switching portion and the switch can vary the DC voltage value in accordance with a duty ratio between an ON time and an OFF time of the operation signal. According to the invention of the thirty-seventh mode, since the DC voltage value variable portion, the switching portion and the switch can vary the DC voltage value in accordance with the duty ratio between the ON time and the OFF time of the operation signal, the effective voltage value of the DC voltage generated by the DC voltage generator can be set to an optional voltage value.

An object of further aspect of the invention is to provide a micro signal processing circuit and a vibration detecting circuit which can process largely dispersed micro signals without being limited by an input common-mode voltage range of an amplifying portion and which have a little number of components and are advantage in mounting.

To attain this object, a thirty-eighth mode of the invention provides a micro signal processing circuit which includes a low pass filter portion having an inverting input terminal for receiving a micro signal and a non-inverting input terminal with a reference potential applied thereto for removing a high-frequency component from the micro signal and an amplifying portion to which an output signal of the low pass filter is inputted. The invention of the thirty-eighth mode includes the low pass filter portion having the inverting input terminal for receiving the micro signal and the non-inverting input terminal with the reference potential applied thereto for removing the high-frequency component from the micro signal and the amplifying portion to which the output signal of the low pass filter is inputted. Therefore, a formed circuit is not limited by the input common mode voltage range of the amplifying portion.

A thirty-ninth mode of the invention provides a micro signal processing circuit which includes an amplifying portion having an inverting input terminal for receiving a micro signal and a non-inverting input terminal with a reference potential applied thereto and a low pass filter portion for receiving an output signal of the amplifying portion and removing a high-frequency component from the micro signal. The invention of the thirty-ninth mode includes the amplifying portion having the inverting input terminal for receiving the micro signal and the non-inverting input terminal with the reference potential applied thereto and the low pass filter portion for receiving the output signal of the amplifying portion and removing the high-frequency component from the micro signal. Therefore, a formed circuit can be limited by the input common mode voltage range of the amplifying portion.

A fortieth mode of the invention provides a micro signal processing circuit which comprises an output signal generator for generating an output signal, a calculator having an inverting input terminal for receiving a micro signal and a non-inverting input terminal with a reference potential applied thereto for performing a predetermined operation based on the micro signal and the output signal of the output signal generator, a low pass filter portion for removing a high-frequency component from the output signal of the calculator, an amplifying portion for receiving an output signal of the low pass filter portion and an operation signal generator for generating an operation signal when an output signal of the amplifying portion is not in a predetermined range. Based on the micro signal and the output signal of the output signal generator, the output signal of the amplifying portion is adjusted in the predetermined range. According to the invention of the fortieth mode, the calculator has the inverting input terminal for receiving the micro signal and the non-inverting input terminal with the reference potential applied thereto to perform the predetermined operation based on the micro signal and the output signal of the output signal generator. The low pass filter portion removes the high-frequency component from the output signal of the calculator. The output signal of the low pass filter portion is transmitted to the amplifying portion. The operation signal generator generates the operation signal when the output signal of the amplifying portion is not in the predetermined range. Based on the micro signal and the output signal of the output signal generator, the output signal of the amplifying portion is adjusted in the predetermined range. Therefore, a formed circuit is not limited by the input common mode voltage range of the amplifying portion. Also, the offset component can be minimized, while the output signal of the amplifying portion can be quickly converged to the vicinity of the reference potential.

According to a forty-first mode of the invention, in the micro signal processing circuit of the fortieth mode, the calculator, the low pass filter portion and the amplifying portion are constituted by a single common operational amplifier. According to the invention of the forty-first mode, since the calculator, the low pass filter portion and the amplifying portion are constituted of the common operational amplifier, the number of components can be reduced. A formed circuit is advantageous in mounting.

A forty-second mode of the invention provides a vibration detecting circuit which includes a vibration detector for detecting a vibration and emitting a vibration detecting signal, a low pass filter portion having an inverting input terminal for receiving the vibration detecting signal and a non-inverting input terminal with a reference potential applied thereto for removing a high-frequency component from the vibration detecting signal and an amplifying portion for receiving an output signal of the low pass filter portion. The invention of the forty-second mode includes the vibration detector for detecting the vibration and emitting the vibration detecting signal, the low pass filter portion having the inverting input terminal for receiving the vibration detecting signal and the non-inverting input terminal with the reference potential applied thereto for removing the high-frequency component from the vibration detecting signal and the amplifying portion for receiving the output signal of the low pass filter portion. Therefore, a formed circuit is not limited by the input common mode voltage range of the amplifying portion.

A forty-third mode of the invention provides a vibration detecting circuit which includes a vibration detector for detecting a vibration and emitting a vibration detecting signal, an amplifying portion having an inverting input terminal for receiving the vibration detecting signal and a non-inverting input terminal with a reference potential applied thereto and a low pass filter portion for receiving an output signal of the amplifying portion and removing a high-frequency component from the vibration detecting signal. The invention of the forty-third mode includes the vibration detector for detecting the vibration and emitting the vibration detecting signal, the amplifying portion having the inverting input terminal for receiving the vibration detecting signal and the non-inverting input terminal with the reference potential applied thereto and the low pass filter portion for receiving the output signal of the amplifying portion and removing the high-frequency component from the vibration detecting signal. Therefore, a formed circuit is not limited by the input common mode voltage range of the amplifying portion.

A forty-fourth mode of the invention provides a vibration detecting circuit which includes a vibration detector for detecting a vibration and emitting a vibration detecting signal, an output signal generator for generating an output signal, a calculator having an inverting input terminal for receiving the vibration detecting signal and a non-inverting input terminal with a reference potential applied thereto for performing a predetermined operation based on the vibration detecting signal and the output signal of the output signal generator, a low pass filter portion for removing a high-frequency component from an output signal of the calculator, an amplifying portion for receiving an output signal of the low pass filter portion and an operation signal generator for generating an operation signal when an output signal of the amplifying portion is not in a predetermined range. Based on the vibration detecting signal and the output signal of the output signal generator, the output signal of the amplifying portion is adjusted in the predetermined range. According to the invention of the forty-fourth mode, the calculator has the inverting input terminal to which the vibration detecting signal is transmitted and the non-inverting input terminal to which the reference potential is applied, and performs the predetermined operation based on the vibration detecting signal and the output signal of the output signal generator. The low pass filter portion removes the high-frequency component from the output signal of the calculator. The output signal of the low pass filter portion is transmitted to the amplifying portion. The operation signal generator generates the operation signal when the output signal of the amplifying portion is not in the predetermined range. Based on the vibration detecting signal and the output signal of the output signal generator, the output signal of the amplifying portion is adjusted in the predetermined range. Therefore, a formed circuit is not limited by the input common mode voltage range of the amplifying portion. Also, the offset component can be minimized, while the output signal of the amplifying portion can be quickly converged to the vicinity of the reference potential.

According to a forty-fifth mode of the invention, in the vibration detecting circuit of the forty-fourth mode, the calculator, the low pass filter portion and the amplifying portion are constituted by a single common operational amplifier. According to the invention of the forty-fifth mode, since the calculator, the low pass filter portion and the amplifying portion are constituted of the common operational amplifier, the number of components can be reduced. A formed circuit is advantageous in mounting.

According to a forty-sixth mode of the invention, in the vibration detecting circuit of the forty-fifth mode, when the vibration is decomposed to n axial components, n units of the vibration detectors are provided for detecting the vibrations along respective axial directions, and the operational amplifier is provided for each axis corresponding to the vibration detector. According to the invention of the forty-sixth mode, when the vibration is decomposed to n axial components, to detect the vibration along each axial direction, n units of the vibration detectors are provided, and corresponding to the vibration detectors the operational amplifier is provided for each axis. Therefore, the number of the operational amplifiers can be reduced, and a mounting space can be secured.

BRIEF DESCRIPTION OF THE DRAWINGS

FIG. 40 is a table showing a voltage which is obtained by multiplying a voltage difference at an elapsed time t against a stationary value by a gain (100) under the condition that at time 0 a step voltage of E=5V is transmitted to an HPF.

DETAILED DESCRIPTION OF THE PREFERRED EMBODIMENTS

First Embodiment

Figure 1:
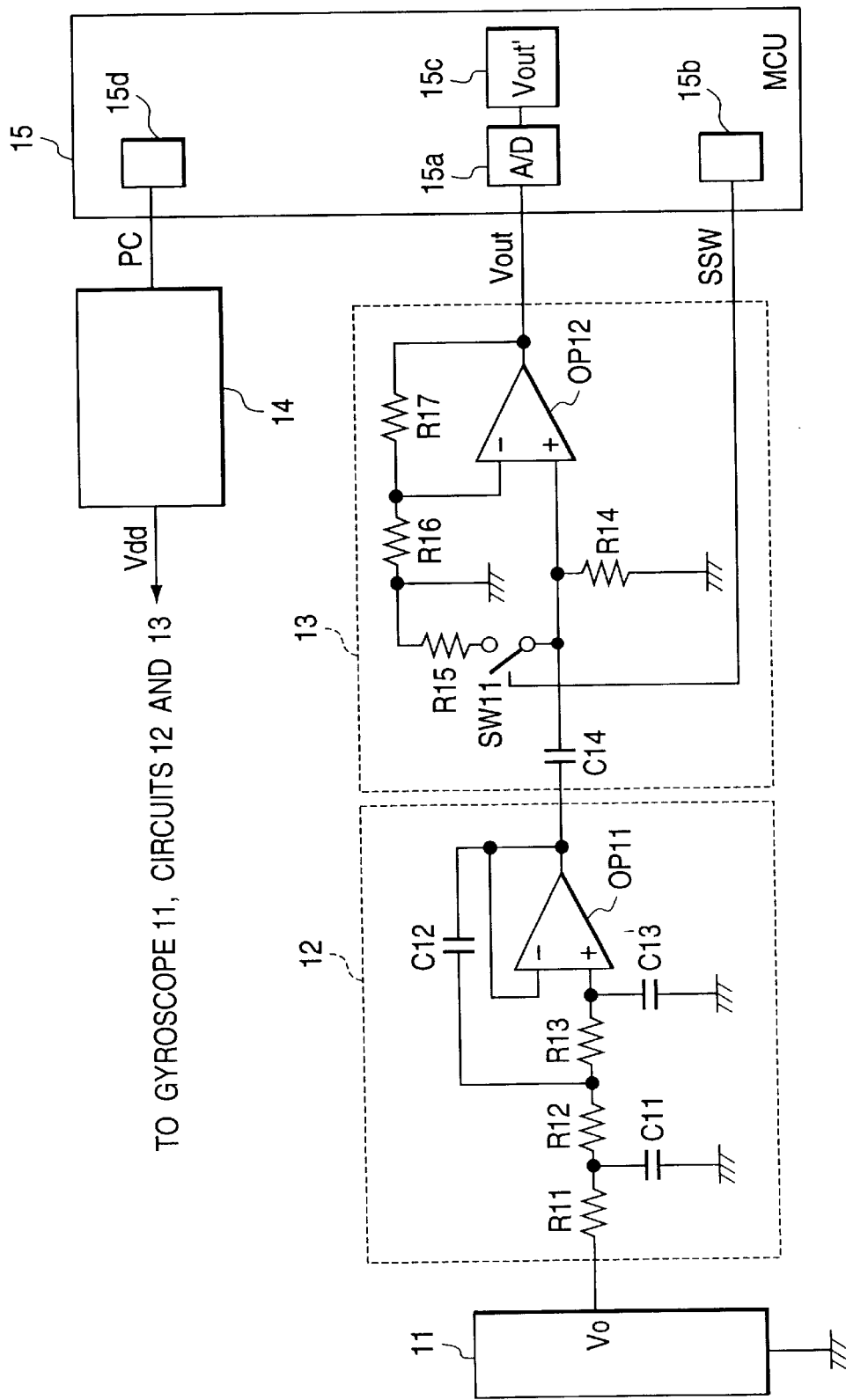
FIG. 1 is a circuit diagram showing a vibration detecting circuit in a vibration detecting device according to a first embodiment of the invention.

A first embodiment of the invention is now described with reference to the drawings.

In the following, the same circuits as those shown in FIG. 20 and described in the prior art are denoted with corresponding reference numerals or characters, and the detailed description thereof is omitted.

FIG. 1 shows a vibration detecting circuit in a vibration detecting device according to the first embodiment.

Figure 20:
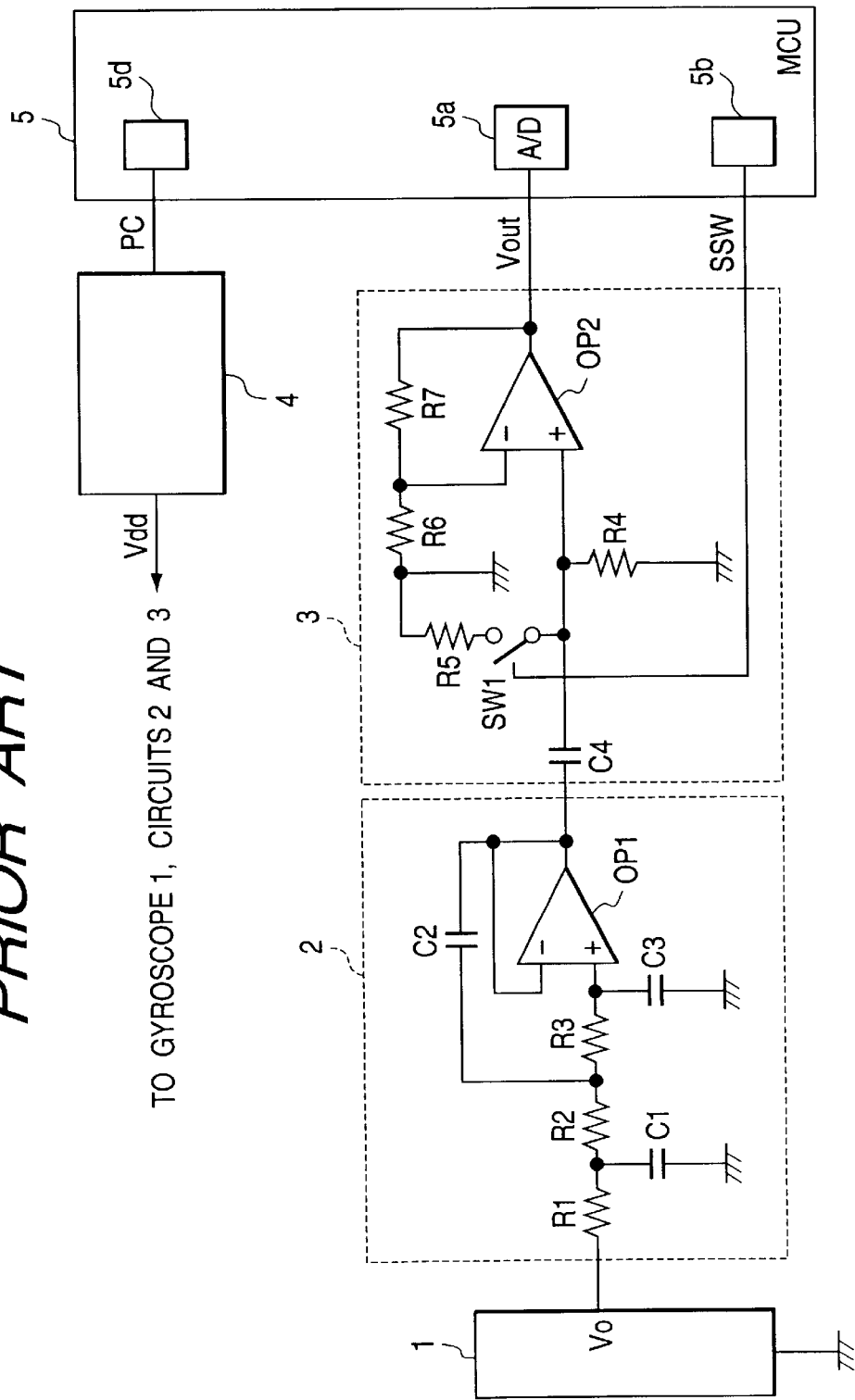
FIG. 20 is a circuit diagram showing a vibration detecting circuit in a prior-art vibration detecting device.
Figure 21:
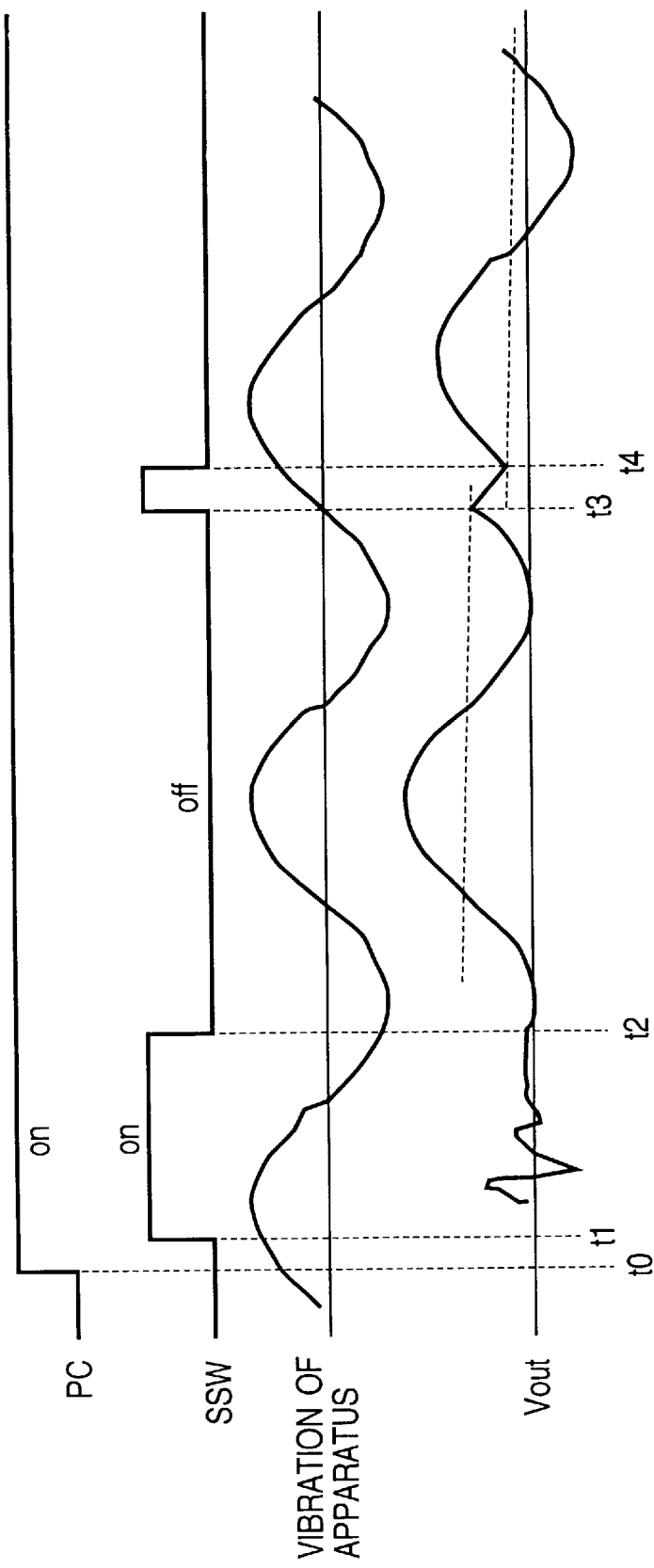
FIG. 21 is a timing chart when power is turned on in the vibration detecting circuit in the prior-art vibration detecting device.

The vibration detecting circuit according to the first embodiment of the invention is the same in general circuit arrangement as the prior-art vibration detecting circuit shown in FIG. 20. In the first embodiment of the invention, an MCU 15 determines whether or not an operation output signal Vout from an amplifying circuit 13 is in a predetermined range. The MCU 15 is provided with an A/D converter 15*a* for digitizing the operation output signal Vout, an operation signal generator 15*b* for generating an operation signal SSW, a compensating portion 15*c* for changing the operation output signal Vout to a compensated operation output signal Vout' and a control signal generator 15*d* for generating a control signal PC.

An operation of the vibration detecting device according to the first embodiment, mainly of the MCU 15 is now described.

Figure 2:
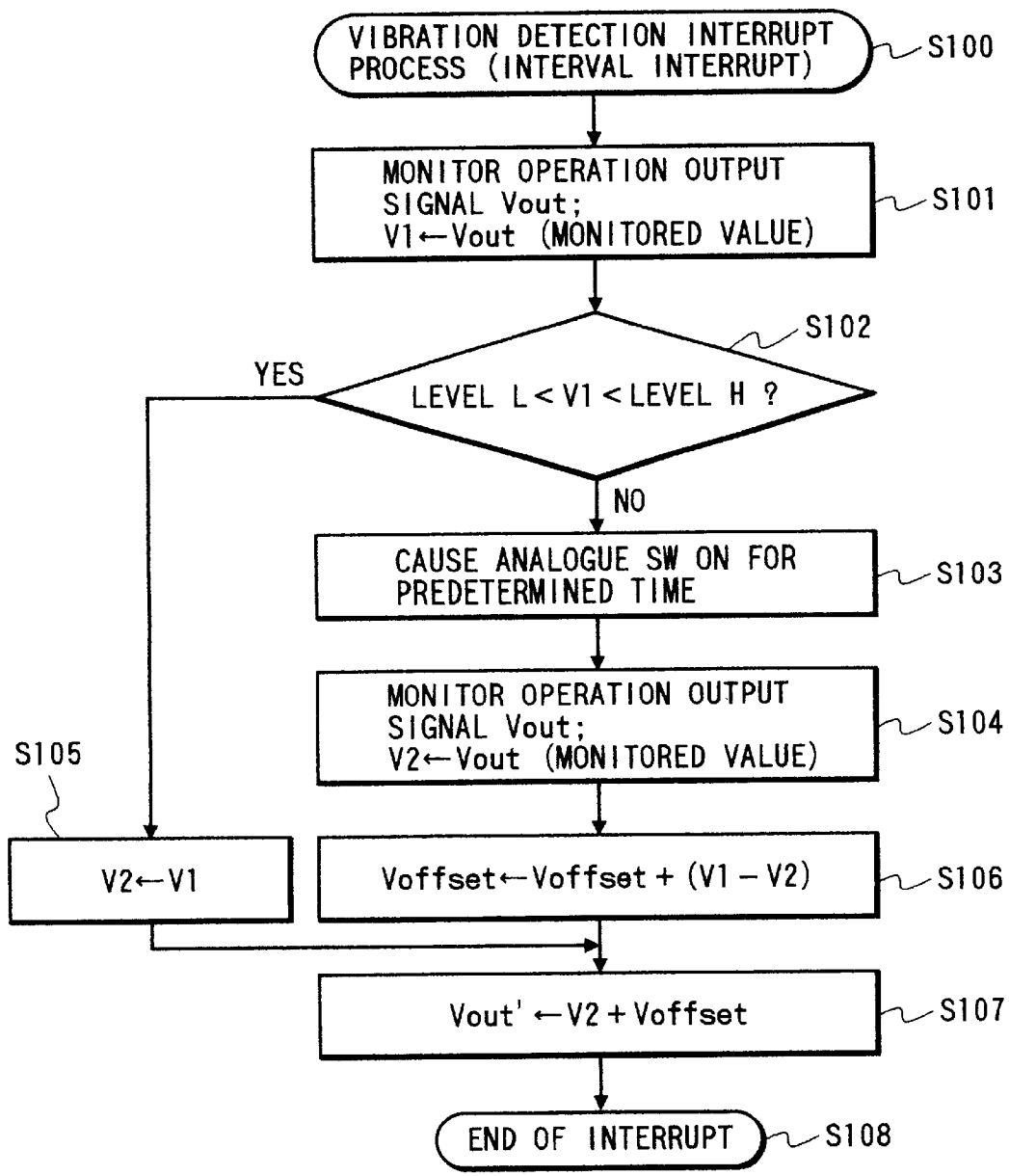
FIG. 2 is a flowchart of an operation of the vibration detecting device according to the first embodiment.
Figure 3:
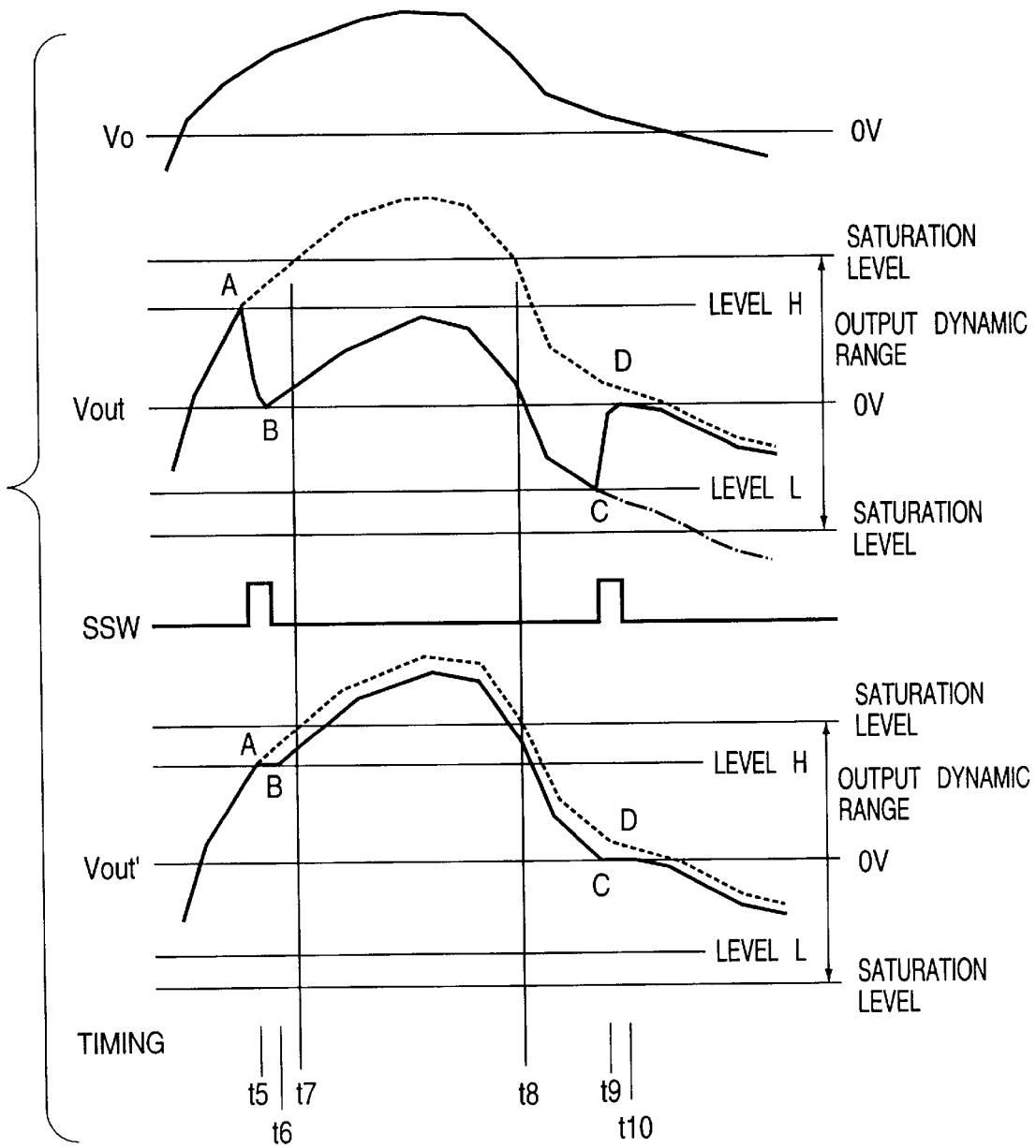
FIG. 3 is a timing chart when a vibration exceeding an output range is applied to the vibration detecting device of the first embodiment.

FIG. 2 is a flowchart showing an operation performed when a vibration exceeding an output range is applied to the vibration detecting device according to the first embodiment. FIG. 3 is a timing chart when the vibration exceeding the output range is applied to the vibration detecting device according to the first embodiment. Additionally, the operation performed when the vibration exceeding the output range is applied to the vibration detecting device shown in FIG. 2 is an extract of a program which is incorporated in the MCU 15.

At step (hereinafter, referred to as S) 100, the MCU 15 starts a vibration detection interrupt process (interval interrupt). The MCU 15 instructs the control signal generator 15d to emit the control signal PC. A power circuit 14 starts supplying power to a vibration sensing gyroscope 11 and circuits 12 and 13. When the operation output signal (output voltage) Vout is stabilized, the MCU 15 starts the vibration detection interrupt process. In the embodiment of the invention, the interval interrupt is repeated every predetermined time, for example, at an interval of 1 ms by using a timer function built therein. An offset value Voffset described later is set beforehand to an initial value of zero.

At S101, the MCU 15 monitors the operation output signal Vout and sets the output signal Vout as a monitored value V1. The MCU 15 causes the A/D converter 15a built therein to digitize the operation output signal Vout. A monitor result of the operation output signal Vout is set as the monitored value V1.

At S102, the MCU 15 determines whether or not the monitored value V1 is in a range from level L to level H. Specifically, the MCU 15 determines whether or not the monitored value V1 exceeds the range from level L to level H within the output dynamic range (non-saturated level range) of the operation output signal Vout. When the MCU 15 determines that the monitored value V1 is in the range from level L to level H, the process goes to S105. When the MCU 15 determines that the monitored value V1 is not in the range from level L to level H, the process goes to S103.

At S105, the MCU 15 sets the monitored value V1 to a monitored value V2.

At S103, the MCU 15 causes the analog switch SW11 to be on for a predetermined time. As shown in FIG. 3, at a timing t5(t9) immediately before the operation output signal Vout is saturated, (i.e. at a time when the level H which is set slightly lower than an upper saturation level is exceeded (when the level L which is set slightly higher than a lower saturation level is downwardly exceeded)), the MCU 15 instructs the operation signal generator 15b to generate the operation signal SSW. The operation signal SSW is high from the timing t5(t9) to t6(t10), and the analog switch SW11 is on from the timing t5(t9) to t6(t10). As a result, a portion of the output signal from the circuit 12 is transmitted via the analog switch SW11 and resistors R15 and R16 to a minus terminal of an operational amplifier OP12, while the operation output signal Vout is returned to 0V or its vicinity and initialized.

At step S104 the MCU 15 monitors the operation output signal Vout and sets the operation output signal Vout to the monitored value V2. The MCU 15 causes the built-in A/D converter 15a to digitize the operation output signal Vout again. The monitor result of the operation output signal Vout is set as the monitored value V2.

At S106, the MCU 15 adds the present offset value Voffset to a variation (V1–V2) between the monitored values V1 and V2, and newly sets the offset value Voffset. The MCU 15 calculates the variation in the operation output signal Vout while the analog switch SW11 is kept on. The MCU 15 monitors a voltage value A(C) of the operation output signal Vout immediately before the analog switch SW11 is turned on and a voltage value B(D) of the operation output signal Vout immediately after the analog switch SW11 is turned off. The MCU 15 calculates a voltage difference A–B(C–D) while the analog switch SW11 is kept on, and adds the variation A–B(C–D) to the present offset value Voffset to calculate a new offset value Voffset.

At S107, the MCU 15 adds the monitored value V2 to the newly calculated offset value Voffset to obtain a compensated operation output signal Vout'. The MCU 15 adds the set monitored value V2 to the offset value Voffset calculated at S106. The compensating portion 15c joints the operation output signal Vout from the timing t5(t9) to t6(t10) to obtain the compensated operation output signal Vout' as a calculation result. Subsequently, at S108 the MCU 15 ends the vibration detection interrupt process of the embodiment.

In the above description, the process performed when the operation output signal Vout lowers below the level L is described in the parentheses.

In the first embodiment of the invention, the levels L and H are set in the output dynamic range, in the vicinity of ends or limits of the range. When the operation output signal Vout exceeds the range from the level L to H, the analog switch SW11 is turned on. For this, the operation output signal Vout is returned to zero, and the MCU 15 calculates the compensated operation output signal Vout' from the monitored values of the operation output signal Vout before and after the analog switch SW11 is turned on. As a result, even when the vibration far exceeding the output dynamic range is applied to the circuit 13 having a finite output dynamic range shown in FIG. 1, the vibration can be detected substantially in real time. Also, the vibration detecting resolution and the ratio S/N of the compensated operation output signal Vout' can be maintained. Further, to enlarge the dynamic range of the detectable vibration, the amplification factor of the circuit 13 shown in FIG. 1 can be raised, thereby enhancing the detecting resolution and S/N.

In the first embodiment of the invention, at the timing t5 to t6, the operation output signal Vout is returned inside (toward 0V). In this case, when a larger vibration is applied later and the upper limit of the output dynamic range is again exceeded, then the same operation as the operation from the timing t5 to t6 is repeated. As a result, the vibration several times as large as or larger than in the prior art can be detected.

In the first embodiment of the invention, as shown in FIG. 3, the variation in operation output signal Vout between the timings t5(t9) and t6(t10) produces a slight difference which corresponds to a difference between a solid line and a dotted line showing the detected compensated operation output signal Vout'. Since the capacitor C14, the resistors R14 and R15 and the analog switch SW11 can be constituted with an appropriate constant, the operation output signal Vout can make a response at high speed when the analog switch SW11 is turned on. Thereby, the interval between the timings t5(t9) and t6(t10) can be shortened. The error can be adjusted in a tolerable range in such a manner that the error can be ignored for the variation in the vibration to be detected with an elapse of time. Also, as shown in FIG. 3, at the timing t6(t10) the operation output signal Vout is returned substantially to 0V, which needs not to be precisely 0V. In the first embodiment of the invention, the MCU 15 monitors the voltage variation in the operation output signal Vout at the timings t5(t9) and t6(t10), i.e. immediately before and after the analog switch SW11 is turned on. Therefore, the precision of the compensated operation output signal Vout' to be detected is not affected.

Second Embodiment

A second embodiment of the invention is now described with reference to the drawings.

In the following, the same circuits as those described in the prior art are denoted with corresponding numerals or characters, and the detailed description thereof is omitted.

Figure 4:
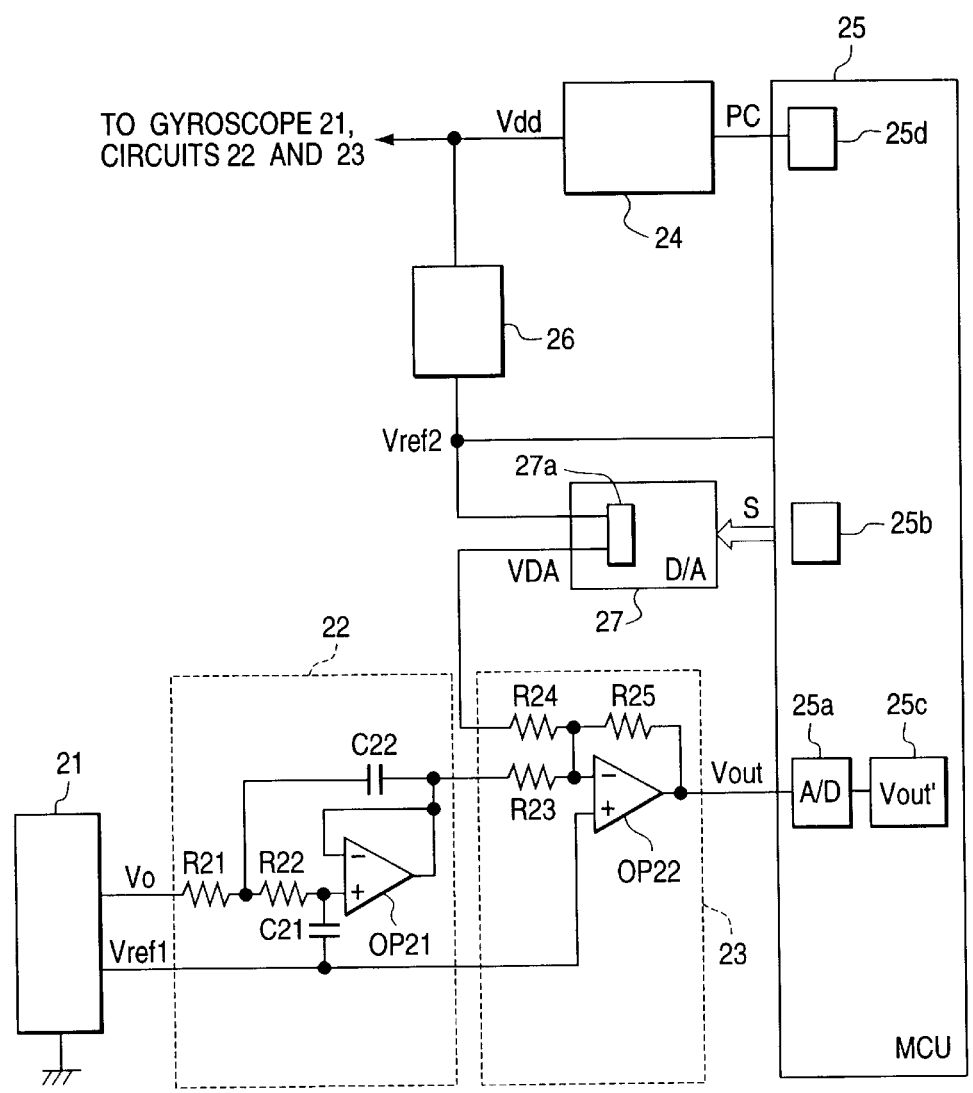
FIG. 4 is a circuit diagram showing a vibration detecting circuit in a vibration detecting device according to a second embodiment of the invention.

FIG. 4 shows a vibration detecting circuit in a vibration detecting device according to the second embodiment.

The vibration detecting circuit of the first embodiment is different from the vibration detecting circuit shown in FIG. 1 in that to more easily apply the invention to a camera or a video movie, elements of the circuit can be used with a single power supply.

A vibration sensing gyroscope 21 detects an angular velocity caused by the vibration in an apparatus by using a piezoelectric element. A stable power of about 5V is supplied from a power circuit 24 described later via a power line Vdd to the vibration sensing gyroscope 21. Also, the vibration sensing gyroscope 21 outputs as a reference voltage Vref1 a stable voltage substantially half the voltage on the power line Vdd. The reference voltage Vref1 serves as a reference potential of circuits 22 and 23 described later. The vibration sensing gyroscope 21 outputs a vibration detecting signal indicative of an applied vibration centering on the voltage which substantially has a value of the reference voltage Vref1.

The circuit 22 is constituted of resistors R21 and R22, capacitors C21 and C22 and an operational amplifier OP21, and is a secondary low pass filter circuit which removes from the vibration detecting signal Vo of the vibration sensing gyroscope 21 a high-frequency component which is not caused by the vibration.

The circuit 23 is constituted of resistors R23, R24 and R25 and an operational amplifier OP22, and is an adding amplifier circuit which adds an output signal of the circuit 22 to an output signal VDA of a D/A converter 27 described later and performs an inverting amplification with an appropriate gain. The circuit 23 transmits an output signal Vout to an MCU 25 described later. By setting values of the resistors R23, R24 and R25 appropriately, the circuit 23 can optionally set an adding ratio and gain of the output signal of the circuit 22 and the output signal VDA of the D/A converter 27. The values of the resistors R23, R24 and R25 are determined by the properties of the D/A converter 27, a necessary output dynamic range, a resolution and a sensitivity of the vibration sensing gyroscope 21. For example, when the vibration detecting signal Vo of the vibration sensing gyroscope 21 has a sufficient sensitivity and the gain does not need to be obtained from the circuit 23, then the resistance of the resistors R23, R24 and R25 is set to the same value. In this case, the circuit 23 can be operated simply as an adder.

The power circuit 24 supplies a stable power via its output power line Vdd to the vibration sensing gyroscope 21 and the circuits 22 and 23. Also, the power circuit 24 supplies as a reference power a more stable reference voltage Vref2, for example, a voltage of about 4V to 5V via the power line Vdd and a constant-voltage regulator 26 to the D/A converter 27 and an A/D converter 25a built in the MCU 25.

The D/A converter 27 outputs the output signal VDA based on an operation signal S from an operation signal generator 25b of the MCU 25. The D/A converter 27 has an output signal level variable portion 27a built therein and, outputs an optional analog voltage of 0V to Vref2 on the basis of the reference voltage Vref2.

The MCU 25 has therein the A/D converter 25a, the operation signal generator 25b, a compensating portion 25c and a control signal generator 25d, and A/D converts the operation output signal Vout of the circuit 23 on the basis of the reference voltage Vref2, while recognizing the vibration occurring in the apparatus. Also, the MCU 25 controls the operation of the power circuit 24 based on the control signal PC generated by the control signal generator 25d.

Operation mainly of the MCU 25 in the vibration detecting device according to the second embodiment is divided into a process when power supply is turned on and a process when a vibration exceeding an output range is applied, and now described.

Process Upon Turning-on of Power Supply

Figure 5:
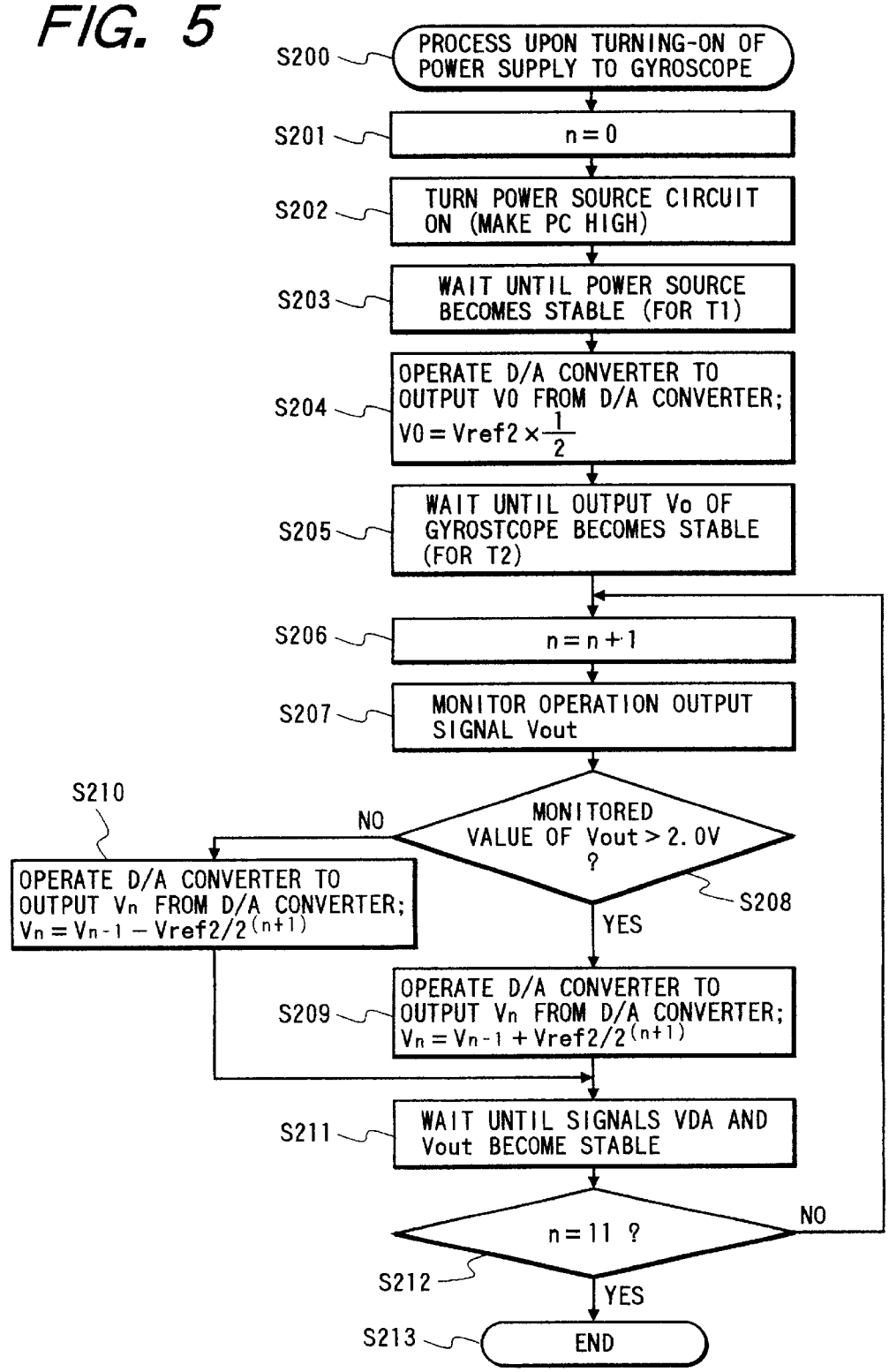
FIG. 5 is a flowchart of a process upon turning-on of power supply to the vibration detecting device of the second embodiment.
Figure 6:
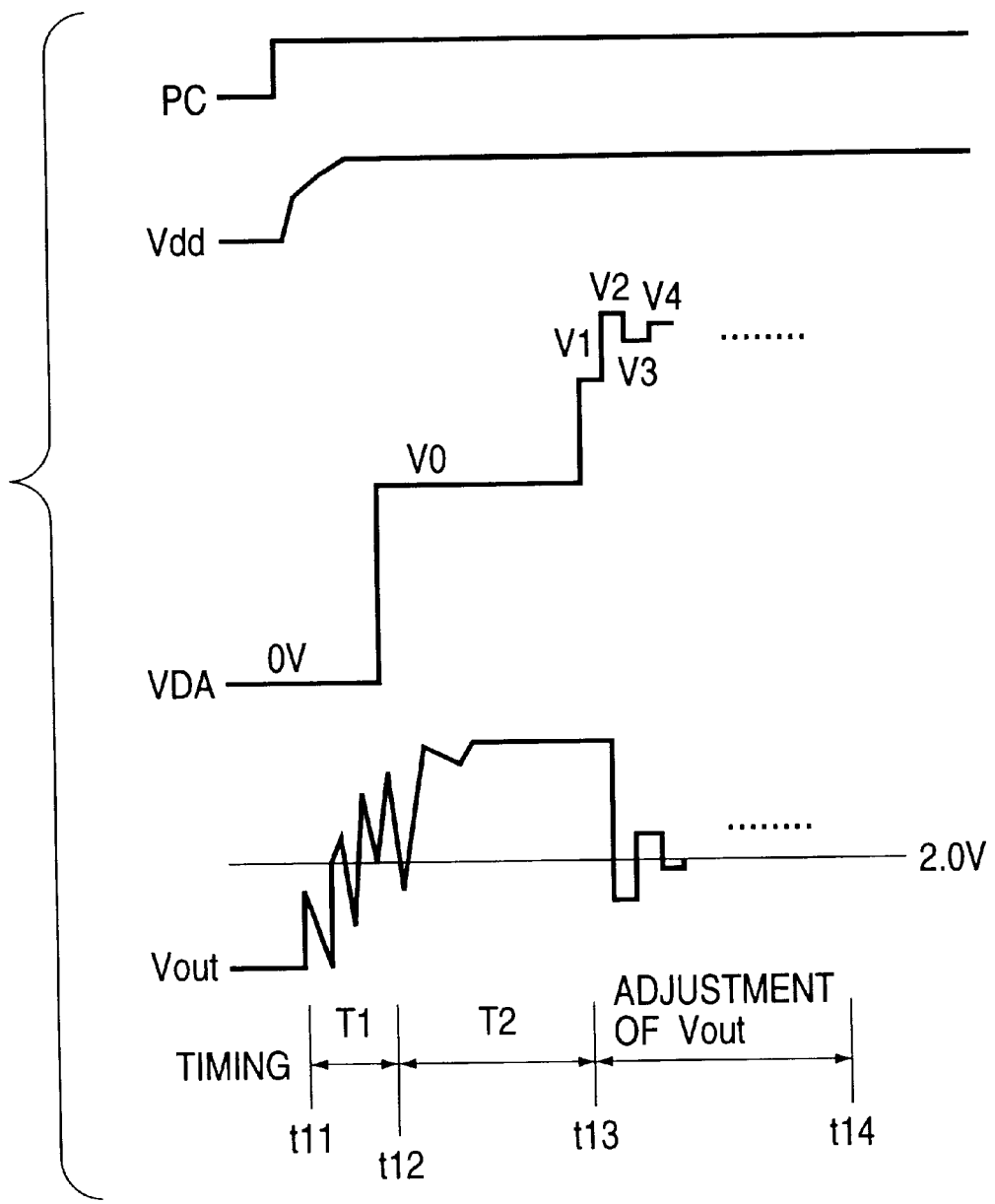
FIG. 6 is a timing chart upon turning-on of, power supply to the vibration detecting device of the second embodiment.

FIG. 5 is a flowchart of a process upon turning-on of power supply to the vibration detecting device according to the second embodiment. FIG. 6 is a timing chart when power is turned on in the vibration detecting device according to the second embodiment. The process upon turning-on of power supply to the vibration detecting device shown in FIG. 5 is an extract from a program incorporated in MCU 25. To facilitate the understanding of the description, in the second embodiment of the invention, a 12-bit type of D/A converter 27 is taken as an example and is described.

At S200, the MCU 25 starts the process upon turning-on of power supply to the vibration sensing gyroscope 21. At this time, the power circuit 24 is not operated, and the output signal VDA of the D/A converter 27 is 0V.

At S201, the MCU 25 sets a variable n to zero. The MCU 25 sets the variable n to zero which is used at S201 and subsequent steps.

At S202, the MCU 25 turns on the power circuit 24. At a timing t11, the MCU 25 instructs the control signal generator 25d to generate the signal PC, the signal PC is made high and the power circuit 24 is turned on. Subsequently, power is supplied via the power line Vdd to the vibration sensing gyroscope 21, the circuits 22 and 23 and the constant-voltage regulator 26.

At S203, the MCU 25 waits until the power supply becomes stable. As shown in FIG. 6, the MCU 25 waits for a time T1 until the power line Vdd becomes stable.

At S204, the MCU 25 operates the D/A converter 27 to output the output signal V0 from the D/A converter 27. At a timing t12, the MCU 25 instructs the operation signal generator 25b to generate the operation signal S, and the output signal level variable portion 27a calculates the voltage V0 based on the operation signal S in a following equation (1).

$$V0 = Vref2 \times \tfrac{1}{2} \qquad (1)$$

The D/A converter 27 outputs the voltage V0 as the output signal VDA, and the circuit 23 arithmetically processes the output signal VDA (voltage V0) and the vibration detecting signal Vo.

At S205, the MCU 25 waits until the vibration detecting signal Vo of the vibration sensing gyroscope 21 becomes stable. As shown in FIG. 6, the MCU 25 waits for a time T2 until the operation output signal Vout arithmetically processed based on the vibration detecting signal Vo of the vibration sensing gyroscope 21 becomes stable.

At S206, the MCU 25 advances the variable n by one. In a first loop, the MCU 25 adds one to the variable n.

At S207, the MCU 25 monitors the operation output signal Vout. At a timing t13 when the vibration detecting signal Vo becomes stable, the MCU 25 causes the built-in A/D converter 25a to digitize the operation output signal Vout.

At S208, the MCU 25 determines whether or not the monitored value of the operation output signal Vout is larger than 2.0V. If the monitored value is larger than 2.0V, the process goes to S209. If the monitored value is not larger than 2.0V, the process goes to S210. The MCU 25 determines whether the operation output signal Vout digitized by the A/D converter 25a is larger or smaller than the adjustment reference voltage (i.e., reference level to which the operation output signal is to be adjusted) Vref (2.0V in the embodiment of FIG. 6).

At S209, the MCU 25 operates the D/A converter 27 to output a voltage Vn calculated in following equation (2) from the D/A converter 27.

$$Vn = V_{n-1} + Vref2/2^{(n+1)} \tag{2}$$

The MCU 25 instructs the operation signal generator 25b to generate the operation signal S. Based on the operation signal S, the output signal level variable portion 27a of the D/A converter 27 outputs the voltage Vn based on the equation (2) as the output signal VDA, and the circuit 23 arithmetically processes the output signal VDA and the vibration detecting signal Vo. Additionally, $V_{n-1}$ in the equation (2) corresponds to the output voltage of the D/A converter 27 immediately before the arithmetic operation is performed. For example, when n=1, the voltage $V_{n-1}$ is V0, which is defined in the equation (1).

At S210, the MCU 25 operates the D/A converter 27 to output a voltage Vn calculated in following equation (3) from the D/A converter 27.

$$Vn = V_{n-1} - Vref2/2^{(n+1)} \tag{3}$$

The MCU 25 instructs the operation signal generator 25b to generate the operation signal S. Based on the operation signal S, the output signal level variable portion 27a of the D/A converter 27 outputs the voltage Vn based on the equation (3) as the output signal VDA, and the circuit 23 arithmetically processes the output signal VDA and the vibration detecting signal Vo. Additionally, $V_{n-1}$ in the equation (3) corresponds to the output voltage of the D/A converter 27 immediately before the arithmetic operation is performed. For example, when n=1, the voltage $V_{n-1}$ is V0, which is defined in the equation (1).

At S211, the MCU 25 waits until the output signal VDA and the operation output signal Vout becomes stable.

At S212, the MCU 25 determines whether or not the variable n is 11. If the MCU 25 determines that the variable n does not reach 11, the process goes to S206. The MCU 25 repeats the process of S206 and the subsequent steps until the variable n reaches 11 at maximum, and gradually brings the voltage value of the operation output signal Vout close to the adjustment reference voltage Vref(2.0V). When the variable n reaches 11, at S213 the MCU 25 ends a sequence of process.

Additionally, as shown in FIG. 6, the operation output signal Vout is adjusted from the timing t13 to t14. The MCU 25 makes the adjustment for a short time which can be ignored as compared to the frequency of the vibration to be detected.

In the second embodiment of the invention, the output variation of the vibration detecting signal Vo outputted from the vibration sensing gyroscope 21 when power is turned on, the variations in stationary output among individual vibration sensing gyroscopes, and a change in output due to change in environment can be precisely adjusted to the reference voltage Vref(2.0V). In the prior-art vibration detecting circuit, as shown in FIG. 20, the adjustment is made by using the high pass filter which is constituted by the capacitor C4 and the resistor R4. However, in the second embodiment, since no high pass filter is used, the problem caused by the time constant of the high pass filter can be solved.

Process When a Vibration Exceeding an Output Range is Applied

Figure 7:
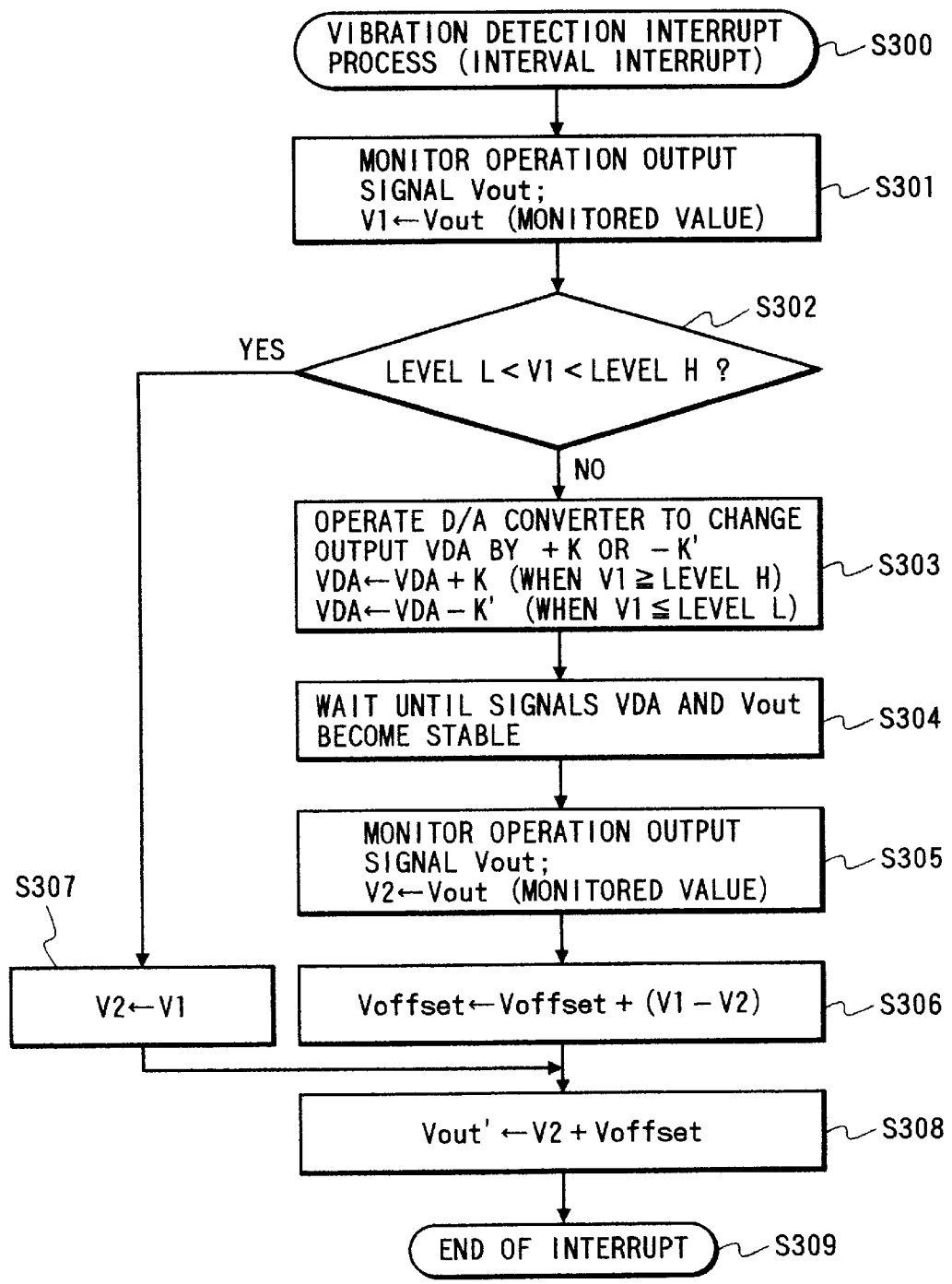
FIG. 7 is a flowchart of an operation performed when a vibration exceeding an output range is applied to the vibration detecting device of the second embodiment.
Figure 8:
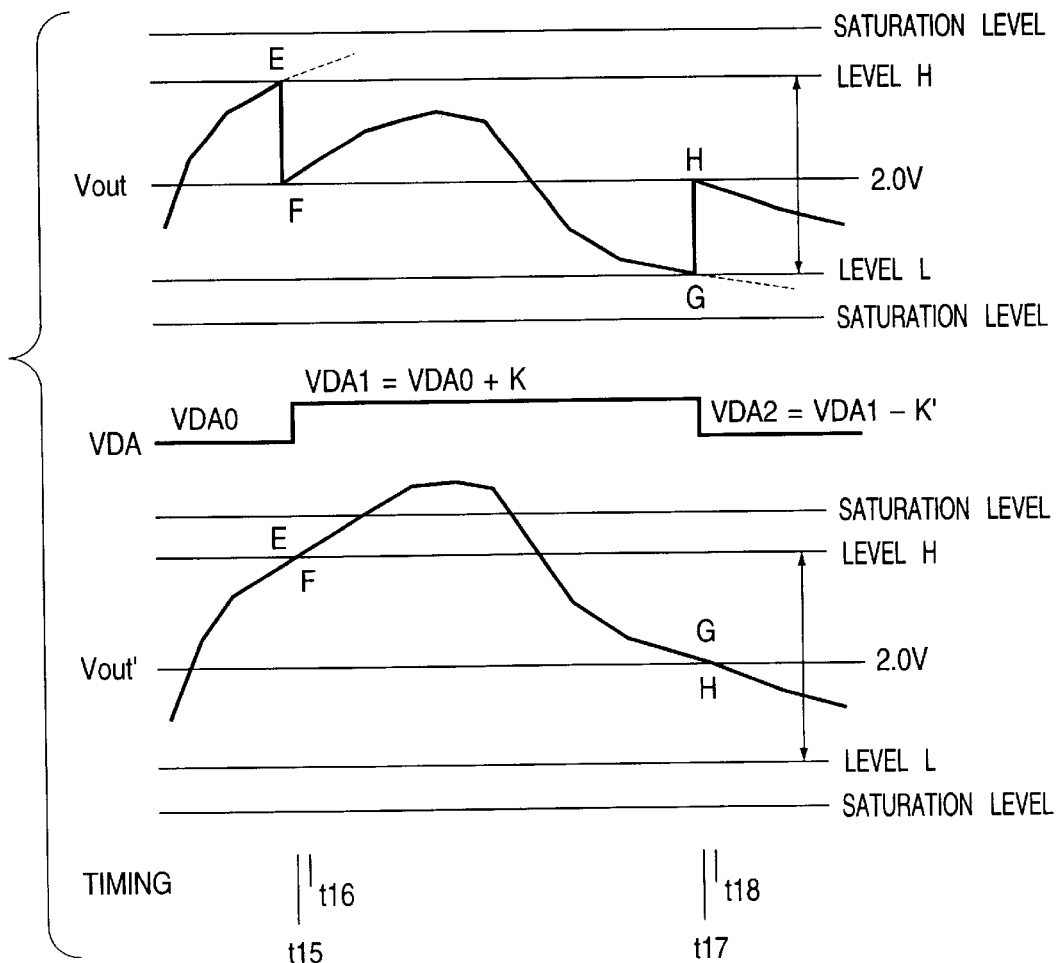
FIG. 8 is a timing chart when a vibration exceeding an output range is applied to the vibration detecting device of the second embodiment.

FIG. 7 is a flowchart of a process when a vibration exceeding an output range is applied to the vibration detecting device according to the second embodiment. FIG. 8 is a timing chart when the vibration exceeding the output range is applied to the vibration detecting device according to the second embodiment. Additionally, the process when the vibration exceeding the output range is applied to the vibration detecting device shown in FIG. 7 is an extract of a program incorporated in the MCU 25.

At S300, the MCU 25 starts a vibration detection interrupt process (interval interrupt). At this time, the MCU 25 has already completed ended the process upon turning-on of the power supply, and has instructed the control signal generator 25d to output the control signal PC. The power circuit 24 has supplied power to the vibration sensing gyroscope 21 and the circuits 22 and 23. Under the state in which the operation output signal Vout is stable, the vibration detection interrupt process is started. The vibration detection interrupt process is an interval interrupt process which is repeated at every interval of, for example, 1 ms by using a built-in timer function. The offset value Voffset described later is set beforehand to an initial value of zero.

At S301, the MCU 25 monitors the operation output signal Vout, and sets the operation output signal Vout as the monitored value V1. The MCU 25 causes the built-in A/D converter 25a to digitize the operation output signal Vout. A monitor result of the operation output signal Vout is set as the monitored value V1.

At S302, the MCU 25 determines whether or not the monitored value V1 is in a range from level L to level H. Specifically, the MCU 25 determines whether or not the monitored value V1 of the operation output signal Vout exceeds the range from level L to level H within the output dynamic range of the operation output signal Vout (non-saturated level range). Subsequently, if the MCU 25 determines that the monitored value V1 is in the range from level L to level H, the process goes to S302. If the MCU 25 determines that the monitored value V1 is not in the range from level L to level H, the process goes to S303.

At S307, the MCU 25 sets the monitored value V1 to the monitored value V2.

At S303, the MCU 25 operates the D/A converter 27 to change the output signal VDA by a predetermined voltage +K or -K'. If the monitored value V1 is level H or more, the MCU 25 changes the output signal VDA by +K. If the monitored value V1 is level L or less, the MCU 25 changes the output signal VDA by -K'. As shown in FIG. 8, at a timing t15(t17) immediately before the operation output signal Vout is saturated, (i.e. at a timing when the level H which is set slightly lower than an upper saturation level is exceeded (when the level L which is set slightly higher than a lower saturation level is exceeded)), the MCU 25 instructs the operation signal generator 25b to generate the operation signal S. Based on the operation signal S, when the monitored value V1 is the level H or more, the D/A converter 27 instructs the output signal level variable portion 27a to change the present output signal VDA0 to a voltage VDA which is higher by a predetermined voltage K. When the monitored value V1 is the level L or less, the D/A converter 27 instructs the output signal level variable portion 27a to change the present output signal VDA to a voltage VDA2 lower by a predetermined voltage K'. The output signal VDA is transmitted via the resistor R24 to the negative terminal of the operational amplifier OP22, and the circuit 23 arithmetically processes the output signal VDA and the vibration detecting signal Vo. Subsequently, the operation output signal Vout is returned to the reference voltage Vref(2.0V) or its vicinity, thereby performing initialization.

At S304, the MCU 25 waits until the output signal VDA and the operation output signal Vout become stable.

At S305, the MCU 25 monitors the operation output signal Vout, and sets the operation output signal Vout as the monitored value V2. The MCU 25 causes the built-in A/D converter 25a to again digitize the operation output signal Vout. The operation output signal Vout is set to the monitored value V2.

At S306, the MCU 25 adds the present offset value Voffset to a variation V1−V2 between the monitored values V1 and V2 to newly set the offset value Voffset. The MCU 25 operates the D/A converter 27 to compute the variation in the operation output signal Vout. The MCU 25 monitors a voltage E(G) of the operation output signal Vout immediately before the D/A converter 27 is operated and a voltage F(H) of the operation output signal Vout immediately after the D/A converter 27 is operated. The MCU 25 calculates a voltage difference E−F(G−H), and adds the variation E−F (G−H) to the present offset value Voffset to calculate a new offset value Voffset.

At S308, the MCU 25 adds the monitored value V2 to the newly calculated offset value Voffset to obtain a compensated operation output signal Vout'. The MCU 25 adds the set monitored value V2 to the offset value Voffset calculated at S306. The compensating portion 25c joints the operation output signal Vout from the timing t15(t17) to t16(t18) to obtain the compensated operation output signal Vout' as a calculation result. Subsequently, at S309 the MCU 25 ends the vibration detection interrupt process of the embodiment.

In the above description, the process performed when the operation output signal Vout lowers below the level L is described in parentheses.

In the second embodiment of the invention, the levels L and H are set in the output dynamic range, in the vicinity of limits of the range. When the operation output signal Vout falls outside the range from the level L to H, the D/A converter 27 is operated. For this, the operation output signal Vout is returned to the reference voltage Vref(2.0V), and the MCU 25 calculates the compensated operation output signal Vout' from the monitored values of the operation output signal Vout before and after the D/A converter 27 is operated. As a result, different from the prior-art vibration detecting device whose output dynamic range is finite, even when the vibration far exceeding the output dynamic range is applied to the circuit shown in FIG. 4, the vibration can be detected through the aforementioned process substantially in real time. Also, the vibration detecting resolution and the ratio S/N of the compensated operation output signal Vout' can be maintained. Further, to enlarge the dynamic range of the detectable vibration, the amplification factor of the circuit 23 shown in FIG. 4 can be raised, thereby enhancing the detecting resolution and S/N.

In the second embodiment of the invention, at the timing t15, the operation output signal Vout is returned to the reference voltage Vref(2.0V). In this case, when a larger vibration is applied later and the upper limit of the output dynamic range is again exceeded or the lower limit of the output dynamic range is downwardly exceeded plural times, then the same operation as the operation at the timing t15 or t16 is repeated. As a result, the vibration several times as large as or larger than in the prior art can be detected.

In the second embodiment of the invention, the variation in operation output signal Vout produced by operating the D/A converter 27 is naturally determined, when the properties of the D/A converter 27, the resistance of the resistors R24 and R25 constituting the circuit 27, the voltage value of the reference voltage Vref2 of the D/A converter 27 and the properties of the operational amplifier OP22 are known. For this, without monitoring the voltage value of the timing t16(t18) shown in FIG. 8, the voltage of the point F(H) can be determined from the voltage variation K(K') of the output signal VDA of the D/A converter 27 and the potential of point E(G). Conversely, from the potential of the point F(H), a precise potential of point E(G) can be determined. The process is thus facilitated.

In the second embodiment of the invention, as shown in FIG. 4, the reference power of the A/D converter 25a of the MCU 25 and the D/A converter 27 has the same reference voltage Vref2. Therefore, even if the potential of the reference voltage Vref2 varies among individual apparatus, the ratio of the variation of the output signal VDA per LSB of the D/A converter 27 with the voltage per LSB of the A/D converter 25a can always be constant unless the ratio of the resistors R24 and R25 changes. As a result, even when the reference voltage Vref2 varies among the individual apparatus and the D/A converter 27 is operated by the MCU 25 for the same quantized quantity, then the variation in the A/D conversion quantity of the A/D converter can always be kept constant relative to the variation of the output signal Vout. Also, in the vibration detecting circuit shown in FIG. 1, the output of the vibration sensing gyroscope 11 is amplified through the circuit 13. Therefore, depending on the response time which is determined by the properties of the capacitor C14, the resistors R14 and R15 and the analog switch SW11, a time during which the output signal Vout is returned to the predetermined voltage (corresponding to the level 0V shown in FIG. 3) is necessary. However, in the second embodiment, since the D/A converter 27 is used as shown in FIG. 4, the output signal can be returned to the predetermined reference voltage Vref at a higher speed as compared with the vibration detecting circuit shown in FIG. 1. As a result, from the timing t15(t17) to t16(t18), an error caused by the change in vibration signal in the compensated operation output signal Vout' can be reduced.

In the second embodiment, the circuit 23 is further provided which adds the output signal VDA of the D/A converter 27 to the output of the circuit 22 based on the vibration detecting signal Vo to be further amplified. Therefore, even if the vibration detecting signal Vo is micro, it can be amplified to a large signal to be outputted. Also, the D/A converter 27 can be operated in accordance with the digital signal, while the D/A converter 27 can be easily controlled by the program of the one chip microcomputer, thereby performing a complicated control.

Third Embodiment

Figure 9:
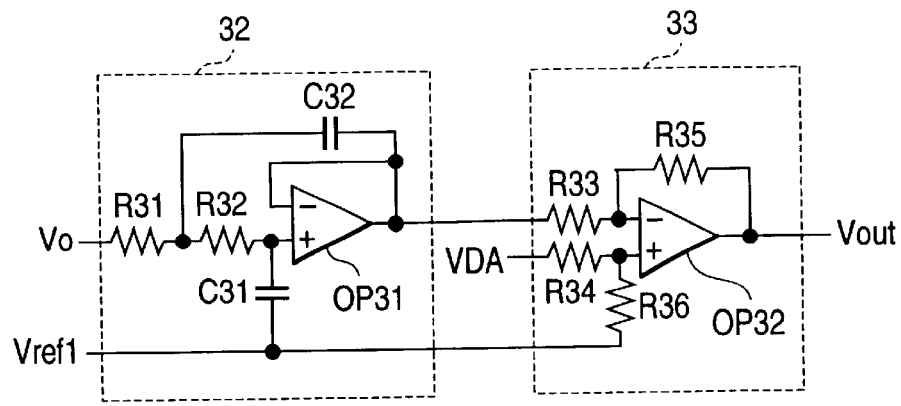
FIG. 9 is a circuit diagram showing a portion of a vibration detecting circuit in a vibration detecting device according to a third embodiment of the invention.

FIG. 9 shows a portion of a vibration detecting circuit in a vibration detecting device according to a third embodiment of the invention.

The third embodiment provides another embodiment of the circuits 22 and 23 shown in FIG. 4. In the third embodiment, the adder of the circuit 23 in the second embodiment is replaced by a subtracter. Therefore, in the third embodiment, the process of the MCU 25 is changed in such a manner when the voltage of the output signal VDA of the D/A converter 27 is increased (decreased) in the second embodiment, the voltage of the output signal VDA from the D/A converter 27 is decreased (increased).

Fourth Embodiment

Figure 10:
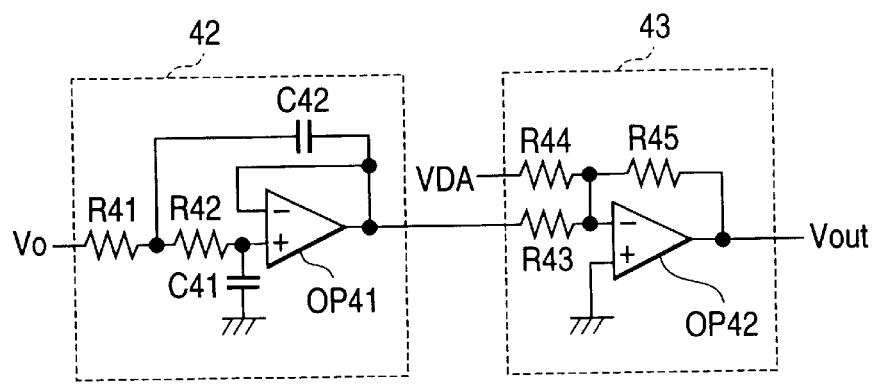
FIG. 10 is a circuit diagram showing a portion of a vibration detecting circuit in a vibration detecting device according to a fourth embodiment of the invention.

FIG. 10 shows a portion of a vibration detecting circuit in a vibration detecting device according to a fourth embodiment of the invention.

The fourth embodiment provides another embodiment of the circuits 22 and 23 shown in FIG. 4. In the fourth embodiment, the reference potential of the circuits 22 and 23 according to the second embodiment is constituted of a circuit basing on GND instead of the reference voltage Vref1. In the second embodiment, the output signal VDA ranges from 0 to the reference voltage Vref2 in the circuit shown in FIG. 4. However, in the fourth embodiment, in the circuit shown in FIG. 10, the output signal VDA ranges, for example, from −Vref2 to +Vref2 centering on 0V. In the second embodiment, when power is turned on in the vibration sensing gyroscope 21 and the output range or the adjustment voltage of the operation output signal Vout is exceeded, then the voltage level is returned to around 2.0V. However, in the fourth embodiment, to adjust and return the voltage level to 0V, the operation of the MCU 25 is changed.

Fifth Embodiment

Figure 11:
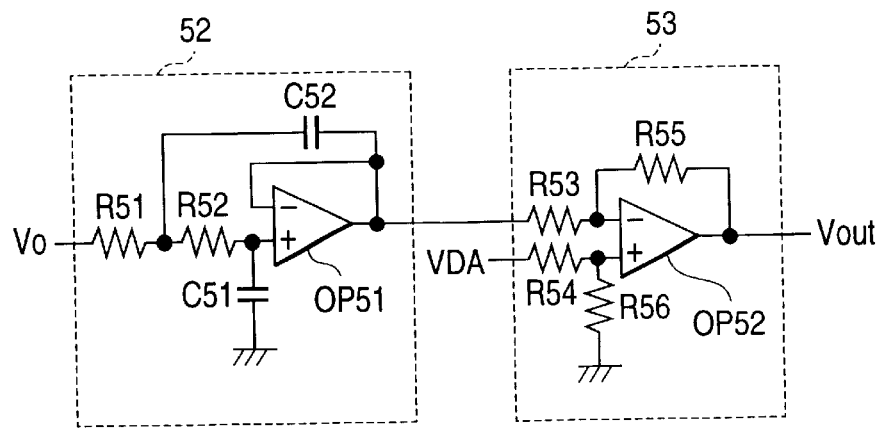
FIG. 11 is a circuit diagram showing a portion of a vibration detecting circuit in a vibration detecting device according to a fifth embodiment of the invention.

FIG. 11 shows a portion of a vibration detecting circuit in a vibration detecting device according to a fifth embodiment of the invention.

The fifth embodiment provides another embodiment of the circuits 22 and 23 shown in FIG. 4. In the fifth embodiment, the reference potential of the circuits 22 and 23 according to the second embodiment is constituted of a circuit basing on GND instead of the reference voltage Vref1, and the circuit 23 is constituted of a subtracter instead of an adder. In the second embodiment, the output signal VDA ranges from 0 to the reference voltage Vref2 in the circuit shown in FIG. 4. However, in the fifth embodiment, the output signal VDA ranges, for example, from −Vref2 to +Vref2 centering on 0V. In the second embodiment, when the output range or the adjustment voltage of the operation output signal Vout is exceeded, the voltage level is returned to around 2.0V. However, in the fifth embodiment, to return the voltage level to 0V, the operation of the MCU 25 is changed. Further, in the fifth embodiment, the process of the MCU 25 is changed in such a manner when the voltage of the output signal VDA of the D/A converter 27 is increased (decreased) in the second embodiment, the voltage of the output signal VDA from the D/A converter 27 is decreased (increased).

By selecting either one of the circuits according to the third to fifth embodiments, interfacing with peripheral circuits or designing of circuit can be effectively performed.

In the aforementioned embodiments of the invention, by appropriately setting the resistors R23, R24 and R25 of the circuit 23 shown in FIG. 4, the adding ratio and gain of the output signal of the circuit 22 and the output signal VDA of the D/A converter 27 can be optionally set. For example, by appropriately setting the resistors R23, R24 and R25, the amplification factor of the output Vout of the circuit 23 relative to the output signal VDA of the D/A converter 27 can be set smaller than that of the output Vout of the circuit 23 relative to the output of the circuit 22. In this case, the variation in output Vout per LSB of the set value in the D/A converter 27 (the voltage adjustment resolution of the output Vout) is enhanced. Also, the output drift of the vibration sensing gyroscope 21 when power turns on, the variation in stationary output voltage among individual vibration sensing gyroscopes and the like can be adjusted to a high resolution. Further, when a high-resolution adjustment is unnecessary, the resolution of the D/A converter 27 of 12 bits is dropped to reduce the cost. Also, the quantity of an influence of the variation in voltage of the output signal VDA from the D/A converter 27 over the output Vout can be decreased. The aforementioned effect can be obtained not only from the circuit 23 shown in FIG. 4 but also from the circuits 33, 43 and 53 shown in FIGS. 9, 10 and 11, respectively.

Sixth Embodiment

A sixth embodiment of the invention is now described referring to the accompanying figures.

In the following, the same portions as those described in the second embodiment are denoted with corresponding numerals or characters, and the detailed description thereof is omitted.

Figure 12:
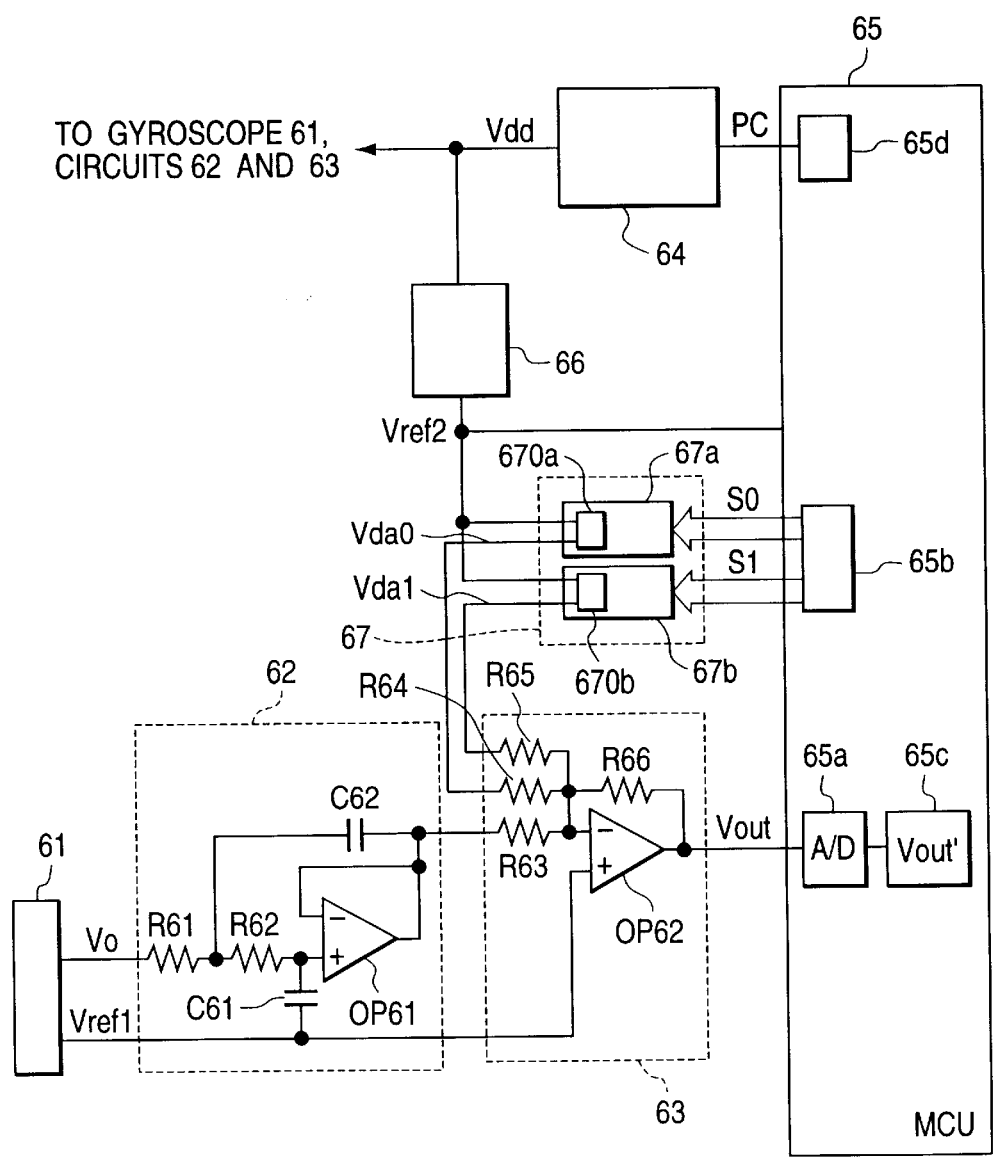
FIG. 12 is a circuit diagram showing a vibration detecting circuit in a vibration detecting device according to a sixth embodiment of the invention.

FIG. 12 shows a vibration detecting circuit in a vibration detecting device according to the sixth embodiment.

The vibration detecting circuit of the sixth embodiment is different from the vibration detecting circuit shown in FIG. 1 in that to more easily apply the invention to a camera or a video movie, elements of the circuit can be used with a single power supply.

A vibration sensing gyroscope 61 detects an angular velocity caused by the vibration in an apparatus with a piezoelectric element. A stable power of about 5V is supplied from a power circuit 64 via a power line Vdd to the vibration sensing gyroscope 61. The vibration sensing gyroscope 61 outputs as a reference voltage Vref1 a stable voltage substantially half the voltage on the power line Vdd. The reference voltage Vref1 serves as a reference potential of circuits 62 and 63. The vibration sensing gyroscope 61 outputs a vibration detecting signal indicative of an applied vibration centering on the voltage which substantially has a value of the reference voltage Vref1.

The circuit 62 is constituted of resistors R61 and R62, capacitors C61 and C62 and an operational amplifier OP61, and is a secondary low pass filter circuit which removes from the vibration detecting signal Vo of the vibration sensing gyroscope 61 a high-frequency component which is not caused by the vibration.

The circuit 63 is constituted of resistors R63, R64, R65 and R66 and an operational amplifier OP62, and is an adding amplifier circuit which adds an output signal Vda0 of a D/A converter 67a, an output signal Vda1 of a D/A converter 67b and an output signal of the circuit 62 and performs an inverting amplification with an appropriate gain. By appropriately setting values of the resistors R63, R64, R65 and R66, the circuit 63 can optionally set an adding ratio and gain of the output signals Vda0 and Vda1 of the D/A converters and the output signal of the circuit 62. The values of the resistors R63, R64, R65 and R66 are determined by the properties of the D/A converters 67a and 67b, an output dynamic range, a resolution and a sensitivity of the vibration sensing gyroscope 61 as required. For example, when the vibration detecting signal Vo of the vibration sensing gyroscope 61 has a sufficient sensitivity and the gain does not need to be obtained from the circuit 63, then the resistance of the resistors R63, R64, R65 and R66 is set to the same value. In this case, the circuit 63 can be operated simply as an adder.

The power circuit 64 supplies a more stable reference voltage Vref2 (for example, of about 4V to 5V) via a constant-voltage regulator 66 from the power line Vdd as a reference power of the D/A converters 67a and 67b and an A/D converter 65a built in an MCU 65.

The D/A converter 67 is provided with the D/A converters 67a and 67b. The D/A converter 67a outputs the output signal Vda0 based on an operation signal S0 from an operation signal generator 65b, while the D/A converter 67b outputs an output signal Vda1 based on an operation signal S1 from an operation signal generator 65b. The D/A converters 67a and 67b have output signal level variable portions 67a and 67b built therein and, outputs an optional analog voltage of 0V to Vref2 on the basis of the reference voltage Vref2.

The MCU 65 has therein the A/D converter 65a, the operation signal generator 65b, a compensating portion 65c and a control signal generator 65d, and A/D converts the operation output signal Vout of the circuit 63 on the basis of the reference voltage Vref2, while recognizing the vibration occurring in the apparatus. Also, the MCU 65 controls the operation of the power circuit 64 based on the control signal PC which is generated by the control signal generator 65d.

Operation mainly of the MCU 65 in the vibration detecting device according to the sixth embodiment is divided into a process when power supply is turned on and a process when a vibration exceeding an output range is applied, and now described.

Process Upon Turning-on of Power Supply

Figure 13:
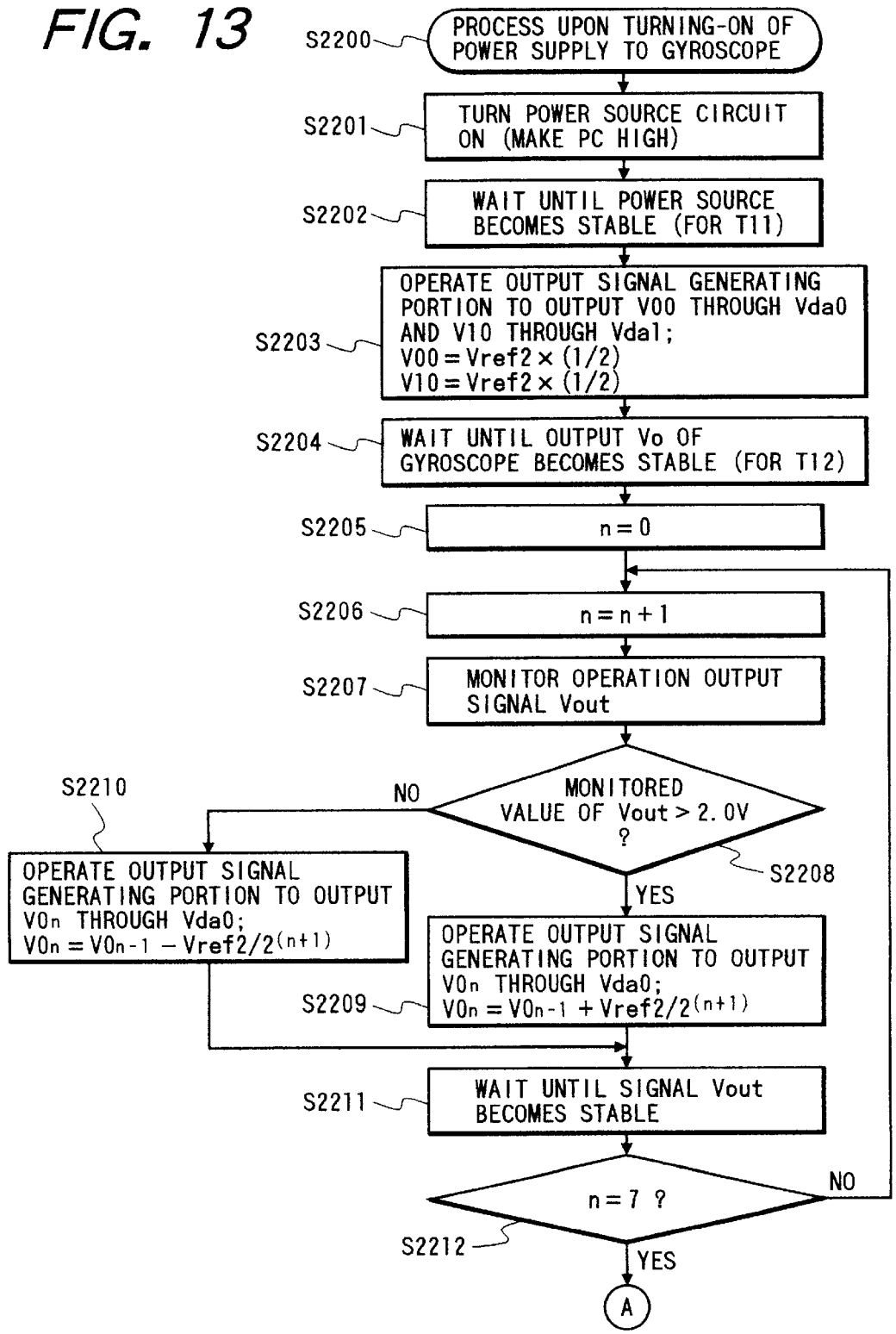
FIG. 13 is a flowchart of a coarse adjustment made when power turns on in the vibration detecting device of the sixth embodiment.
Figure 14:
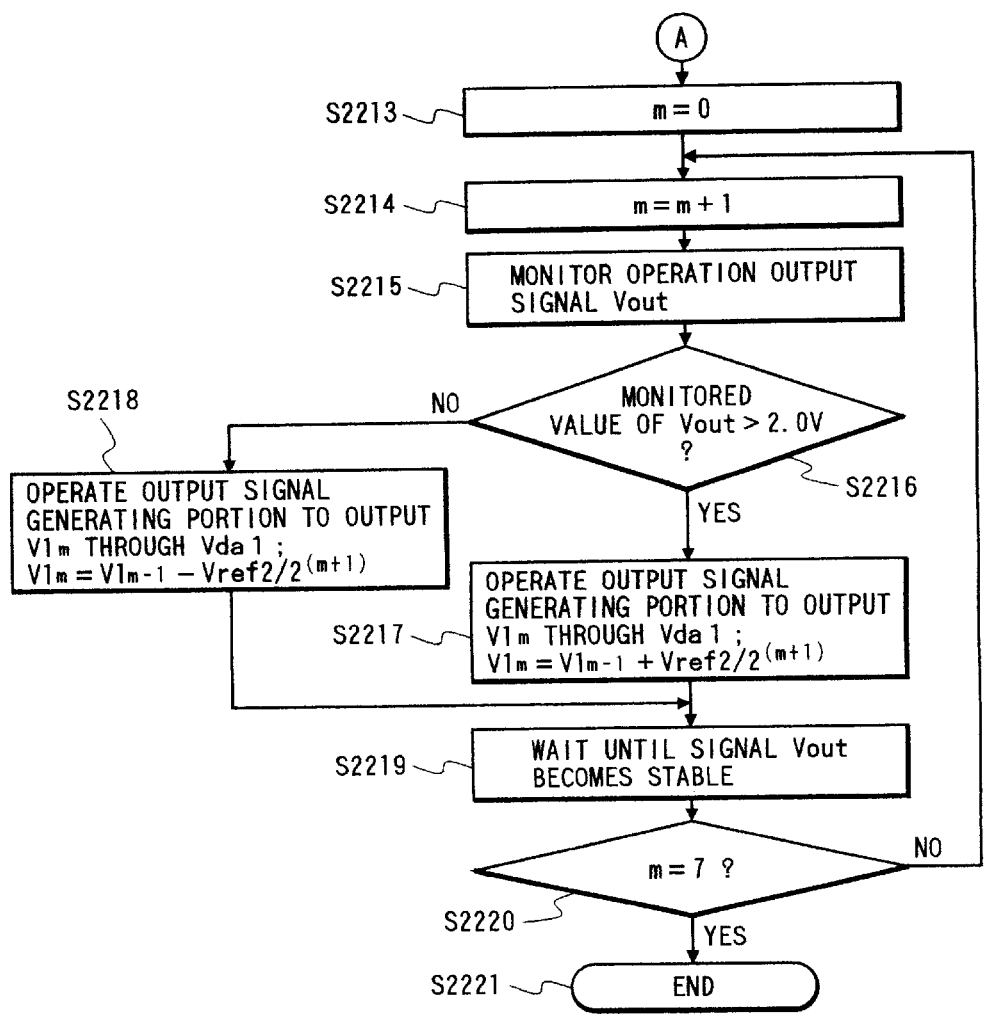
FIG. 14 is a flowchart, continued from the flowchart of FIG. 13, showing a fine adjustment made when power turns on in the vibration detecting device of the sixth embodiment.
Figure 15:
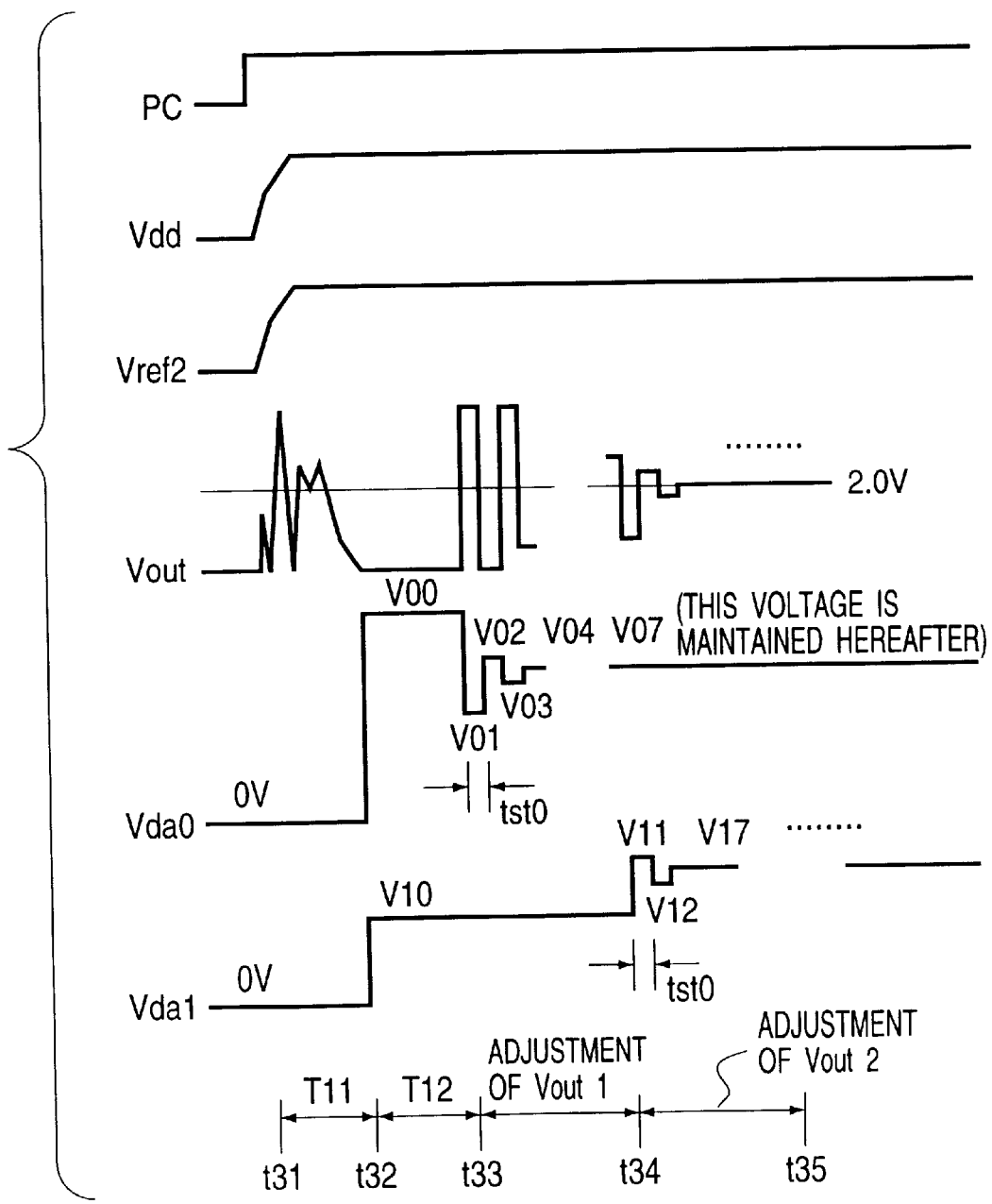
FIG. 15 is a timing chart when power is turned on in the vibration detecting device of the sixth embodiment.

FIG. 13 is a flowchart of a coarse adjustment process upon turning-on of power supply to the vibration detecting device according to the sixth embodiment. FIG. 14 is a flowchart of a fine adjustment process upon turning-on of power supply to the vibration detecting device according to the sixth embodiment. FIG. 15 is a timing chart when power is turned on in the vibration detecting device according to the sixth embodiment.

The process upon turning-on of power supply to the vibration detecting device shown in FIG. 13 is an extract from a program incorporated in the MCU 65.

In the sixth embodiment, 8-bit D/A converters 67a and 67b are taken as examples to be described. In the following, the same steps as those shown in FIG. 5 are denoted with corresponding numerals, and detailed description thereof is omitted.

At S2200, the MCU 65 starts the process upon turning-on of power supply to the vibration sensing gyroscope 61. At this time, the power circuit 64 is not operated, and the output signals Vda0 and Vda1 of the output signal generator 67 are of 0V.

At S2201, the MCU 65 turns on the power circuit 64. At a timing t31, the MCU 65 instructs the control signal generator 65d to generate the signal PC, the signal PC is made high and the power circuit 64 is turned on. Subsequently, power is supplied via the power line Vdd to the vibration sensing gyroscope 61, the circuits 62 and 63 and the constant-voltage regulator 66.

At S2202, the MCU 65 waits for a time T11 until the power line Vdd becomes stable.

At S2203, the MCU 65 operates the output signal generator 67 to output an output signal V00 from the D/A converter 67a. An output signal V10 is outputted from the D/A converter 67b. At a timing t32, the MCU 65 instructs the operation signal generator 65b to generate operation signals S0 and S1, and an output signal level variable portion 670a calculates the voltage V00 based on the operation signal S0 in a following equation (4).

$$V00 = Vref2 \times \tfrac{1}{2} \qquad (4)$$

On the other hand, an output signal level variable portion 670b calculates the voltage V10 based on the operation signal S1 in a following equation (5).

$$V10 = Vref2 \times \tfrac{1}{2} \qquad (5)$$

The circuit 63 calculates the operation output signal Vout based on the output signal Vda0 (voltage V00), the output signal Vda1 (voltage V10) and the vibration detecting signal Vo.

At S2204, the MCU 65 waits until the vibration detecting signal Vo of the vibration sensing gyroscope 61 becomes stable. Specifically, the MCU 65 waits for a time T12 until the operation output signal Vout becomes stable.

At S2205, the MCU 65 sets a variable n which is used at subsequent steps to zero, and at S2206 the MCU 65 advances the variable n by one (adds one to the variable n).

At S2207, the MCU 65 monitors the operation output signal Vout. At a timing t33, the MCU 65 causes the A/D converter 65a to digitize the operation output signal Vout.

At S2208, the MCU 65 determines whether or not the monitored value of the operation output signal Vout is larger than 2.0V. If the monitored value is larger than 2.0V, the process goes to S2209. If the monitored value is not larger than 2.0V, the process goes to S2210. The MCU 65 determines whether the operation output signal Vout is larger or smaller than the adjustment reference voltage Vref(2.0V).

At S2209, the MCU 65 operates the output signal generator 67 to output a voltage V0n calculated in following equation (6) from the D/A converter 67a.

$$V0n = V0_{n-1} + Vref2/2^{(n+1)} \qquad (6)$$

The MCU 65 instructs the operation signal generator 65b to generate the operation signal S0. Based on the operation signal S0, the voltage V0n is emitted as the output signal Vda0. The circuit 63 adds the output signals Vda0 and Vda1 and the output signal of the circuit 62 on the basis of the reference voltage Vref1 with a ratio which is determined by the resistance of the resistors R63, R64, R65 and R66 to output the operation output signal Vout. Additionally, $V0_{n-1}$ in the equation (6) corresponds to the output voltage of the D/A converter 67a immediately before the arithmetic operation is performed. For example, when n=1, the voltage $V0_{n-1}$ is V00 which is defined in the equation (4).

At S2210, the MCU 65 operates the output signal generator 67 to output a voltage V0n calculated in following equation (7) from the D/A converter 67a.

$$V0n = V_{n-1} - Vref2/2^{(n+1)} \qquad (7)$$

The MCU 65 instructs the operation signal generator 65b to generate the operation signal S0. Based on the operation signal S0, the output signal level variable portion 670a outputs the voltage V0n based on the equation (7) as the output signal Vda0, and the circuit 63 outputs the operation output signal Vout in the same manner as the process of S2209. Additionally, $V0_{n-1}$ in the equation (7) corresponds to the output voltage of the D/A converter 67a immediately before the arithmetic operation is performed. For example, when n=1, the voltage $V0_{n-1}$ is V00 which is defined in the equation (4).

At S2211, the MCU 65 waits until the output signal Vda0 and the operation output signal Vout become stable.

At S2212, the MCU 65 determines whether or not the variable n is 7. If the variable n does not reach 7, the process returns to S2206. At a timing t34 when the variable n reaches 7, the process goes to S2213. The MCU 65 repeats the process of S2206 and the subsequent steps until the variable n reaches 7, and coarsely adjusts the voltage value of the operation output signal Vout to the adjustment reference voltage Vref(2.0V).

At S2213, the MCU 65 sets a variable m which is used at the subsequent steps to zero, and at S2214 the MCU 65 advances the variable m by one (adds one to the variable m).

At S2215, the MCU 65 monitors the operation output signal Vout. The MCU 65 causes the A/D converter 65a to digitize the operation output signal Vout.

At S2216, the MCU 65 determines whether or not the monitored value of the operation output signal Vout is larger than 2.0V. If the monitored value is larger than 2.0V, the process goes to S2217. If the monitored value is not larger than 2.0V, the process goes to S2218. The MCU 65 determines whether the operation output signal Vout is larger or smaller than the adjustment reference voltage Vref(2.0V).

At S2217, the MCU 65 operates the output signal generator 67 to output a voltage V1m calculated in following equation (8) from the D/A converter 67b.

$$V1m = V1_{m-1} + Vref2/2^{(m+1)} \qquad (8)$$

The MCU 65 instructs the operation signal generator 65b to generate the operation signal S1. Based on the operation signal S1, the output signal level variable portion 670b outputs a voltage V1m based on the equation (8) as the output signal Vda1. The circuit 63 adds the output signals Vda0 and Vda1 and the output signal of the circuit 62 on the basis of the reference voltage Vref1 with a ratio which is determined by the resistance of the resistors R63, R64, R65 and R66 to output the operation output signal Vout. Additionally, $V0_{m-1}$ in the equation (8) corresponds to the output voltage of the D/A converter 67b immediately before the arithmetic operation is performed. For example, when m=1, the voltage $V1_{m-1}$ is V10 which is defined in the equation (5).

At S2218, the MCU 65 operates the output signal generator 67 to output a voltage V1m calculated in following equation (9) from the D/A converter 67b.

$$V1m = V1_{m-1} - Vref2/2^{(m+1)} \qquad (9)$$

The MCU 65 instructs the operation signal generator 65b to generate the operation signal S1. Based on the operation signal S1, the output signal level variable portion 670b outputs the voltage V1m based on the equation (9) as the output signal Vda1, and the circuit 63 outputs the operation output signal Vout in the same manner as the process of S2217. Additionally, $V1_{m-1}$ in the equation (9) corresponds to the output voltage of the D/A converter 67b immediately before the arithmetic operation is performed. For example, when m=1, the voltage $V1_{m-1}$ is V10 which is defined in the equation (5).

At S2219, the MCU 65 waits until the output signal Vda1 and the operation output signal Vout become stable.

At S2220, the MCU 65 determines whether or not the variable m is 7. If the variable m does not reach 7, the process returns to S2214. At a timing t35 when the variable m reaches 7, a sequence of process ends at S2221. The MCU 65 repeats the process of S2214 and the subsequent steps until the variable m reaches 7, and finely adjusts the voltage value of the operation output signal Vout to the adjustment reference voltage Vref(2.0V).

Additionally, the operation output signal Vout is adjusted from the timing t33 to t35. The MCU 65 makes the adjustment for a short time which can be ignored as compared to the frequency of the vibration to be detected.

The output variation upon turning-on of the power supply to the vibration sensing gyroscope 61, the variation in stationary output among individual vibration sensing gyroscopes 61, the output variation caused by change in environment and the like cause the vibration detecting signal Vo and the output of the circuit 62 to have a large difference in voltage from the reference voltage Vref1 of the circuit 63. The voltage difference is outputted as the operation output signal Vout in accordance with the amplification factor which is determined by the resistors R63 and R66. The voltage difference is not emitted as a constant voltage. In addition, the operation output signal Vout would exceed the output range of the operational amplifier OP62 and become saturated.

In the vibration detecting device according to the sixth embodiment, the output of the circuit 62 based on the vibration detecting signal Vo and the output signals Vda0 and Vda1 of the D/A converters 67a and 67b are added in the circuit 63, and outputted as the operation output signal Vout. If the resistance of the resistor R64 is set smaller than that of the resistor R65, through the process from S2200 to S2212, the voltage level of the operation output signal Vout is monitored by the MCU 65, and the output signal Vda0 of the D/A converter 67a is varied and controlled in accordance with the monitored voltage level. As a result, the operation output signal Vout can be roughly adjusted to the predetermined voltage 2.0V as an adjustment target or its vicinity, (coarse adjustment).

Also, through the process from S2213 to S2221, the voltage level of the operation output signal Vout is monitored by the MCU 65. The output signal Vda1 of the D/A converter 67b is varied and controlled. As a result, the operation output signal Vout can be adjusted with a high precision to the predetermined voltage 2.0V or its vicinity, (fine adjustment). Consequently, the output variation of the vibration detecting signal Vo from the vibration sensing gyroscope 61 when power is turned on, the dispersion in stationary output among individual vibration sensing gyroscopes and a change in output due to change in environment can be precisely adjusted to the reference voltage Vref (2.0V).

For example, when the D/A converters 67a and 67b are each constituted of a D/A converter having a resolution of eight bits and the ratio of the resistance between the resistors R64 and R65 is set 1:256, then the MCU 65 coarsely adjusts the voltage level of the operation output signal Vout. Further, the MCU 65 can finely adjust the voltage level of the operation output signal Vout to 2.0V with a finer resolution of 1/256. In the sixth embodiment, different from the second embodiment in which the D/A converter 27 having a high resolution of 12 bits is used, even with a relatively inexpensive D/A converter of about eight bits, the voltage level of the operation output signal Vout can be adjusted with a high precision.

Since the vibration detecting device according to the sixth embodiment uses no high pass filter, the problem caused by the time constant of the high pass filter can be solved.

Process When a Vibration Exceeding an Output Range is Applied

Figure 16:
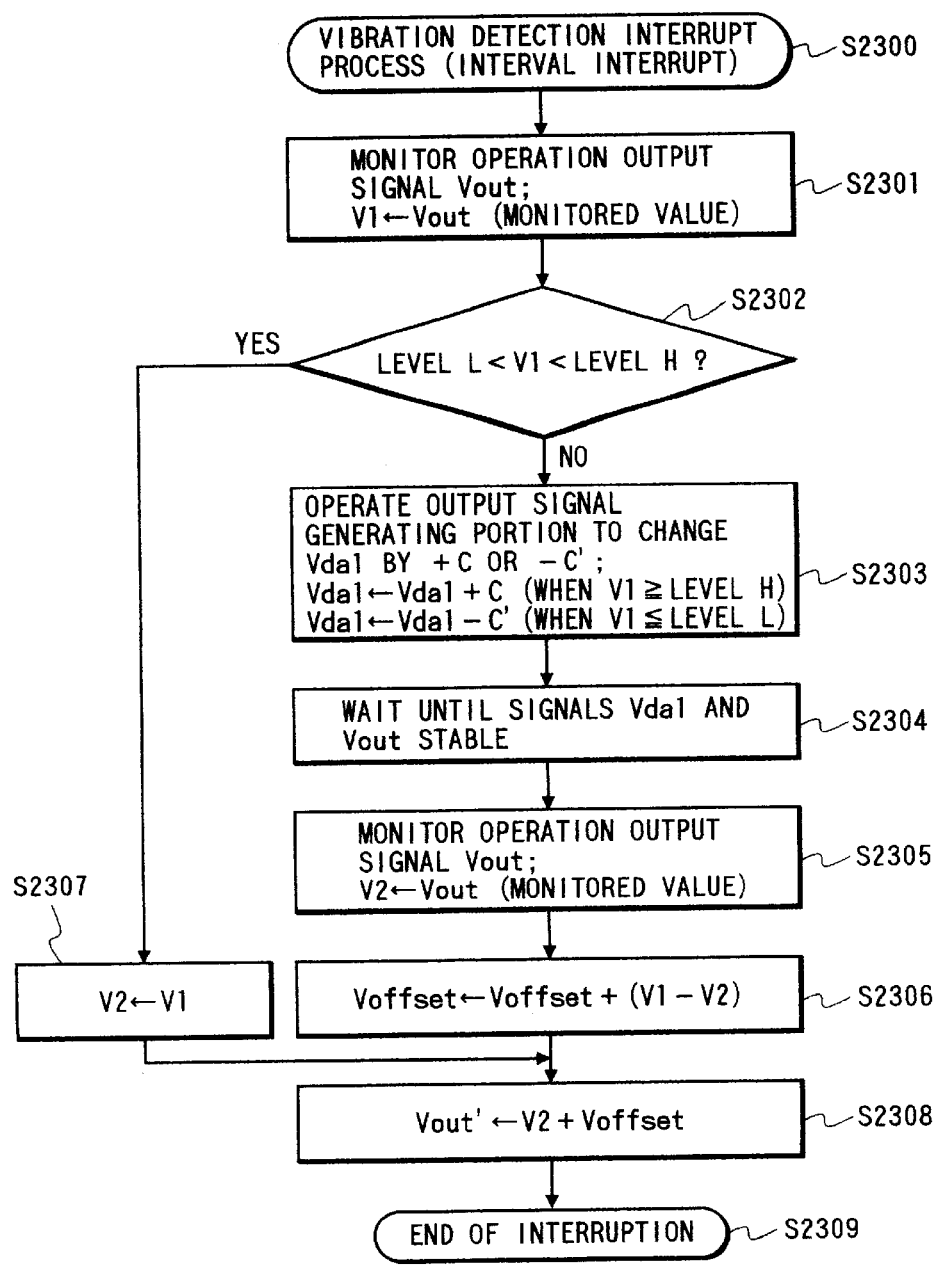
FIG. 16 is a flowchart of an operation performed when a vibration exceeding an output range is applied to the vibration detecting device of the sixth embodiment.
Figure 17:
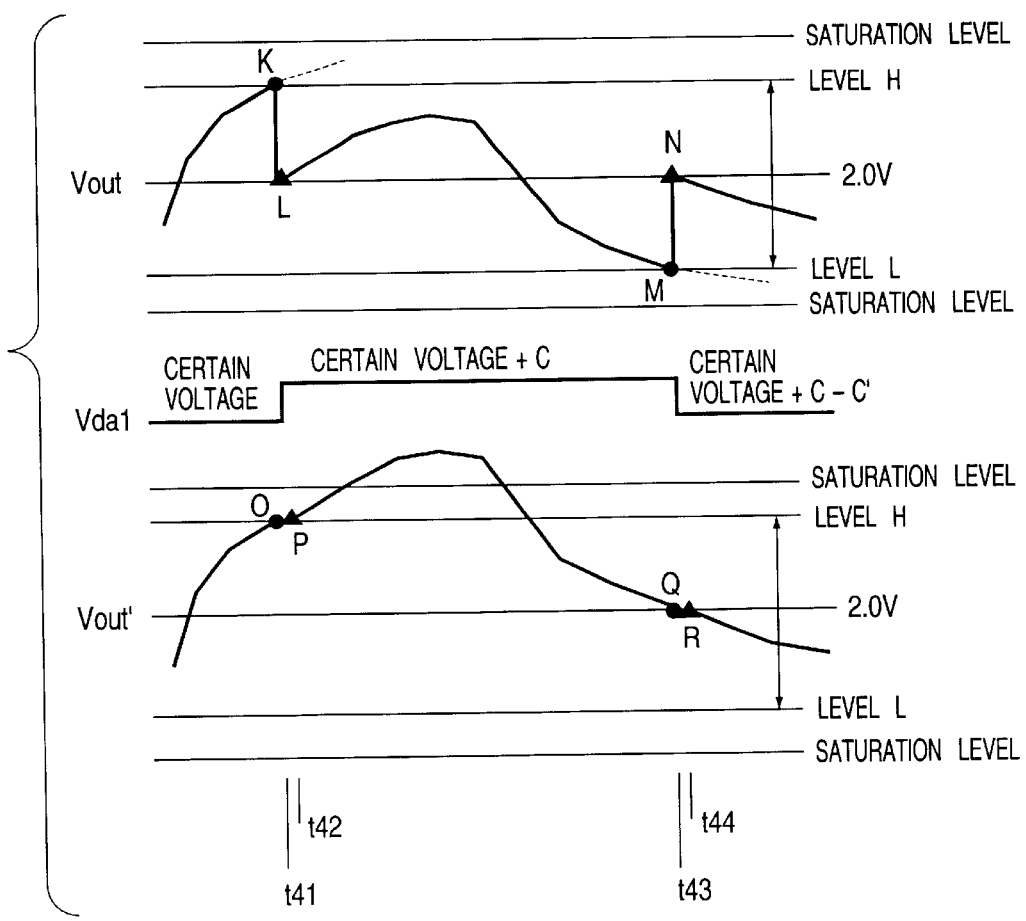
FIG. 17 is a timing chart when the vibration exceeding the output range is applied to the vibration detecting device of the sixth embodiment.

FIG. 16 is a flowchart of a process when a vibration exceeding an output range is applied to the vibration detecting device according to the sixth embodiment. FIG. 17 is a timing chart when the vibration exceeding the output range is applied to the vibration detecting device according to the sixth embodiment.

The process when the vibration exceeding the output range is applied to the vibration detecting device shown in FIG. 16 is an extract of a program incorporated in the MCU 65. In the following, the same steps as those shown in FIG. 7 are denoted with corresponding numerals, and detailed description thereof is omitted.

At S2300, the MCU 65 starts a vibration detection interrupt process (interval interrupt). At this time, the MCU 65 has already completed the aforementioned process upon turning-on of the power supply, and has instructed the control signal generator 25d to output the control signal PC. The power circuit 64 has supplied power to the vibration sensing gyroscope 61 and the circuits 62 and 63. Under the condition in which the operation output signal Vout is stable, the MCU 65 starts the vibration detection interrupt process. The vibration detection interrupt process is an interval interrupt process which is repeated at every interval of, for example, 1 ms by using a built-in timer function. The MCU 65 sets beforehand the offset value Voffset described later to an initial value of zero.

At S2301, the MCU 65 monitors the operation output signal Vout, and causes the A/D converter 65a built therein to digitize the operation output signal Vout. The monitored result of the operation output signal Vout is set as the monitored value V1.

At S2302, the MCU 65 determines whether or not the monitored value V1 is in a range from level L to level H. If the monitored value V1 is in the range from level L to H, the process goes to S2307, at which the MCU 65 sets the monitored value V1 as the monitored value V2. If the monitored value V1 is not in the range from level L to H, the process goes to S2303.

At S2303, the MCU 65 operates the output signal generator 67 to change the output signal Vda1 by a predetermined voltage C or −C'. If the monitored value V1 is level H or higher, the MCU 65 changes the output signal Vda1 as much as +C. If the monitored value V1 is level L or less, the output signal Vda1 is changed by −C'. As shown in FIG. 17, at a timing t41(t43) immediately before the operation output signal Vout is saturated, (i.e. at a timing when the level H which is set slightly lower than an upper saturation level is exceeded (when the level L which is set slightly higher than a lower saturation level is exceeded)), the MCU 65 instructs the operation signal generator 65b to generate the operation signal S1. Based on the operation signal S1, when the monitored value V1 is the level H or more, the D/A converter 67b instructs the output signal level variable portion 670b to change the present output signal Vda1 to a voltage Vda1 to which the predetermined voltage C is added. When the monitored value V1 is the level L or less, the D/A converter 67b instructs the output signal level variable portion 670b to change the present output signal Vda1 to a voltage Vda1 from which the predetermined voltage C' is subtracted. The output signal Vda1 is transmitted via the resistor R65 to the negative terminal of the operational amplifier OP62. The circuit 63 adds the output of the circuit 62 based on the vibration detecting signal Vo and the output signals Vda0 and Vda1 on the basis of the reference voltage Vref1 with the ratio which is determined by the resistances of the resistors R63, R64, R65 and R66. As a result, the operation output signal Vout is returned to the predetermined voltage level 2.0V or its vicinity, thereby performing initialization.

At S2304, the MCU 65 waits until the output signal Vda1 and the operation output signal Vout become stable. At S2305, the MCU 65 monitors the operation output signal Vout, and sets the operation output signal Vout as the monitored value V2.

At S2306, the MCU 65 adds the present offset value Voffset to a variation V1−V2 between the monitored values V1 and V2 to newly set the offset value Voffset. The MCU 65 monitors a voltage K(M) of the operation output signal Vout immediately before the D/A converter 67b is operated and a voltage L(N) of the operation output signal Vout immediately after the D/A converter 67b is operated. The MCU 65 calculates a voltage difference K−L(M−N), and adds the variation K−L(M−N) to the present offset value Voffset to calculate a new offset value Voffset.

At S2308, the MCU 65 adds the monitored value V2 to the newly calculated offset value Voffset to obtain a compensated operation output signal Vout'. The compensating portion 65c joints the operation output signal Vout from the timing t41(t43) to t42(t44) to calculate the compensated operation output signal Vout'. Subsequently, at S2309 the MCU 65 ends the vibration actuator detection interrupt process of the embodiment.

In the above description, the process performed when the operation output signal Vout lowers below the level L is described in parentheses.

In the sixth embodiment of the invention, as shown in FIG. 17, when at the timing t41 the operation output signal Vout exceeds the point K or at the timing t43 the operation output signal Vout lowers below the point M, the D/A converter 67b is operated. As a result, the operation output signal Vout is returned to the reference voltage Vref(2.0V).

In the sixth embodiment, at the timing t41 the operation output signal Vout is returned to the reference voltage Vref(2.0V). If a larger vibration is applied, the upper or lower limit of the output dynamic range is again exceeded plural times. In this case, by repeating the process of the timing t41 or t43, the vibration several times as large as or larger than in the prior-art vibration detecting device can be detected.

In the sixth embodiment of the invention, from the monitored value (voltage value) V1 immediately before the D/A converter 67b is operated (at the point K of the timing t41 or the point M of the timing t43) and the monitored value (voltage value) V2 immediately after the operation (at the point L of the timing t42 or the point N of the timing t44), the voltage variation (voltage difference) V1−V2 is computed. Subsequently, based on the voltage difference V1−V2, the MCU 65 joints the operation output signal Vout to calculate the compensated operation output signal Vout'. As a result, different from the prior-art vibration detecting device, even the vibration which far exceeds the output dynamic range can be detected substantially in real time by calculating the compensated operation output signal Vout'. Also, the vibration detecting resolution and the ratio S/N of the compensated operation output signal Vout' can be maintained. Further, to enlarge the dynamic range of the detectable vibration, the amplification factor of the circuit 63 shown in FIG. 12 can be raised, thereby enhancing the detecting resolution and S/N.

In the sixth embodiment, the variation V1−V2 of the operation output signal Vout is naturally determined, when the properties of the D/A converter 67b, the resistance of the resistors R65 and R66 and the voltage value of the reference voltage Vref2 are known. For this, without monitoring the voltage value of the timing t42(t44) shown in FIG. 17, the voltage of the point L(N) can be determined from the voltage variation C(C') of the output signal Vda1 and the potential of the point K(M). Conversely, from the potential of the point L(N), a precise potential of point K(M) can be determined. The process is thus facilitated.

Based on the voltage variations C and −C' of the output signal Vda1 and the resistors R65 and R66, the MCU 65 calculates a variation V1−V2 of the operation output signal Vout in following equations (10) and (11).

$$V1-V2 = C \times (\text{resistance of } R66)/(\text{resistance of } R65) \quad (10)$$

$$V1-V2 = -C' \times (\text{resistance of } R66)/(\text{resistance of } R65) \quad (11)$$

Based on calculation results of the equations (10) and (11), the MCU 65 can perform the arithmetic operations of S2306 and S2308.

In the sixth embodiment, as shown in FIG. 12, the reference power of the A/D converter 65a and the D/A converter 67b has the same reference voltage Vref2. Therefore, even if the ratio of the resistors R65 and R66 is constant and the D/A converter 67b changes the output signal Vda1 by the predetermined digital value of, for example, 1LSB, the variation of the A/D converted digital value can always be constant regardless of the variation in reference voltage Vref2. As a result, even when the reference voltage Vref2 varies among the individual vibration detecting devices and even when a change with an elapse of time occurs, the variation in the A/D conversion quantity can always be kept constant relative to the variation of the output signal Vout. Therefore, the variation in reference voltage Vref2 does not influence the value of the variation V1−V2 calculated in the equations (10) and (11), and an error in the compensated operation output signal Vout' does not occur.

Seventh Embodiment

Figure 18:
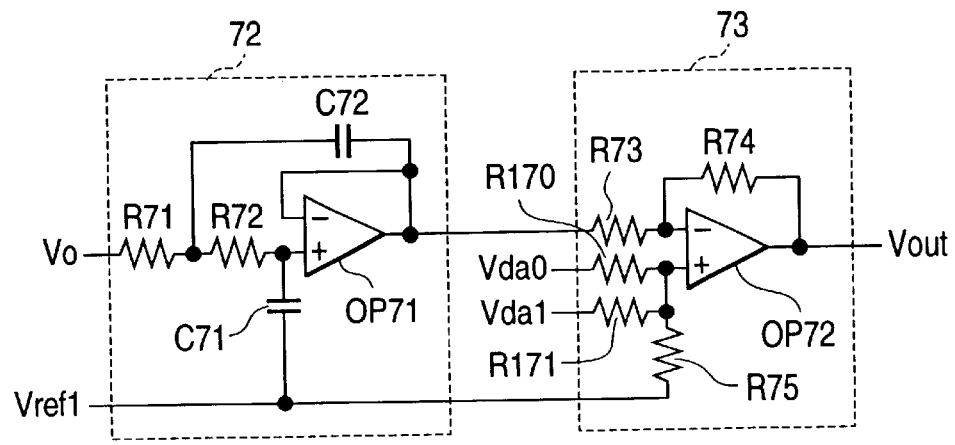
FIG. 18 is a circuit diagram showing a portion of a vibration detecting circuit in a vibration detecting device according to a seventh embodiment of the invention.

FIG. 18 shows a portion of a vibration detecting circuit in a vibration detecting device according to a seventh embodiment of the invention.

The seventh embodiment provides another embodiment of the circuits 62 and 63 shown in FIG. 12. In the seventh embodiment, the circuit 63 of the sixth embodiment is constituted of a subtracter instead of an adder.

A circuit 72 is a secondary low pass filter circuit which removes from the vibration detecting signal Vo of the vibration sensing gyroscope 61 a high-frequency component which is not caused by the vibration. In the same manner as the circuit 62 shown in FIG. 12, the circuit 72 is constituted of resistors R71 and R72, capacitors C71 and C72 and an operational amplifier OP71.

A circuit 73 is a subtracting amplifier circuit which subtracts output signals Vda0 and Vda1 from the output of the circuit 72 and which transmits to an MCU 65 the operation output signal which is inverting-amplified (including a gain of one time) by an operational amplifier OP72.

By appropriately setting the resistance of resistors R73, R170, R171 and R74, the output of the circuit 72 and the subtracting ratio and gain of the output signals Vda0 and Vda1 are determined by a sensitivity of the vibration sensing gyroscope 61, the properties of the output signal generator 67, the necessary dynamic range, the resolution and the like.

In the seventh embodiment, at S2208 and S2216 shown in FIGS. 13 and 14, the MCU 65 determined whether or not the operation output signal Vout is 2.0V or less. Also, at S2303, when the monitored value V1 is level H or more, the output signal Vda1 is changed by −C' from the present output signal Vda1. When the monitored value V1 is of the level L or less, the output signal Vda1 is changed by +C from the present output signal Vda1. As a result, the same operation as that of the vibration detecting device according to the sixth embodiment can be performed.

Eighth Embodiment

Figure 19:
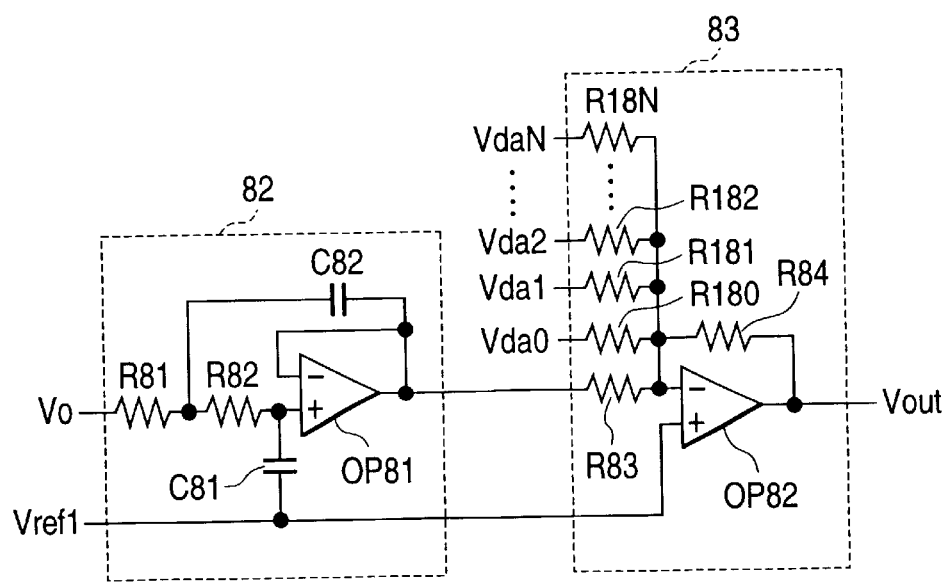
FIG. 19 is a circuit diagram showing a portion of a vibration detecting circuit in a vibration detecting device according to an eighth embodiment of the invention.

FIG. 19 shows a portion of a vibration detecting circuit in a vibration detecting device according to an eighth embodiment of the invention.

The eighth embodiment provides another embodiment of the circuits 62 and 63 shown in FIG. 12. In the eighth embodiment, the number of the adding inputs of the circuit 63 shown in FIG. 12 is set to 3 (three) or more.

A circuit 82 is a secondary low pass filter circuit which removes from the vibration detecting signal Vo of the vibration sensing gyroscope 61 a high-frequency component which is not caused by the vibration. In the same manner as the circuit 62 shown in FIG. 12, the circuit 82 is constituted of resistors R81 and R82, capacitors C81 and C82 and an operational amplifier OP81.

A circuit 83 is an adding amplifier circuit which adds output signals Vda0, Vda1, Vda2, . . . , VdaN and an output of the circuit 82 and which causes an operational amplifier OP82 to perform an inverting amplification (including a gain of one time). The circuit 83 is constituted of resistors R83, R180, R181, R182, . . . , R18N, the arithmetic amplifier OP82 and an adder having (N+2) input which replaces an adder having three inputs in the circuit 63 shown in FIG. 12. The circuit 83 transmits the operation output signal Vout to the MCU 65.

Based on operation signals S0, S1, S2, . . . , SN generated from the operation signal generator 65b, the output signal generator 67 generates N+1 output signals Vda0, Vda1, Vda2, . . . , VdaN. The output signal generator 67 is constituted of a D/A converter having N+1 outputs or N+1 D/A converters.

By appropriately setting the resistances of resistors R83, R180 and the like, the output of the circuit 82 and the subtracting ratio and gain of the output signals Vda0, . . . , VdaN are determined based on the sensitivity of the vibration sensing gyroscope 61, the properties of the output signal generator 67 and the like.

In the eighth embodiment, at S2203 shown in FIG. 13, the MCU 65 operates the output signal generator 67 to vary and control the N+1 output signals Vda0, Vda1, Vda2, . . . , VdaN. Subsequently, the MCU 65 adjusts the operation output signal Vout to the adjustment target voltage. Further, at S2303 shown in FIG. 16, when the operation output signal Vout exceeds the dynamic range, the MCU 65 operates the output signal generator 67. Subsequently, the MCU 65 varies and controls either one or plurality of the N+1 output signals Vda0, Vda1, Vda2, . . . , VdaN to return the operation output signal Vout to the adjustment voltage.

By selecting the circuit of the seventh embodiment or the eighth embodiment, the circuit can be advantageously designed with giving a weight on performance or cost.

Examples of Possible Modifications

The aforementioned first to eighth embodiments can be variously modified or changed within a scope of the invention. Also, specific numerical values or circuit constitutions are not limited to the numerical values or the circuits according to the embodiments.

In the first embodiment, the circuits 12 and 13 are constituted with the reference voltage of 0V. For example, the circuit shown in FIG. 4 can be constituted centering on the reference voltage Vref1 from the vibration sensing gyroscope 11 or the corresponding reference potential. In this case, while the analog switch SW11 is turned on, the voltage value is returned to a voltage having an approximate value of the reference voltage Vref1, not to 0V.

From the second to eighth embodiments, by operating the D/A converter 27 or the output signal generator 67, as shown in FIGS. 8 and 17, the operation output signal Vout is returned to the reference voltage Vref(2.0V). It does not need to be returned precisely back to 2.0V.

The returned voltage is not limited to 2.0V. For more effective use, in accordance with an input range of the A/D converter 25a or 65a, the voltage variations K, K', C and C' can be set to optional voltage values. For example, by returning to a middle of an output range of the operational amplifiers OP22, OP32 and OP62, the output dynamic range of the operation output signal Vout can be more effectively used.

Further, to change the output signals VDA and Vda1, absolute values of the voltage variations K, K', C and C' may coincide with one another or differ from one another.

In the second to eighth embodiments, as shown in FIGS. 6 and 15, the operation output signal Vout upon turning-on of power supply is adjusted to 2.0V. However, the adjustment target voltage may be easily changed to an optional voltage value without changing the circuit. For example, by changing software of the MCUs 25 and 65 corresponding to S208, S2208, S2216, the voltage value can be easily changed. Thereby, even if the reference voltage Vref1 of the circuits 22, 23, 62 and 63 is deviated to the upper or lower limit of the output dynamic range of the operation output signal Vout, the operation output signal Vout can be adjusted to the voltage irrespective of the deviation. As a result, the target voltage value of the operation output signal Vout upon turning-on of power supply can be adjusted to the middle of the output dynamic range in accordance with an output mode of the circuits 23 and 63. Also, the problem related with the output dynamic range of the vibration to be detected and the detecting resolution can be solved to some extent.

In the second to eighth embodiments of the invention, the interval interrupt process is performed by the MCU 25 or 65. Except the interval interrupt process, a continuous monitor process can be adopted.

In the sixth to eighth embodiments, the D/A converters 67a, 67b and the like can be constituted of a single one-chip IC.

Also, the operation signals S0 and S1 of the operation signal generator 65b do not need to be two signals. Two output signals Vda0 and Vda1 of the D/A converters 67a and 67b can be varied and controlled with a single operation signal.

In the sixth to eighth embodiments, when the operation output signal Vout exceeds an output range, only the D/A converter 67b is varied and controlled by the MCU 65 to generate the output signal Vda1. However, both the D/A converters 67a and 67b can be varied and controlled to generate the output signals Vda0 and Vda1.

The ratio of the resistors R64 and R65 is not limited to 1:256. The ratio can be set to a known ratio such as $1:2^k$ (k=1, 2, 3, . . . ) and the like. In this case, the ratio of the variation of the output signal Vda0 or Vda1 relative to a contribution of the output signal Vda0 or Vda1 to the change in operation output signal Vout is known. Therefore, without dividing the process to the coarse adjustment of S2200 to S2212 and the fine adjustment of S2213 to S2221, the output signals Vda0 and Vda1 can be simultaneously varied, to adjust the operation output signal Vout. As a result, the time necessary for the process upon turning-on of power supply to the vibration sensing gyroscope 61 can be shortened.

In the embodiments, the A/D converters 15a, 25a and 65a are built in the MCUs 15, 25 and 65, respectively. However, the A/D converters 15a, 25a and 65a can be provided outside the MCUs 15, 25 and 65, respectively. Also in the embodiments, as a vibration detecting element, the piezoelectric vibration sensing gyroscope for detecting an angular velocity is used. However, for example, an acceleration sensor or another element which has the same problem can be used. The invention can be applied to a diversified field. The invention is not restricted to a still camera, a video camera or the like, but can be applied in a broad technical field in which vibration is detected.

In the embodiments, the low pass filter constituted of the circuits 12, 22, 32, 42, 52, 62, 72 and 82 removes from the vibration detecting signal Vo the high-frequency component which is not caused by the vibration. When the high-frequency noise can be ignored, these circuits can be omitted. For example, the vibration detecting signal Vo can be transmitted directly to the operation portions 13, 23, 33, 43, 53, 63, 73 and 83.

Further, in the embodiments, the circuits 12, 22, 32, 62, 72, 82 and the circuits 13, 23, 33, 62, 72, 83 are constituted on the basis of the reference voltage Vref which is emitted from the vibration sensing gyroscopes 11, 21, 61. However, without using the output of the vibration sensing gyroscopes 11, 21 and 61, an appropriate potential can be applied from the outside. For example, the voltage value of the reference voltage Vref2 is set to an appropriate voltage by dividing a voltage with resistors. Alternatively, the equivalent of the constant-voltage regulator 16 or 66 can be used. Further, as shown in FIG. 1, these circuits can be constituted on the basis of GND.

In the aforementioned embodiments, when the operation output signal exceeds the predetermined range, the operation output signal is returned into the predetermined range. Therefore, the operation output signal which exceeds the predetermined range can be detected, while the detecting resolution can be enhanced. Also, by compensating the operation output signal, the operation output signal which exceeds the predetermined range can be detected in real time. Further, the operation output signal can be adjusted to the predetermined reference level or its vicinity without being influenced by the time constant.

Ninth Embodiment

Figure 26:
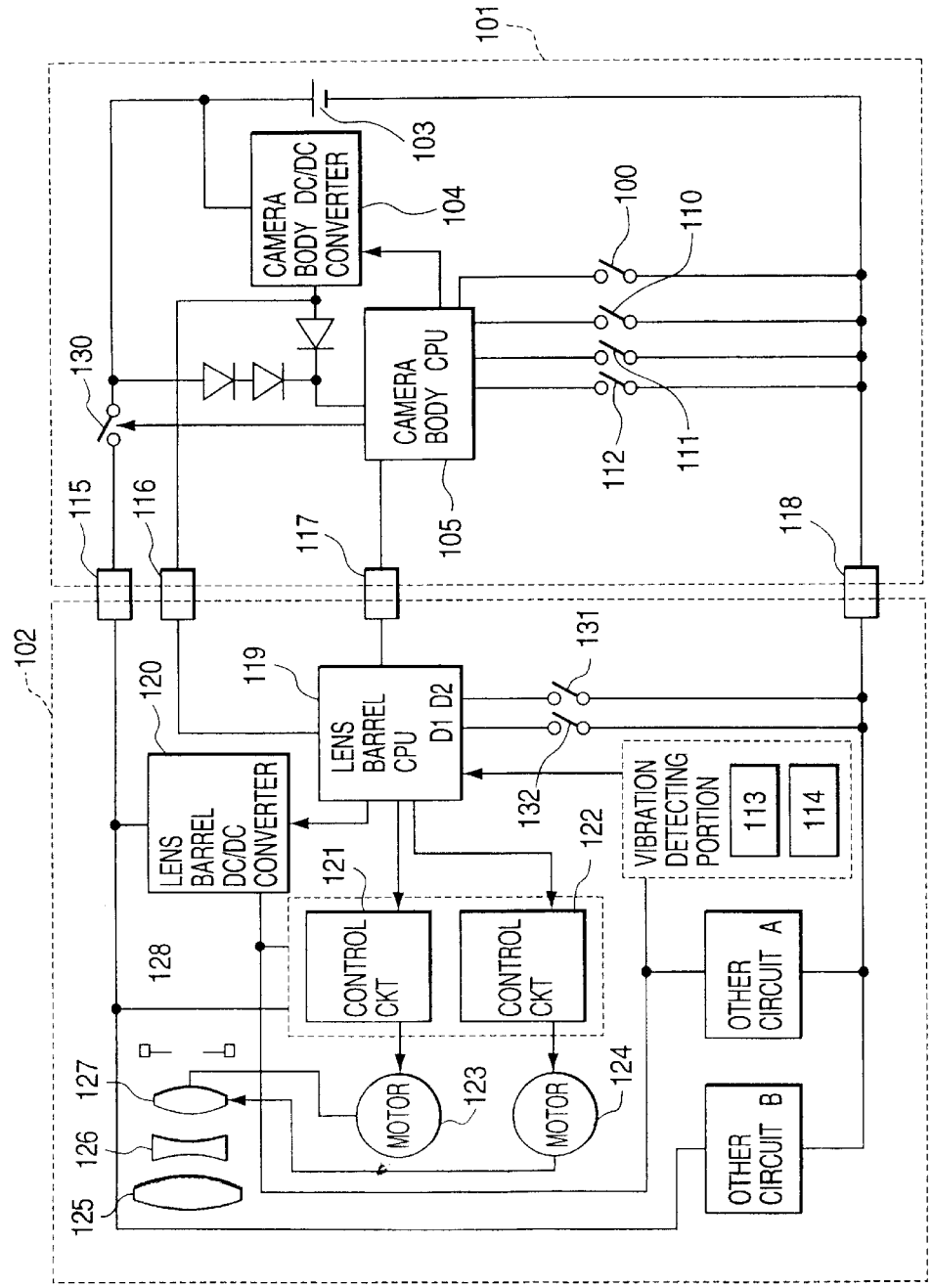
FIG. 26 is a block diagram showing an example of a camera provided with a vibration reduction device.
Figure 27:
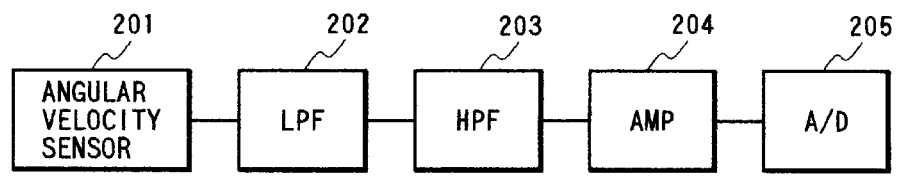
FIG. 27 is a block diagram showing an example of a vibration detecting circuit in a prior-art vibration reduction device.

Further embodiment of the invention is described with reference to the drawings. Here, a vibration reduction device applied to the camera shown in FIG. 26 is described.

Figure 22:
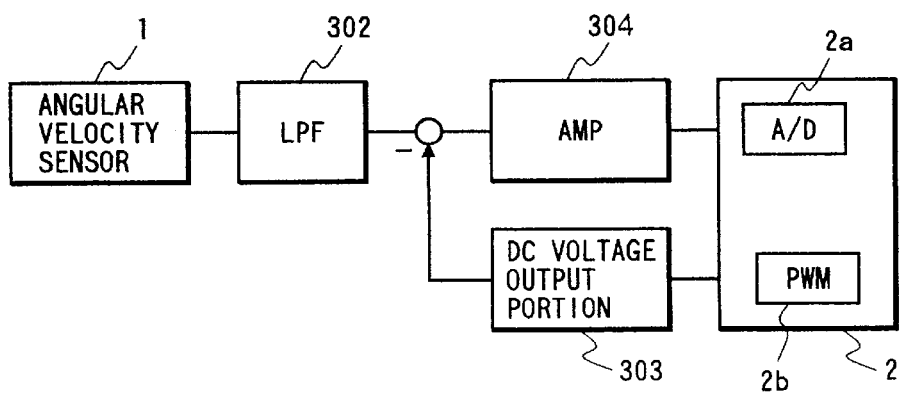
FIG. 22 is a block diagram showing a vibration detecting circuit in a vibration reduction device according to a ninth embodiment of the invention.

FIG. 22 is a block diagram showing a vibration detecting circuit in a vibration reduction device according to a ninth embodiment of the invention.

The vibration detecting circuit according to the ninth embodiment is, as shown in FIG. 22, constituted of an angular velocity sensor 1 for detecting vibration and outputting an output signal (output voltage) in accordance with a quantity of the vibration, an LPF 302 connected to the angular velocity sensor 1 for blocking a high-frequency component of the output signal of the angular velocity sensor 1, an amplifier 304 connected to the LPF 302 for amplifying an output signal of the LPF 302 and a CPU 2 connected to the amplifier 304 and having therein an A/D converter 2a for receiving an output signal of the amplifier 304. A pulse width modulation controller (hereinafter, referred to as the PWM controller) 2b built in the CPU 2 is connected to a DC voltage output portion 303. The DC voltage output portion 303 outputs a DC voltage to provide a negative feedback relative to an input of the amplifier 304, and the amplifier 304 adds (or subtracts dependent on a sign) the DC voltage and the output voltage of the angular velocity sensor 1 to perform an amplification.

The lens-barrel CPU 119 (FIG. 26) instructs the control circuits 121 and 122 to drive the motors 123 and 124 based on the DC voltage amplified by the amplifier 304 and the output voltage of the angular velocity sensor 1. The vibration reduction lens 127 is driven by the motors 123 and 124 to compensate the vibration. The vibration detecting circuit is DC-coupled from the entrance to the exit, and the amplifying signal voltage depends on the output voltage.

Figure 23:
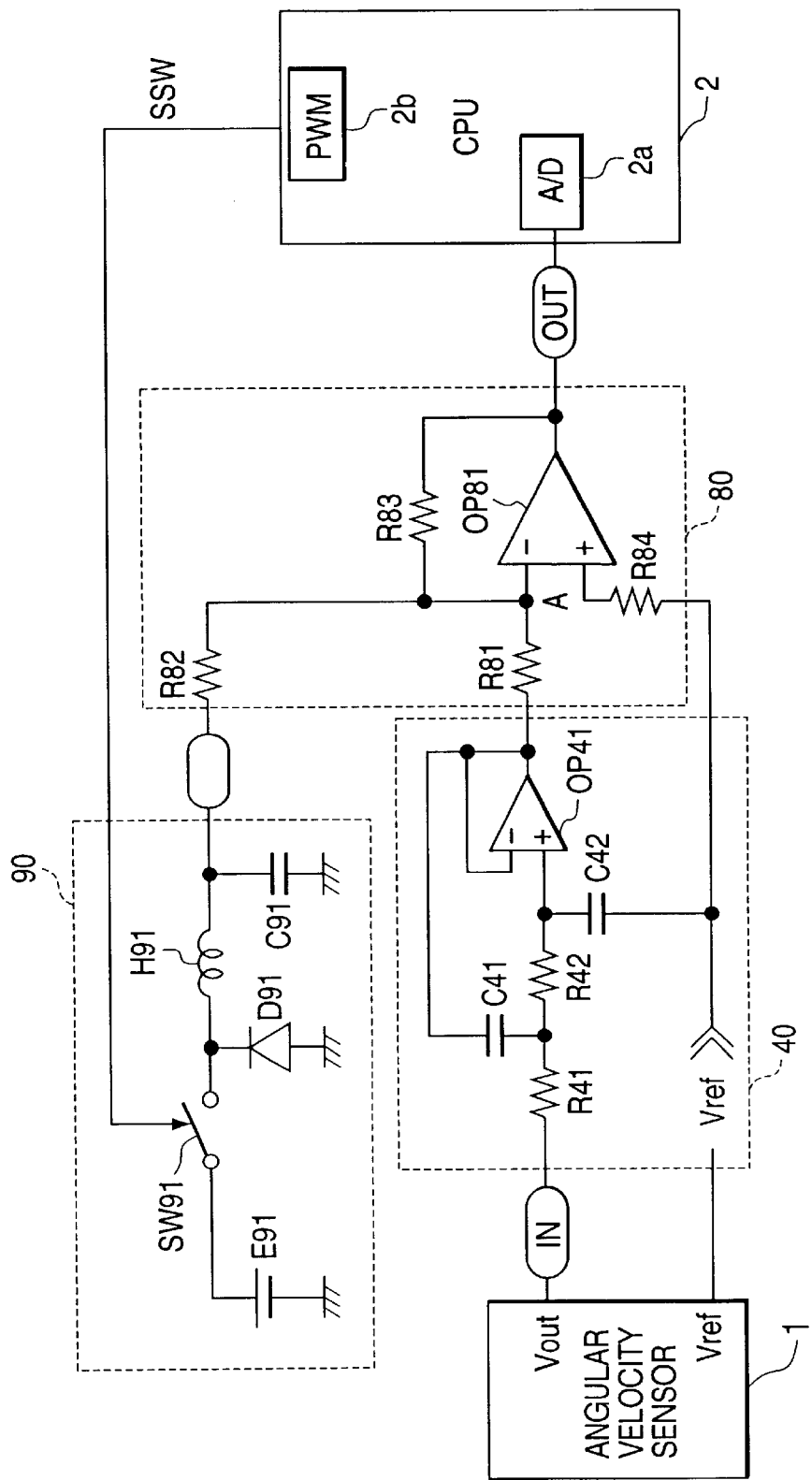
FIG. 23 is a circuit diagram showing the vibration detecting circuit in the vibration reduction device of the ninth embodiment.

FIG. 23 is a block diagram showing a vibration detecting circuit in a vibration detecting device according to the ninth embodiment.

The vibration detecting circuit shown in FIG. 23 is provided with the angular velocity sensor 1 for detecting vibration and outputting an output voltage in accordance with the vibration quantity; a secondary LPF 40 constituted of resistors R41 and R42, capacitors C41 and C42 and an operational amplifier OP41; a DC voltage output circuit 90 constituted of an LPF formed by an inductor H91 and a capacitor C91, a constant-voltage DC power supply E91, a switch SW91 and a diode D91; an adding amplifier circuit 80 constituted of an adder formed by resistors R82 and R83, resistors R81 and R84 and an operational amplifier OP81; and the CPU 2 having therein the A/D converter 2a receiving the output voltage of the adding amplifier circuit 80 and the PMW portion 2b for generating an operation signal SSW.

Specifically, in the vibration detecting circuit shown in FIG. 23, constants are actually set as follows, R41:47 kΩ, R42:47 kΩ, R81:4.7 kΩ, R82:9.1 kΩ, R83:470 kΩ, R84:3.0 kΩ, C41:0.01 µF, C42:4700 pF.

Operation of the vibration detecting circuit in the vibration reduction device according to the ninth embodiment is now described.

Figure 30:
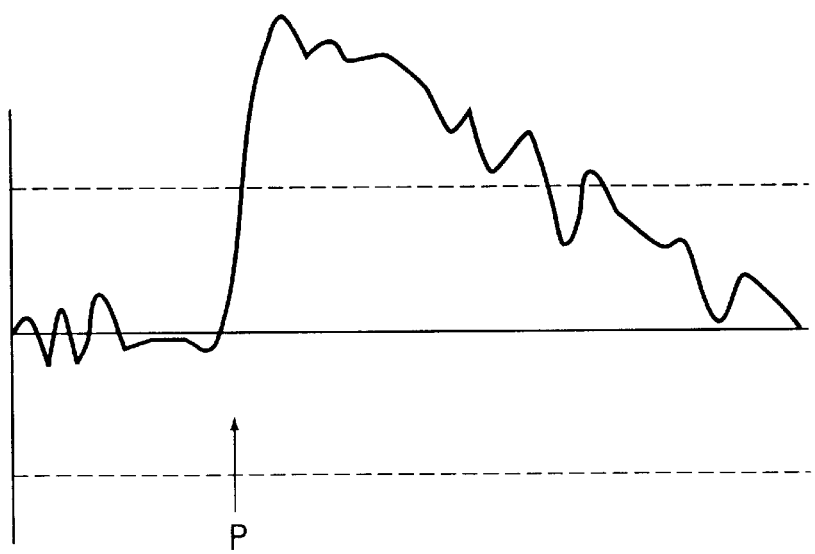
FIG. 30 is a diagrammatic representation showing a condition in which an output voltage of an angular velocity sensor exceeds a dynamic range.
Figure 31:
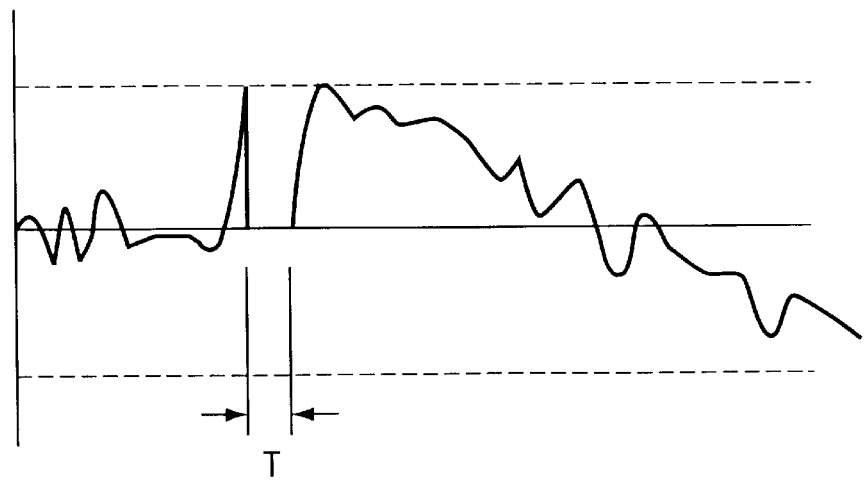
FIG. 31 is a diagrammatic representation showing a condition in which the output voltage of the angular velocity sensor is returned into the dynamic range.

The high-frequency component of the output voltage corresponding to the vibration quantity detected by the angular velocity sensor 1 is blocked by the next step of LPF 40. Only the signal in the predetermined band is amplified in the adding amplifier circuit 80 with a gain of 40 dB. The output voltage of the adding amplifier circuit 80 is transmitted to the A/D converter 2a of the CPU 2. If the angular velocity sensor 1 is subjected to an excessively large vibration, the output voltage of the adding amplifier circuit 80 cannot be suppressed with the dynamic range. For example, when the angular velocity sensor 1 is subject to the vibration having an output waveform shown in FIG. 30, the output waveform exceeds the angular velocity in the dynamic range of the circuit by ±15 deg/sec. In this condition, the circuit output is not normal, and after the output waveform is saturated, the circuit will not function. As shown in FIG. 30, when the angular velocity sensor 1 outputs an excessively large signal in a plus direction, the output voltage of the operational amplifier OP41 at the output step of the LPF 40 is transmitted to the operational amplifier OP81 at the next inverting amplification step with the same polarity, because the gain is 0 dB. The operational amplifier OP81 which has received the excessively large voltage tends to cause a current to flow into an imaginary short point A.

The CPU 2 monitors the A/D value of the output voltage of the adding amplifier circuit 80 transmitted to the A/D converter 2a. At the moment the relative magnitudes of the monitored value and the predetermined value (i.e. which is larger) changes, the CPU 2 determines that the output voltage of the adding amplifier circuit 80 may exceed the dynamic range, and instructs the PWM controller 2b to generate the operation signal SSW. When the SW91 is turned on and off based on the operation signal SSW, the output voltage of the constant-voltage DC power supply E91 is converted to a rectangular wave. The rectangular wave has its effective voltage value determined by a ratio (referred to as the duty) between the on-time and off-time of the switch SW91. The next LPF constituted of the inductor H91 and the capacitor C91 converts the rectangular wave to a smooth DC voltage. At the moment the switch SW91 changes from on to off, the diode D91 provides a path for energy accumulated as a current in the inductor H91.

At the moment the relative magnitude between the monitored value and the predetermined value changes, the CPU 2 changes the duty of the PWM controller 2b to a predetermined value. As a result, an effective area per cycle of the rectangular wave while the switch SW91 is turned on is changed, so that the DC output voltage value can be varied. To provide the substantially same effect as the effect which is obtained by the negative feedback, the DC voltage outputted from the DC voltage output circuit 90 is added to (subtracted from in the case of a negative sign) the output voltage of the LPF 40 with a gain which is determined by the resistors R82 and R83. Thereby, the current which tends to flow in the imaginary short point A is absorbed by the DC voltage output circuit 90 connected to the resistor R82. As a result, the level of the output voltage of the adding amplifier circuit is shifted before the output voltage exceeds the dynamic range or becomes saturated. The output voltage of the angular velocity sensor 1 is amplified to the reference voltage Vref of the angular velocity sensor 1 or its vicinity. Further, when the DC output voltage value emitted from the DC voltage output circuit 90 is lower than the reference voltage Vref, the current which is going to flow into the imaginary short point A can be absorbed by the DC output voltage value. The DC output voltage value can be decreased by shortening the on-time (duty ratio) of the switch SW91.

Figure 32:
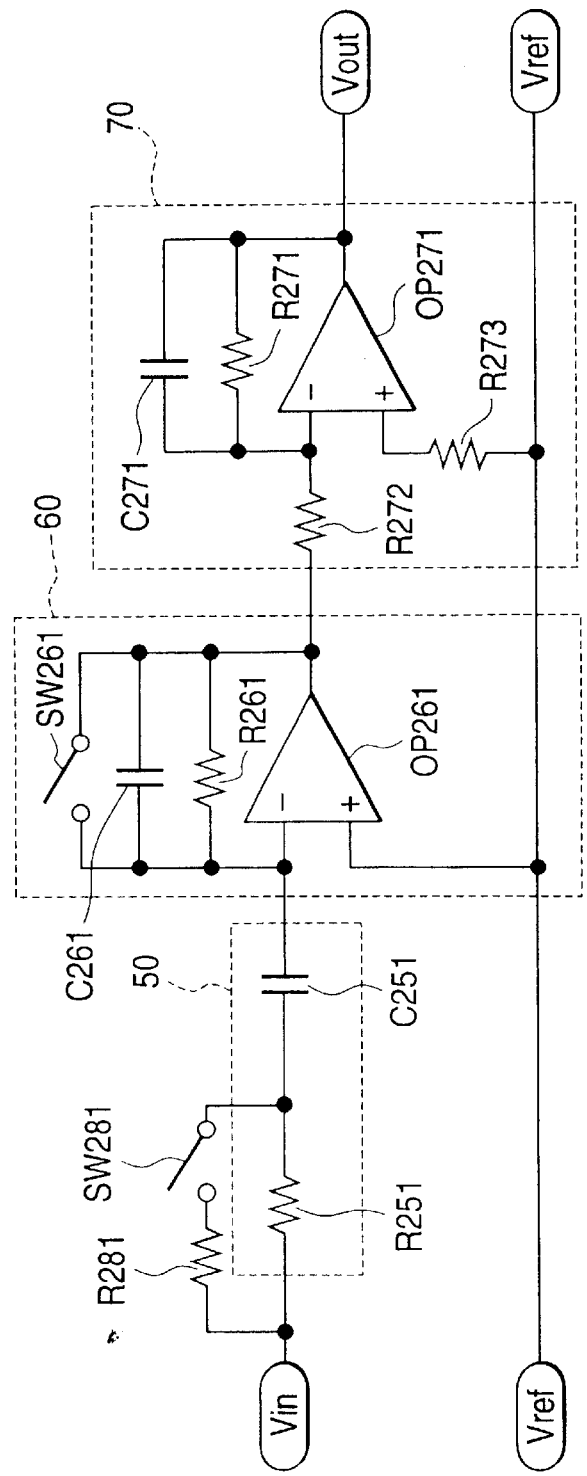
FIG. 32 is a circuit diagram showing another example of a vibration detecting circuit of a vibration reduction device.

In the ninth embodiment, different from the prior-art vibration detecting circuit shown in FIG. 32, not by charging and discharging electricity to and from the AC-coupled capacitor C51, but by varying the DC output voltage value of the DC voltage output circuit 90, the level of the output voltage of the adding amplifier circuit 80 can be shifted. In the ninth embodiment, the DC voltage corresponding to the final output value of the amplifier 304 is added to the amplification input stage of the amplifier 304 for processing the output voltage of the angular velocity sensor 1. For this, in the ninth embodiment there can be provided a circuit in which the input offset component of the operational amplifier does not need to be adjusted. Also, as the operational amplifier for amplifying the output voltage of the angular velocity sensor 1, an inexpensive component having a large offset can be used, and an amplifying function can be realized without adjusting the input offset component.

In the ninth embodiment, when an angular velocity sensor is subjected to an excessively large vibration, the voltage to be added is changed and the output voltage can be quickly converged to the vicinity of the reference voltage before the output voltage exceeds the dynamic range. Also in the ninth embodiment, by adjusting the DC voltage value to be added before the output voltage becomes saturated, a signal can always be captured in the dynamic range. In the ninth embodiment, by changing the duty between the on and off operations of the switch SW91, the DC voltage to be added can be varied. Therefore, to generate the DC voltage value to be added, an expensive D/A converter is unnecessary. An inexpensive circuit can be advantageously provided.

Tenth Embodiment

A tenth embodiment of the invention is now described with reference to the accompanying drawings.

In the following description, the same circuit portions as those described in the ninth embodiment are denoted with the same reference numerals or characters, and the detailed description thereof is omitted.

Figure 24:
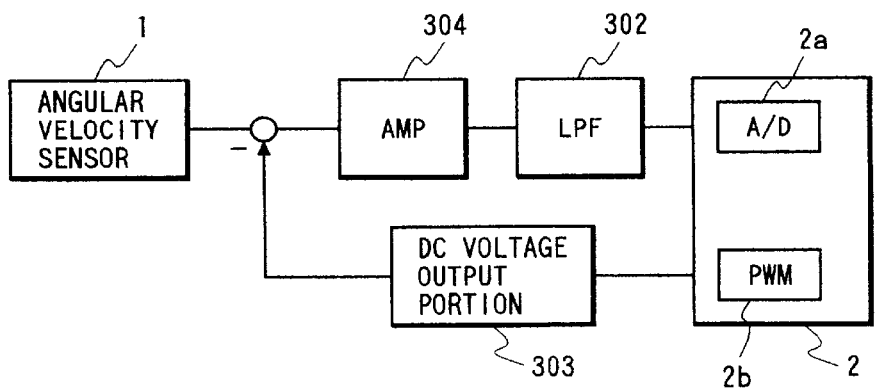
FIG. 24 is a block diagram showing a vibration detecting circuit in a vibration reduction device according to a tenth embodiment of the invention.

FIG. 24 is a block diagram showing a vibration detecting circuit in a vibration reduction device according to the tenth embodiment.

In the vibration detecting circuit of the tenth embodiment, after the output signal (output voltage) of the angular velocity sensor 1 is amplified in the amplifier 304, the high-frequency component thereof is blocked by the LPF 302. The processed signal is transmitted to the A/D converter 2a built in the CPU 2. In the tenth embodiment, when the output voltage cannot be suppressed within the dynamic range, the amplifier 304 adds (subtracts in the case of a negative sign) the output voltage of the DC voltage output portion 303 and the output voltage of the angular velocity sensor 1 to amplify. The LPF 302 removes the high-frequency component from the amplified output signal.

In the tenth embodiment, the LPF 302 is provided at the next stage of the amplifier 304, the noise component of the operational amplifier constituting the amplifier 304 can be removed by the LPF 302.

Eleventh Embodiment

An eleventh embodiment of the invention is now described with reference to the accompanying drawings.

Figure 25:
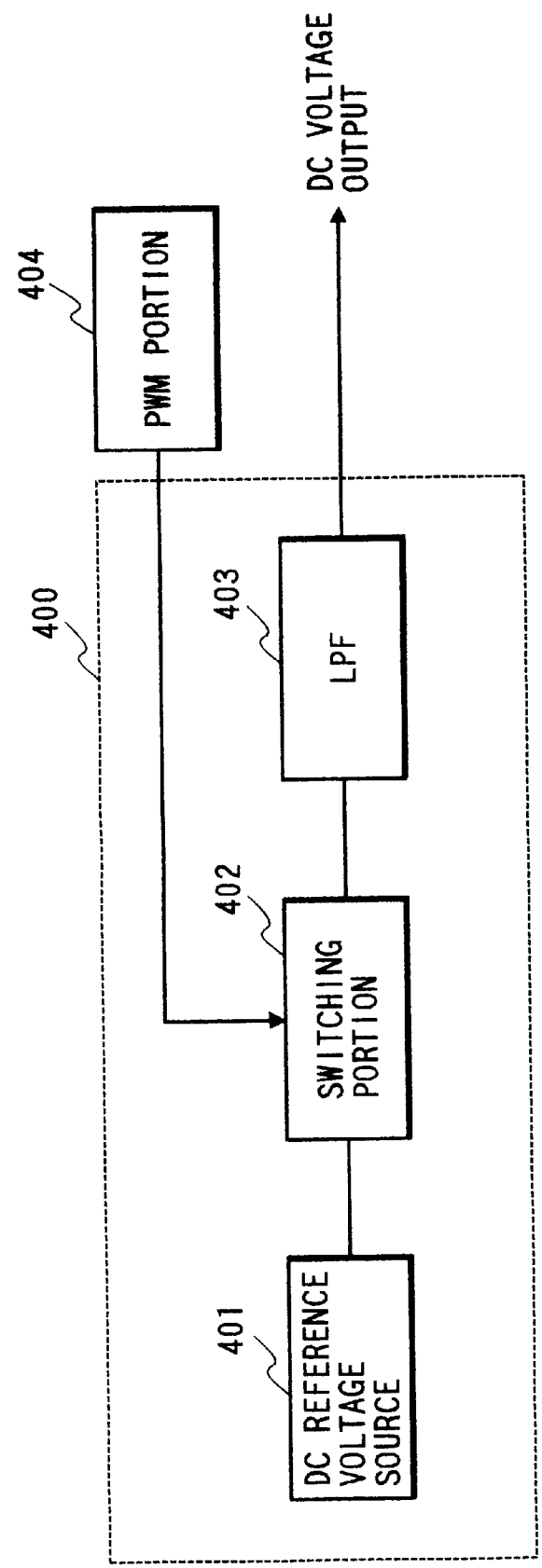
FIG. 25 is a block diagram showing a DC voltage output portion of a vibration detecting circuit in a vibration reduction device according to an eleventh embodiment of the invention.

FIG. 25 is a block diagram showing a vibration detecting circuit in a vibration reduction device according to the eleventh embodiment.

In the eleventh embodiment, a DC voltage output portion 400 is constituted of a DC reference voltage source 401, a switching portion 402 for causing a PWM controller 404 to switch an output signal (output voltage) of the DC reference voltage source 401 and an LPF 403 which removes a high-frequency component from a rectangular wave converted by the switching portion 402 to output the smoothed DC voltage.

Examples of Possible Modifications

The aforementioned ninth to eleventh embodiments can be modified or changed variously within a scope of the invention.

For example, when the CPU is not provided with the PWM controller 2b, by mounting the IC of the PWM controller 2b outside the CPU, the CPU can serve as the controller. The vibration detectors 113 and 114 are not limited to the angular velocity sensors. An acceleration sensor or another sensor can be effectively used in the invention. For example, when the angular acceleration sensor is used, first the angular acceleration signal is integrated and converted to an angular velocity signal. Further, in the embodiments, the vibration reduction device is mounted on the still camera, but the invention is effective for a video camera, a binocular, a telescope and the like.

Twelfth Embodiment

First, to facilitate the understanding, the basic concept of a vibration detecting circuit according to a twelfth embodiment is described with reference to a block diagram of a vibration detecting circuit in which a DC offset component can be suppressed.

Figure 36:
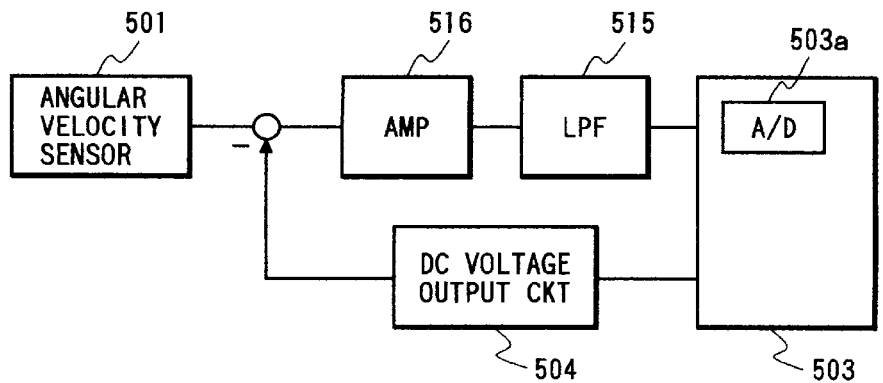
FIG. 36 is a block diagram showing an example of a vibration detecting circuit in which a DC offset component can be suppressed.

FIG. 36 is a block diagram showing an example of the vibration detecting circuit which can suppress the DC offset component.

Figure 29:
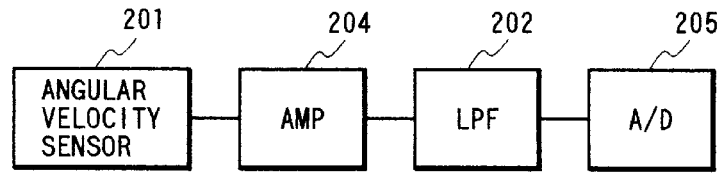
FIG. 29 is a block diagram showing another example of a vibration detecting circuit in the prior-art vibration reduction device.
Figure 28:
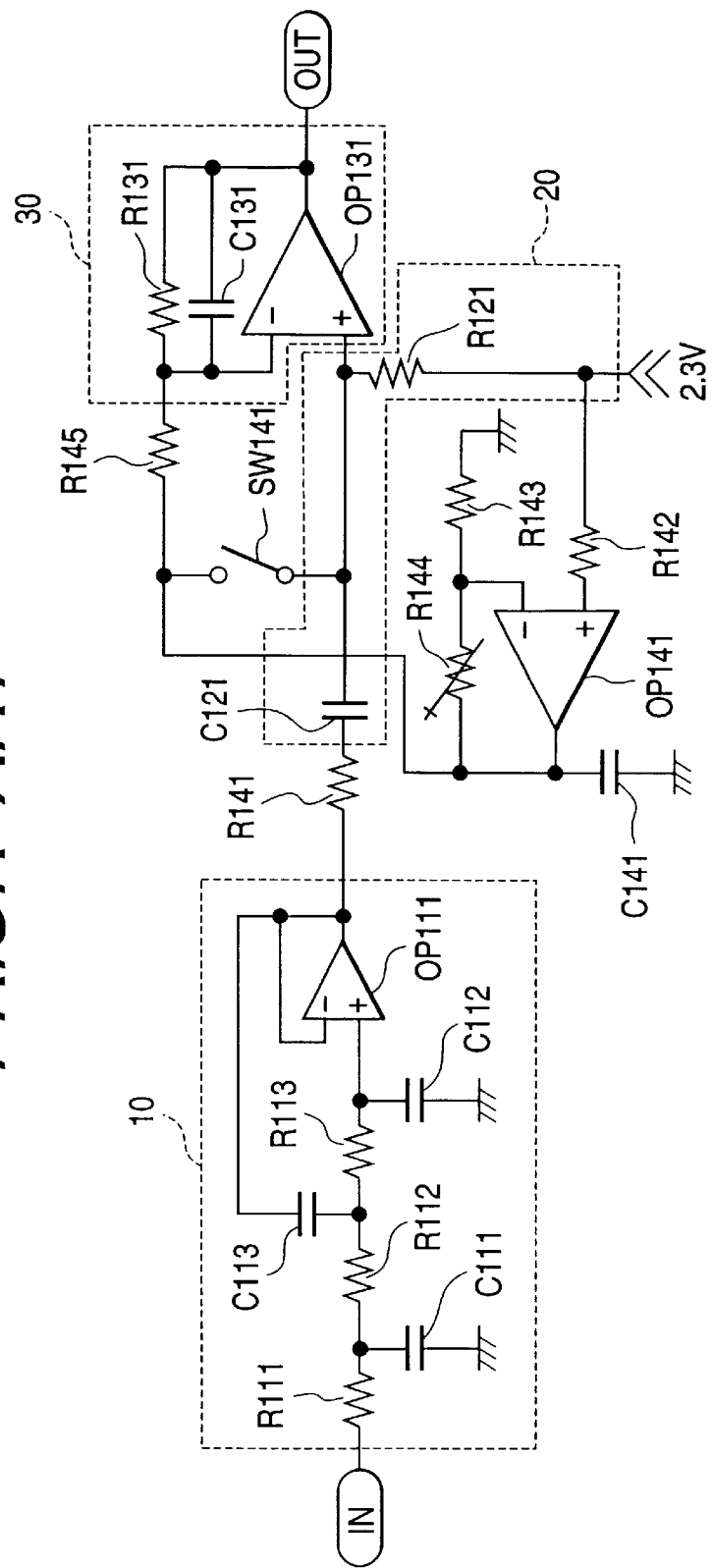
FIG. 28 is a circuit diagram showing an example of a vibration detecting circuit in the prior-art vibration reduction device.

In the vibration detecting circuit shown in FIG. 36, without providing an HPF, the DC offset component of the circuit itself can be suppressed. The vibration detecting circuit is constituted of an angular velocity sensor 501, an AMP 516 for amplifying an output signal of the angular velocity sensor 501, an LPF 515 for blocking a high-frequency component of an output signal of the AMP 516, an A/D converter 503a for converting an output signal of the LPF 515 from an analog signal to a digital signal to output the converted signal, a control circuit (CPU) 503 having therein the A/D converter 503a and a DC voltage output circuit (D/A converter) 504 for generating a direct-current (DC) voltage. In the same manner as the vibration detecting circuit shown in FIG. 29, the vibration detecting circuit is not provided with the HPF. Therefore, an error is caused by the DC offset component. However, the CPU 503 generates and transmits a control signal to the DC voltage output circuit 504, and the DC voltage output circuit 504 generates the DC voltage based on the control signal. The DC voltage subtracts the DC offset component before the AMP 516, so that the DC offset component of the vibration detecting circuit can be suppressed.

Figure 37:
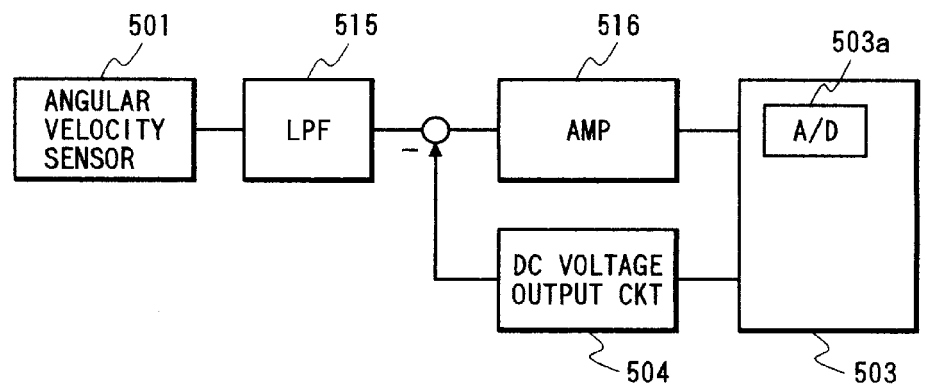
FIG. 37 is a block diagram showing another example of the vibration detecting circuit in which the DC offset component can be suppressed.

FIG. 37 is a diagram showing another example of the vibration detecting circuit in which the DC offset component can be suppressed.

In the vibration detecting circuit shown in FIG. 37, the order of the arrangement of the LPF 515 and the AMP 516 differs (reversed) from that in the vibration detecting circuit shown in FIG. 36. From the signal with its high-frequency component removed by the LPF 515, the DC voltage of the DC voltage output circuit 504 is subtracted.

Figure 38:
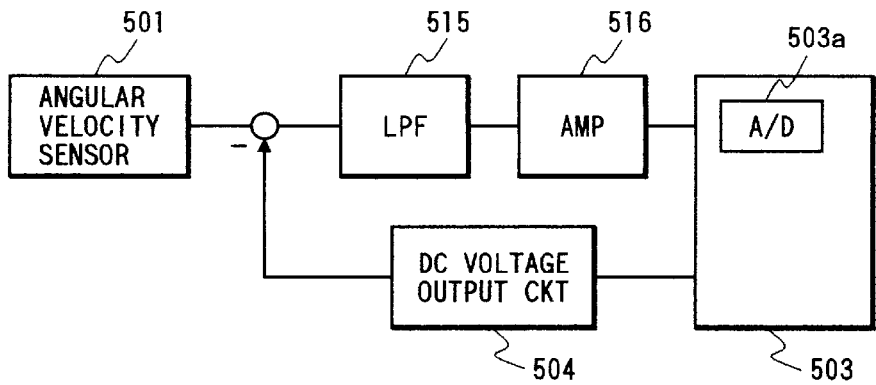
FIG. 38 is a block diagram showing further example of the vibration detecting circuit in which the DC offset component can be suppressed.

FIG. 38 is a block diagram showing another example of the vibration detecting circuit in which the DC offset component can be suppressed.

In the vibration detecting circuit shown in FIG. 38, the order of the arrangement of the LPF 515 and the AMP 516 differs (reversed) from that in the vibration detecting circuit shown in FIG. 36.

The vibration detecting circuit according to the twelfth embodiment is specifically described.

Figure 33:
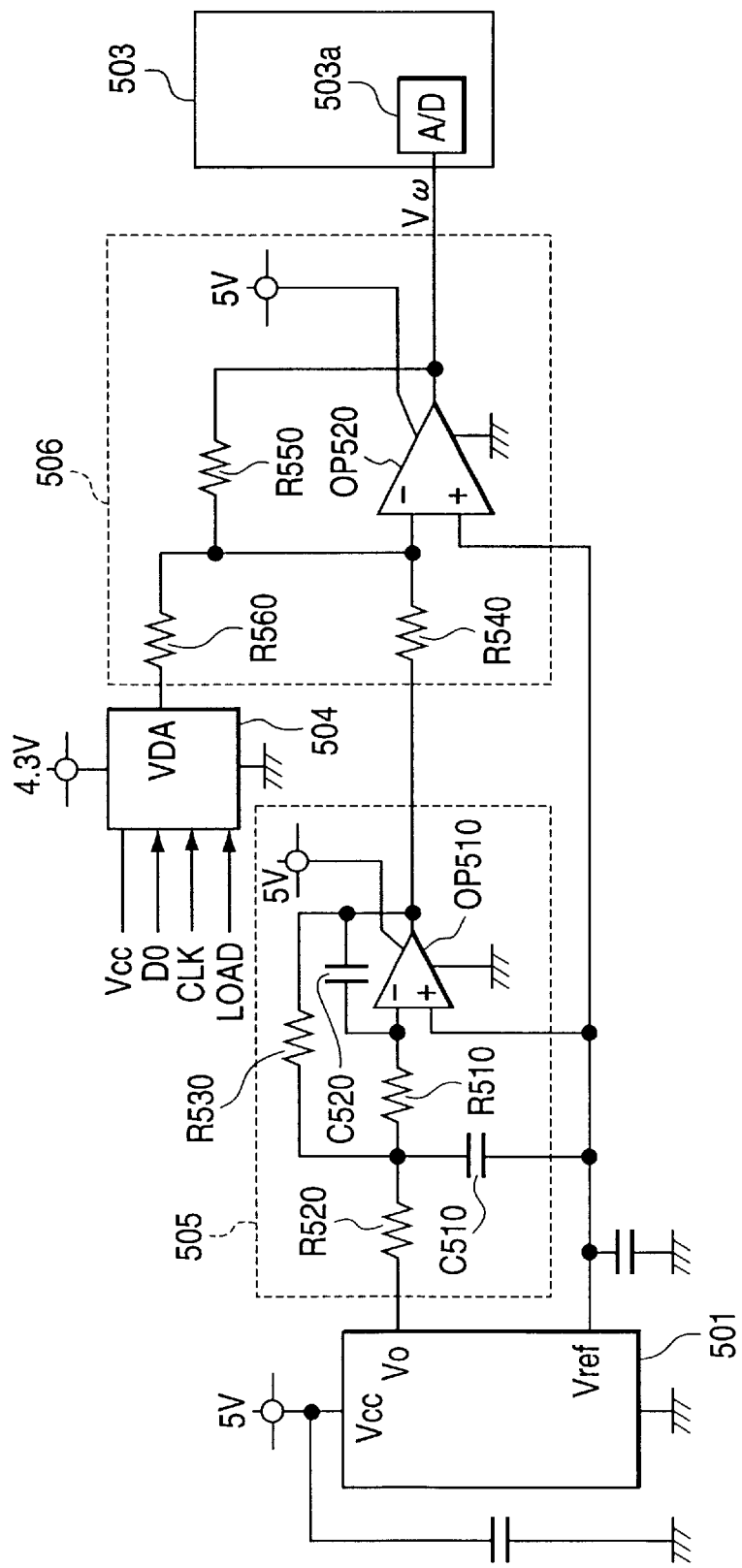
FIG. 33 is a circuit diagram showing a vibration detecting circuit according to a twelfth embodiment of the invention.

FIG. 33 is a circuit diagram of the vibration detecting circuit according to the twelfth embodiment.

In the vibration detecting circuit of the twelfth embodiment, the DC offset component can be suppressed. The vibration detecting circuit is constituted of a vibration sensing gyroscope 501 which outputs a micro output signal Vo, a circuit (LPF) 505 for blocking a high-frequency component of the output signal Vo to amplify, a D/A converter 504 for generating a DC voltage (output signal) VDA, an amplifying circuit (adder) 506 for adding an output signal of the LPF 505 and the output signal VDA of the D/A converter 504 to amplify, an A/D converter 503a for receiving an output signal of the adder 506 and the CPU 503. Since the vibration detecting circuit uses the secondary LPF 505 of a multiple feedback type, an operational amplifier OP510 has an inverting input format. In the vibration detecting circuit, constants are actually set as follows, resistor R510:47 kΩ, resistor R520:47 kΩ, resistor R530:47 kΩ, resistor R540:4.7 kΩ, resistor R550:470 kΩ, capacitor C510:0.015 µF, capacitor C520:3300 pF.

Comparative Example

A comparative example of the vibration detecting circuit according to the twelfth embodiment is now described.

Figure 39:
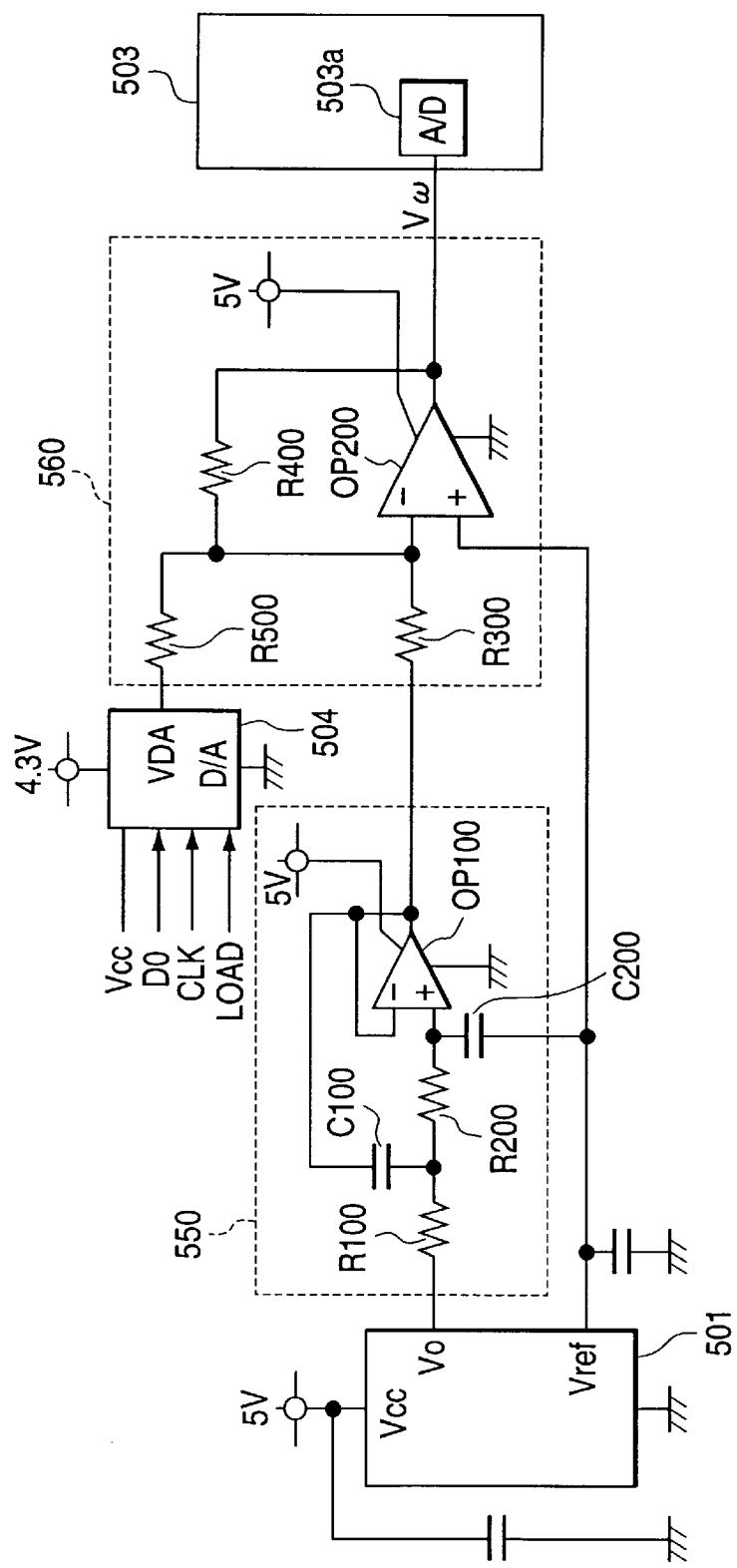
FIG. 39 is a circuit diagram showing a comparative example of the vibration detecting circuit in which the DC offset component can be suppressed.

FIG. 39 is a circuit diagram showing the comparative example of the vibration detecting circuit in which the DC offset component can be suppressed.

In the following description, the same circuit portions as those in the vibration detecting circuit shown in FIG. 33 are denoted with the same reference numerals or characters, and the detailed description thereof is omitted.

The vibration detecting circuit shown in FIG. 39 is constituted of the vibration sensing gyroscope 501, a circuit 550, a circuit 560, the CPU 503, the A/D converter 503a and the D/A converter 504. The circuit 550 is a secondary LPF constituted of resistors R100 and R200, capacitors C100 and C200 and an operational amplifier OP100 of the first stage. The circuit 560 is an adder constituted of resistors R300, R400 and R500 and 100-times operational amplifier OP200 of the second stage. In the circuit 560, a DC voltage of the D/A converter 504 is applied to the input terminal of the operational amplifier OP200. In the vibration detecting circuit, an input step of the circuit is constituted of the secondary LPF 550 of a VCVS (voltage controlled voltage source) type. Therefore, different form the vibration detecting circuit shown in FIG. 33, a non-inverting input format is used. In the vibration detecting circuit, constants are actually set as follows, resistor R100:47 kΩ, resistor R200:47 kΩ, resistor R300:4.7 kΩ, resistor R400:470 kΩ, capacitor C100:0.01 µF, capacitor C200:4700 pF.

Although the LPF 550 blocks the high-frequency component from the inputted micro angular velocity signal (output signal) Vo, a phase of a signal in a pass band is simultaneously delayed. The phase delay is preferably close to zero to cause an error in vibration reduction control. For this, the cutoff frequency of the LPF 550 is set as low as possible to a degree to which the phase delay can be ignored, and set to, for example, about 500 Hz. Subsequently, the waveform with the high-frequency component cut off is transmitted to the second step of the adder 560.

The output signal Vo indicative of the vibration quantity emitted from the vibration sensing gyroscope 501 originally includes a low-frequency signal (drift component over a long time). As shown in FIG. 39, if the output signal of the vibration sensing gyroscope 501 is multiplied by the gain in the operational amplifier OP200, the output signal Vω of the operational amplifier OP200 is saturated by a DC component having a certain value (offset component) and cannot be used. For this reason, the adder 560 subtracts the offset component, and at the amplification step the operational amplifier OP200 amplifies the signal with the offset component subtracted therefrom. The operational amplifier OP200 is an inverting amplifier and applies a 100-times gain.

When the output signal Vo of the vibration sensing gyroscope 501 is processed in the vibration detecting circuit and an excessively large signal is applied to the vibration sensing gyroscope 501, then the operational amplifier OP200 would multiply the input signal by gain before outputting. The dynamic range is limited by a power source voltage and a output circuit arrangement. Therefore, when the output signal Vω of the operational amplifier OP200 is saturated, in some case a usual vibration reduction cannot be performed immediately after an excessively large vibration occurs.

In the vibration detecting circuit shown in FIG. 39, the output signal Vo of the vibration sensing gyroscope 501 is transmitted to the LPF 550, and only the signal in the desired band is outputted from the LPF 550. The output signal of the LPF 550 is amplified by the gain of 40 dB in the amplification step constituted of the resistors R300 and R400 and the operational amplifier OP200, and transmitted to the A/D converter 503a built in the CPU 503. When there is a possibility that an excessively large vibration is applied to the vibration sensing gyroscope 501, the CPU 503 compares the monitored A/D value of the A/D converter 503a with the predetermined value. At the moment the relationship in magnitude between the values changes, the CPU 503 transmits the control signal to the D/A converter 504. As a result, the output value (output voltage value) of the D/A converter 504 is changed. The DC voltage outputted from the D/A converter 504 is added to (in the case of a negative sign, subtracted from) the output signal of the LPF 550 with the gain which is determined by the resistors R400 and R500. For this, the output signal Vω of the operational amplifier OP200 is returned to the reference point, and the same effect as the effect which is obtained by a negative feedback is substantially provided. In this manner, the adder 560 has a function of preventing the output signal Vω of the operational amplifier OP200 from exceeding the dynamic range and being saturated.

In the vibration detecting circuit shown in FIG. 39, assuming that the commercially available operational amplifier OP100 is used with the voltage of 5V, the voltage to be applied is defined, for example, as 2V to 3V by the standard. Since the operational amplifier OP100 has a non-inverting input format, as the input signals of the inverting input terminal and the non-inverting input terminal, and the input voltage also changes. When the input signal of the operational amplifier OP100 disperses, there is a possibility that the signal exceeding the standard range of, for example, 2V to 3V is inputted. Especially, the vibration sensing gyroscope 501 for detecting vibration has a large dispersion in output voltage Vo relative to the reference voltage Vref. Therefore, when the voltage Vo exceeding the input voltage range of the operational amplifier OP100 is applied, depending on the performance of the operational amplifier, the input common-mode voltage range may be exceeded.

On the other hand, in the twelfth embodiment, the reference voltage Vref having a fixed potential is applied to the non-inverting (+) input terminal of the operational amplifier OP510. Therefore, to the inverting (−) input terminal and the non-inverting (+) input terminal, because of the imaginary short, the constant reference voltage Vref is applied. Even when the input signal Vo disperses, a constant potential is maintained. As a result, it is sufficient to determine only whether or not the dispersion in input voltage of the non-inverting input terminal is within the standard. Namely, the formed circuit is not influenced by the limitation in input common-mode voltage range of the operational amplifier OP510. Also, in the twelfth embodiment, as the operational amplifier OP510, an inexpensive operational amplifier for universal use with a narrow input common-mode voltage range can be used. Therefore, without strictly regulating the standard of the output voltage range of the vibration sensing gyroscope 501, the vibration detecting function can be realized, while cost can be reduced. Further, since the vibration sensing gyroscope 501, the LPF 505 and the adder 506 are DC-coupled, the output signal Vo included in the low-frequency component can be effectively used.

Thirteenth Embodiment

Figure 34:
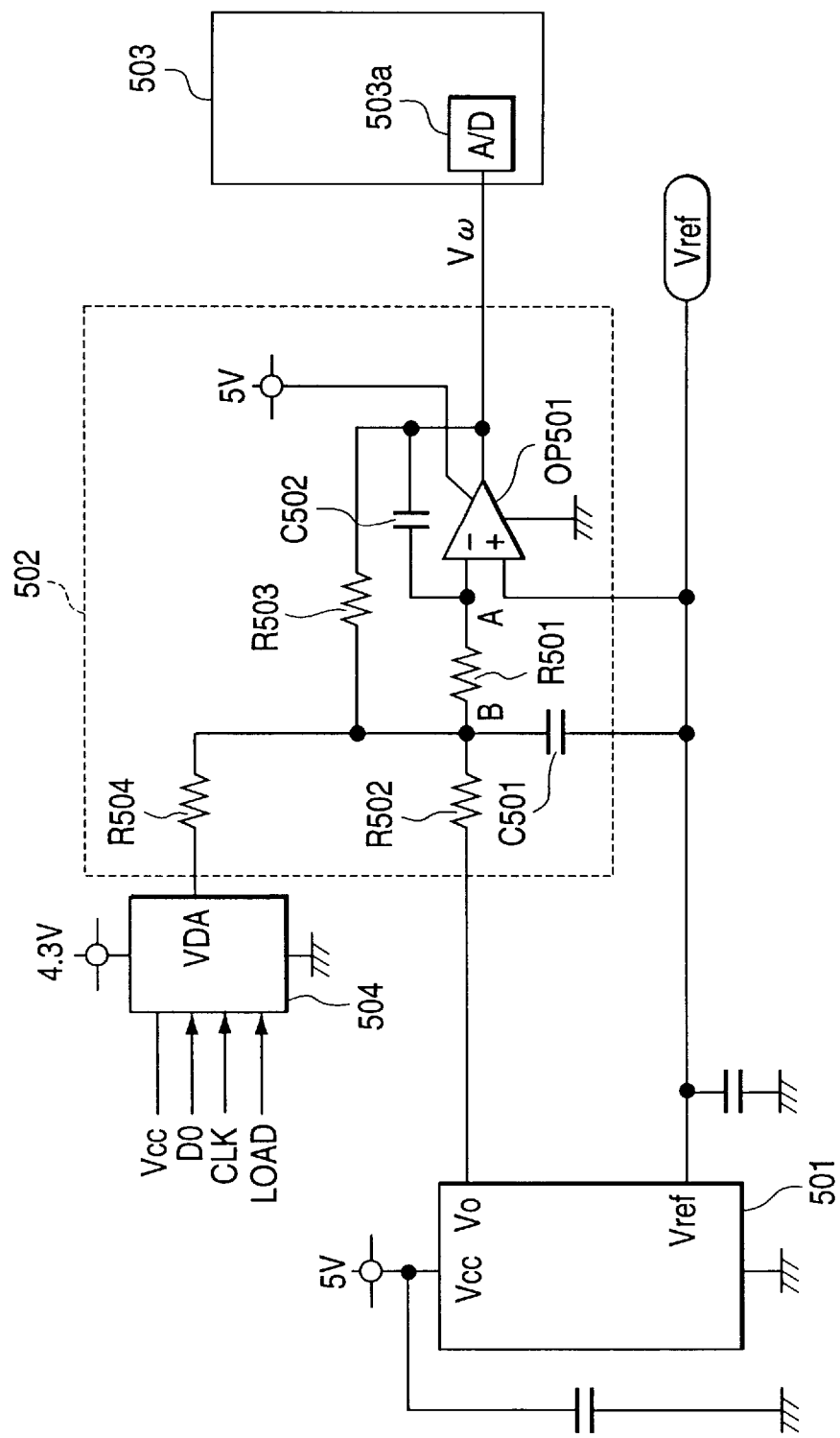
FIG. 34 is a circuit diagram showing a vibration detecting circuit according to a thirteenth embodiment of the invention.

FIG. 34 is a circuit diagram of a vibration detecting circuit according to a thirteenth embodiment of the invention.

The vibration detecting circuit of the thirteenth embodiment is constituted of the vibration sensing gyroscope 501, the D/A converter 504, a circuit 502 to which an output signal of the vibration sensing gyroscope 501 and an output signal VDA of the D/A converter 504 are transmitted, the A/D converter 503a to which an output signal of the circuit 502 is transmitted and the CPU 503. The circuit 502 is provided with an adder constituted of resistors R501, R502, R503 and R504 and an operational amplifier OP501, an LPF constituted of resistors R501, R502 and R503, capacitors C501 and C502 and an operational amplifier OP501, and the operational amplifier OP501 as an inverting amplifier.

In the vibration detecting circuit, the output signal of the operational amplifier OP501 is AC-fed back via the capacitor C502 for blocking the high-frequency component, and transmitted as a direct current to the inverting input terminal of the operational amplifier OP501. The output signal of the operational amplifier OP501 is fed back as a direct current via the resistor R503 to a junction B between the resistors R501 and R502. The non-inverting input terminal of the operational amplifier OP501 is DC short-circuited by the reference voltage Vref. The junction B is AC-connected via the capacitor C501 to the reference voltage Vref. To the junction B, the output signal VDA of the D/A converter 504 is DC-added via the resistor R504.

For the output signal Vo of the vibration sensing gyroscope 501, only the signal in the desired band is multiplied at the amplification step by the LPF and the amplifier constituted of the resistors R501 and R502, and transmitted to the A/D converter 503a. When the vibration sensing gyroscope 501 outputs an excessively large signal, the inverting amplification stage receives the excessively large voltage Vo so as to tend to flow a current to the imaginary short point A. The CPU 503 compares the monitored A/D value of the A/D converter 503a with the predetermined value, and at the moment the relative magnitude between the values is changed, transmits a control signal to the D/A converter 504. As a result, the output value (output voltage value) of the D/A converter 504 is changed to a predetermined value, and the DC voltage outputted from the D/A converter 504 is added to (in the case of a negative sign, subtracted from) the output signal Vo of the vibration sensing gyroscope 501 from the input side of the amplifier with the gain which is determined by the resistors R503 and R504. The same effect as the effect which is obtained by a negative feedback is substantially provided. The current which is going to flow into the imaginary short point A is absorbed by the circuit system connected to the resistor R503. As a result, the level of the output voltage Vω of the operational amplifier 501 is shifted, before exceeding the dynamic range and being saturated, the output voltage Vo of the vibration sensing gyroscope 501 can be amplified in the vicinity of the reference voltage Vref of the vibration sensing gyroscope 501. Further, when the value of the output voltage VDA emitted from the D/A converter 504 is lower than that of the reference voltage Vref, the current which is going to flow into the imaginary short point A can be absorbed by the output voltage VDA.

In the twelfth embodiment, there is a possibility that the gain of the circuit is influenced by the dispersions in the resistors R520 and R530 of the LPF 505. For example, when the circuit is constituted of resistors having dispersions of ±1%, in the vibration detecting circuit shown in FIG. 39, the dispersion of the gain in the LPF 550 is 0.02% or less. On the other hand, in the vibration detecting circuit of the twelfth embodiment shown in FIG. 33, the dispersion of the gain in the LPF 505 reaches 0.6% odd. The signal which have passed the LPF 505 or LPF 550 is further multiplied by gain of 100 times at the inverting amplification step. Therefore, the gain further disperses by the dispersions of resistances. The vibration detecting circuit of the twelfth embodiment is the same in constitution as the vibration detecting circuit shown in FIG. 39. Therefore, when the circuit is constituted of resistors having dispersions of ±1%, in the vibration detecting circuit of the twelfth embodiment, the dispersion of the gain in the operational amplifier OP510 reaches ±6% odd. Therefore, in the vibration detecting circuit of the twelfth embodiment, the performance in terms of the range of gain dispersion is not superior than the range in the vibration detecting circuit shown in FIG. 39 as long as the resistors of the same class are used.

The operational amplifier OP501 in the vibration detecting circuit according to the thirteenth embodiment has an inverting input format. Therefore, even when the output signal Vo of the vibration sensing gyroscope 501 disperses, there is no influence of the input common-mode voltage range. The level of the gain dispersion can be suppressed around the level in the vibration detecting circuit shown in FIG. 39. Also, in the thirteenth embodiment, by using the LPF of the multiple feedback type, the constant is set in such a manner that the signal is simultaneously multiplied by gain. Therefore, an amplifying portion separate from the LPF is unnecessary. Therefore, in the vibration detecting circuit, the function of the LPF and the function of multiplying by gain can be realized by one operational amplifier OP501. Namely, the LPF and the amplification step are integrally formed. As a result, even when the circuit is constituted of the resistors R502 and R503 having dispersions, the gain disperses only at one step of circuit block. The gain dispersion can be suppressed to a level of the gain dispersion in the vibration detecting circuit shown in FIG. 39.

Since the vibration detecting circuit of the thirteenth embodiment is constituted of one step or stage of the operational amplifier OP501, the offset error occurs only in one step of circuit block. Even when the output signal VDA of the D/A converter 504 includes an AC component (ripple), the AC component can be removed by the LPF of the circuit 502. Further, the LPF, the amplifier and the adder are integrally constituted of one operational amplifier 501. Therefore, the output signal Vo of the vibration sensing gyroscope 501 can be treated with a high quality by one operational amplifier 501 per axis. As a result, the number of the components is decreased, and the mounting space can be spared.

In the vibration detecting circuit of the thirteenth embodiment, constants are set as follows. Since the vibration detecting circuit has an inverting input format, considering the output impedance (several Ω) of the vibration sensing gyroscope 501, the resistance of the resistor R502 which determines the input impedance of the processing circuit is set relatively large. Subsequently, to set the gain which is related to the resolution to 100 times, the resistance of the resistor R503 is set 100 times that of the resistor R502. For the remaining parameters of the resistor R501 and the capacitors C501 and C502 are set such that the cut-off frequency is adjusted to the vicinity of 500 Hz, the Q value (quality factor) is adjusted to the vicinity of 0.71, and the phase delay is adjusted to the vicinity of 0.44 ms. In this case, the rated value of each component is set to the value which is not very special. The following are examples of the values which are determined as aforementioned:

resistor R501:1.8 kΩ, resistor R502:4.7 kΩ, resistor R503:470 kΩ, capacitor C501:0.15 µF, capacitor C502:680 pF, resistor R501:100 kΩ, resistor R502:4.7 kΩ, resistor R503:470 kΩ, capacitor C501:2.35 µF, capacitor C502:1000 pF, resistor R501:2.7 kΩ, resistor R502:6.8 kΩ, resistor R503:680 kΩ, capacitor C501:0.1 µF, capacitor C502:470 pF.

Fourteenth Embodiment

Figure 35:
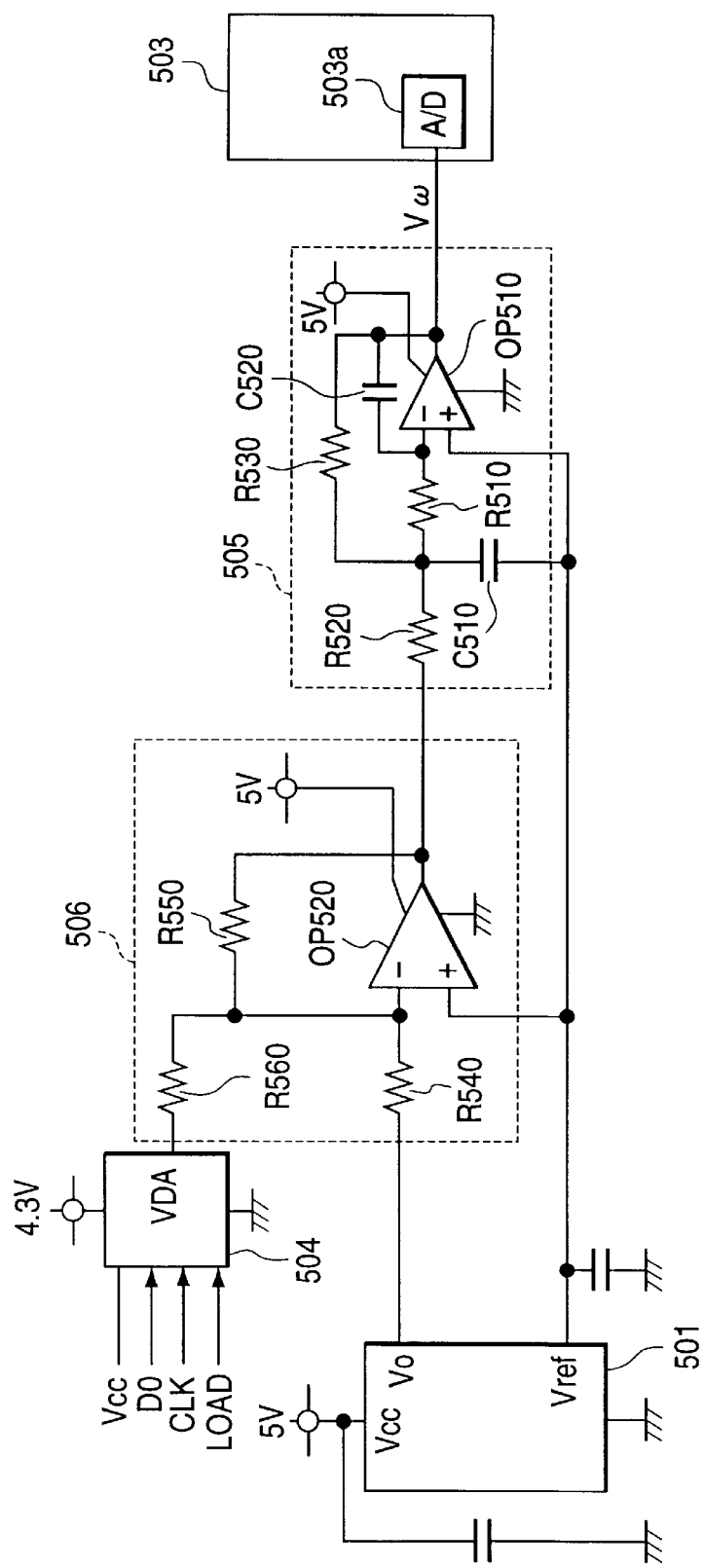
FIG. 35 is a circuit diagram showing a vibration detecting circuit according to a fourteenth embodiment of the invention.

FIG. 35 is a circuit diagram of a vibration detecting circuit according to a fourteenth embodiment of the invention.

In the vibration detecting circuit of the fourteenth embodiment, the DC offset component can be suppressed. The vibration detecting circuit is constituted of the vibration sensing gyroscope 501 for outputting a micro output signal Vo, the D/A converter 504 for generating a DC voltage (output signal) VDA, the amplifying circuit (adder) 506 for adding an output signal Vo of the vibration sensing gyroscope 501 and the output signal VDA of the D/A converter 504 to amplify, the circuit (LPF) 505 for blocking a high-frequency component of the output signal of the adder 506 to amplify, the A/D converter 503a for receiving an output signal of the LPF 505 and the CPU 503. The constants in the vibration detecting circuit are actually set as follows: resistor R510:47 kΩ, resistor R520:47 kΩ, resistor R530:47 kΩ, resistor R540:4.7 kΩ, resistor R550:470 kΩ, capacitor C510:0.015 μF, capacitor C520:3300 pF.

In the fourteenth embodiment, the reference voltage Vref having a fixed potential is applied to the non-inverting (+) input terminal of the operational amplifier OP520. As a result, it is sufficient to determine only whether or not the dispersion range in input voltage of the non-inverting input terminal is within the standard. The formed circuit is not influenced by the limitation in input common-mode voltage range of the operational amplifier OP520. Also, in the fourteenth embodiment, as the operational amplifier OP520, an inexpensive operational amplifier for universal use with a narrow input common-mode voltage range can be used. Therefore, without strictly regulating the standard of the output voltage range of the vibration sensing gyroscope 501, the vibration detecting function can be realized, while cost can be reduced. Further, since the vibration sensing gyroscope 501, the LPF 505 and the adder 506 are DC-coupled, the output signal Vo included in the low-frequency component can be effectively used.

Examples of Possible Modifications

The invention is not limited to the aforementioned embodiments, and the embodiments can be modified or changed variously within a scope of the invention.

For example, the vibration detecting circuit according to the embodiment solves a problem with the limitation of the input common-mode voltage range, appearing in relation to the vibration sensing gyroscope 501 and the processing circuit which covers the output signal Vo having a large dispersion of the vibration sensing gyroscope 501. Therefore, when the first step or stage of the processing circuit is constituted of the LPF, the input of the LPF may be in an inverting format. Further, when the first step of the processing circuit is constituted of the AMP, the input of the AMP may be in an inverting format. The vibration detecting circuit according to the embodiment may be constituted of a micro signal processing circuit for processing a micro signal in which the first-step amplifying portion has an inverting input terminal to which the micro signal is transmitted and a non-inverting input terminal to which the reference voltage is applied.

The vibration detecting circuit according to the embodiment of the invention can be applied to a DC servo circuit for processing a micro signal in an audio apparatus, a camera photometry circuit, a circuit for processing a micro signal outputted from a light receiving element (PSD) for use in a camera auto-focus mechanism and the like. The values of the resistors R501, R502, R510 and R520 are not limited to the values described in the embodiments. Further, the invention is not limited to the vibration detectors 113 and 114 which decompose the vibration into two x and y-axis components and detect the vibration along each axis. The invention can be applied to a vibration detector which decomposes the vibration into three or more axis components to detect the vibration. Also in this case, one operational amplifier 501 is provided per axis, corresponding to the vibration detector.

What is claimed is:

1. A vibration detecting device comprising:
   a vibration detector which detects a vibration and outputs a vibration detecting signal;
   an output signal generator which generates an output signal;
   a calculator which performs a predetermined operation based on three signal inputs to said calculator, including said vibration detecting signal, said output signal and a predetermined reference voltage to generate an operation output signal;
   an operation signal generator which generates an operation signal for controlling said output signal generator; and
   a controller which controls said output signal generator based on said operation output signal, wherein
      said output signal generator is provided with an output signal level variable portion which can vary a level of said output signal based on said operation signal,
      said controller determines whether said operation output signal exceeds a predetermined range and, when said operation output signal exceeds the predetermined range, controls said operation signal generator to generate said operation signal to adjust in such a manner that said operation output signal is in said predetermined range, and
      said controller is provided with a compensating portion to compensate for the operation output signal before and after being adjusted.

2. A vibration detecting device comprising:
   a vibration detector which detects a vibration and outputs a vibration detecting signal;
   an output signal generator which generates an output signal;
   a calculator which performs a predetermined operation based on three signal inputs to said calculator, including said vibration detecting signal, said output signal and a predetermined reference voltage to generate an operation output signal;
   an operation signal generator which generates an operation signal for controlling said output signal generator, and
   a controller which controls said operation signal generator based on said operation output signal,
   wherein
   said output signal generator is provided with an output signal level variable portion which can vary a level of said output signal based on said operation signal,
   said controller determines whether or not said operation output signal exceeds a predetermined range,
   said operation signal generator generates said operation signal when said operation output signal exceeds said predetermined range,
   said output signal level variable portion varies the level of said output signal by a predetermined level based on said operation signal,
   said controller adjusts said operation output signal in said predetermined range, and
   said controller is provided with a compensating portion which compensates the operation output signal based on said operation output signal before being adjusted and said predetermined level.

3. A vibration detecting device according to claim 2, wherein
said controller is provided with a compensating portion for compensating the operation output signal based on said operation output signals before and after being adjusted.

4. A vibration detecting device according to claim 1, wherein
said operation signal generator generates said operation signal at predetermined timing, and
said controller adjusts said operation output signal to a predetermined reference level or its vicinity.

5. A vibration detecting device according to claim 4, further comprising:
a power supply portion for supplying a power at least to said vibration detector, wherein
said predetermined timing is a timing corresponding to a time when said power supply portion starts supplying the power to said vibration detector.

6. A vibration detecting device comprising:
a vibration detector which detects a vibration and emitting a vibration detecting signal;
an output signal generator which generates at least first and second output signals;
a calculator which performs a predetermined operation based on three signal inputs to said calculator, including said first output signal and said second output signal and said vibration detecting signal to generate an operation output signal;
a controller which controls said output signal generator based on said operation output signal; and
an operation signal generator which generates an operation signal for controlling said output signal generator,
wherein said output signal generator is provided with an output signal level variable portion which can vary a level of said first output signal and/or said second output signal based on said operation signal.

7. A vibration detecting device according to claim 6, wherein
said output signal generator comprises at least first and second output signal generators,
said operation signal generator generates first and second operation signals for controlling said first and second output signal generators, and
said output signal level variable portion comprises a first output signal level variable portion which can vary a level of said first output signal based on said first operation signal and a second output signal level variable portion which can vary a level of said second output signal based on said second operation signal.

8. A vibration detecting device according to claim 6, wherein
said controller determines whether or not said operation output signal exceeds a predetermined range, and when said operation output signal exceeds said predetermined range, makes said operation signal generator generate said operation signal so as to vary a level of said first output signal and/or said second output signal to adjust said operation output signal in said predetermined range.

9. A vibration detecting device according to claim 6, wherein
said controller is provided with a compensating portion which compensates said operation output signal based on said operation output signals before and after being adjusted.

10. A vibration detecting device according to claim 6, wherein
said controller determines whether or not said operation output signal exceeds a predetermined range,
said operation signal generator generates said operation signal when said operation output signal exceeds said predetermined range,
said output signal level variable portion varies the level of said first output signal and/or said second output signal based on said operation signal by a predetermined level, and
said controller adjusts said operation output signal in said predetermined range.

11. A vibration detecting device according to claim 10, wherein
said controller is provided with a compensating portion which compensates said operation output signal based on said operation output signal before or after being adjusted and said predetermined level.

12. A vibration detecting device according to claim 10, wherein
said controller is provided with a compensating portion which compensates the operation output signal based on said operation output signal before and after being adjusted.

13. A vibration detecting device according to claim 6, wherein
said operation signal generator generates said operation signal at predetermined timing, and
said controller adjusts said operation output signal to a predetermined reference level or its vicinity.

14. A vibration detecting device according to claim 13 further comprising:
a power supply portion for supplying a power at least to said vibration detector, wherein
said predetermined timing is a timing corresponding to a time when said power supply portion starts supplying the power to said vibration detector.

15. A vibration detecting device according to claim 13, wherein
said controller coarsely adjusts said operation output signal to said predetermined reference level or its vicinity based on said first output signal, and finely adjusts the operation output signal to said predetermined reference level or its vicinity based on said second output signal.

16. A vibration detecting device according to claim 1, further comprising:
a low pass filter for removing a high-frequency component from said vibration detecting signal, wherein
said calculator is provided with an amplifying portion for amplifying an output of said low pass filter and an output signal of said output signal generator.

17. A vibration detecting device according to claim 1, wherein
said operation signal generator generates a digital signal, and
said output signal generator is provided with a D/A converter which outputs an analog signal based on said digital signal.

18. A vibration detecting device comprising:
a vibration detector which detects a vibration and outputs a vibration detecting signal;
an output signal generator which generates an output signal;

a calculator which performs a predetermined operation based on three signal inputs to said calculator, including said vibration detecting signal, said output signal and a predetermined reference voltage to generate an operation output signal;

an operation signal generator which generates an operation signal for controlling said output signal generator, and a controller which controls said operation signal generator based on said operation output signal, wherein said output signal generator is provided with an output signal level variable portion which can vary a level of said output signal based on said operation signal, and said calculator is provided with an adder to add the output signal of said output signal generator and said vibration detecting signal.

19. A vibration detecting device comprising:

a vibration detector which detects a vibration and outputs a vibration detecting signal;

an output signal generator which generates an output signal;

a calculator which performs a predetermined operation based on three signal inputs to said calculator, including said vibration detecting signal, said output signal and a predetermined reference voltage to generate an operation output signal;

an operation signal generator which generates an operation signal for controlling said output signal generator, and a controller which controls said operation signal generator based on said operation output signal, wherein said output signal generator is provided with an output signal level variable portion which can vary a level of said output signal based on said operation signal, and said calculator is provided with an adding amplifier which performs an addition of the output signal of said output signal generator and said vibration detecting signal and an amplification.

20. A vibration detecting device according to claim 18, further comprising:

a low pass filter for removing a high-frequency component from said vibration detecting signal, wherein said calculator is provided with an adding amplifier which performs an addition of an output signal of said low pass filter and the output signal of said output signal generator and an amplification.

21. A vibration detecting device according to claim 1, wherein said calculator is provided with a subtracter which subtracts the output signal of said output signal generator and said vibration detecting signal.

22. A vibration detecting device according to claim 1, wherein said calculator is provided with a subtracting amplifier which performs a subtraction of the output signal of said output signal generator and said vibration detecting signal and an amplification.

23. A vibration detecting device according to claim 1 further comprising:

a low pass filter for removing a high-frequency component from said vibration detecting signal, wherein said calculator is provided with a subtracting amplifier which performs a subtraction of an output signal of said low pass filter and the output signal of said output signal generator and an amplification.

24. A vibration reduction device comprising:

a vibration reduction optical system which compensates a vibration by driving at least a portion of a photographing optical system in a direction vertical to an optical axis;

a drive portion which drives said vibration reduction optical system;

a vibration detector which detects the vibration and outputting an output voltage corresponding to a vibration quantity;

a controller which controls said drive portion;

a DC voltage generator which generates a DC voltage; and a calculator which performs a predetermined operation based on the output voltage of said vibration detector and said DC voltage to output an output signal, wherein said controller is provided with an operation signal generator which generates an operation signal when said output signal is not in a predetermined range, said DC voltage generator generates the DC voltage based on said operation signal, and said calculator adjusts the output signal in the predetermined range based on the output signal of said vibration detector and said DC voltage.

25. A vibration reduction device according to claim 24, wherein said predetermined range does not exceed a dynamic range of the output signal of said calculator.

26. A vibration reduction device according to claim 24, wherein said vibration detector, said calculator and said controller are DC-coupled.

27. A vibration reduction device according to claim 24, wherein said DC voltage generator is provided with a DC voltage value variable portion which can vary a DC voltage value based on said operation signal.

28. A vibration reduction device according to claim 27, wherein said controller is provided with a pulse width modulating portion which generates an operation signal, and said DC voltage value variable portion is provided with a switching portion which is operated in accordance with said operation signal.

29. A vibration reduction device according to claim 24, wherein said controller is provided with a pulse width modulating portion for generating an operation signal, and said DC voltage generator comprises a switching portion which is operated based on said operation signal and switching an output voltage of a DC voltage source, and a low pass filter for smoothing a switched rectangular wave.

30. A vibration reduction device according to claim 27, wherein said operation signal generator generates said operation signal before said output signal exceeds said dynamic range, and said DC voltage value variable portion, said switching portion or said switch can vary the DC voltage value in accordance with a duty ratio between an ON-time and an OFF-time of said operation signal.

31. A micro signal processing circuit comprising:

an output signal generator which generates an output signal;

a calculator having an inverting input terminal to which a micro signal to be processed and the output signal of the output signal generator are inputted and a non-inverting input terminal to which a reference potential is applied, which performs a predetermined operation based on the micro signal and said output signal;

a low pass filter portion which removes a high-frequency component from the signal outputted from said calculator;

an amplifying portion to which a signal outputted from said low pass filter portion is inputted; and an operation signal generator which generates an operation signal when the signal outputted from said amplifying portion is not in a predetermined range, wherein a level of said output signal is varied based on said operation signal, and the signal outputted from said amplifying portion is varied by a level determined in accordance with said varied level of said output signal so as to be adjusted into a predetermined range.

32. A micro signal processing circuit according to claim 31, wherein said calculator, said low pass filter portion and said amplifying portion are constituted by a single common operational amplifier.

33. A vibration detecting circuit comprising:

a vibration detector which detects a vibration and outputs a vibration detecting signal;

an output signal generator which generates an output signal;

a calculator having an inverting input terminal to which said vibration detecting signal is inputted and a non-inverting input terminal to which a reference potential is applied, which performs a predetermined operation based on the vibration detecting signal and said output signal of the output signal generator;

a low pass filter portion which removes a high-frequency component from a signal outputted from said calculator;

an amplifying portion to which a signal outputted from said low pass filter portion is inputted; and an operation signal generator which generates an operation signal when a signal outputted from said amplifying portion is not in a predetermined range, wherein based on said vibration detecting signal and the output signal of said output signal generator, the signal outputted from said amplifying portion is adjusted in the predetermined range.

34. A vibration detecting circuit according to claim 33, wherein said calculator, said low pass filter portion and the amplifying portion are constituted by a single common operational amplifier.

35. A vibration detecting circuit according to claim 34, wherein when the vibration is decomposed to n axial components, n units of said vibration detectors are provided for detecting the vibration along respective axial directions, and corresponding to said vibration detector, said operational amplifier is provided for each axis.

36. A vibration detecting device comprising:

a vibration detector which detects a vibration and outputs a vibration detecting signal;

an output signal generator which generates an output signal;

a calculator which performs a predetermined operation based on signal inputs to said calculator, including said vibration detecting signal and said output signal to generate an operation output signal;

an operation signal generator which generates an operation signal for controlling said output signal generator; and a controller which controls said output signal generator based on said operation output signal, wherein said output signal generator is provided with an output signal level variable portion which can vary a level of said output signal based on said operation signal, said controller determines whether or not said operation output signal exceeds a predetermined range and, when said operation output signal exceeds the predetermined range, makes said operation signal generator generate said operation signal to adjust in such a manner that said operation output signal is in said predetermined range, and said controller is provided with a compensating portion to compensate the operation output signal based on a difference between said operation output signals before and after being adjusted.

\* \* \* \* \*

UNITED STATES PATENT AND TRADEMARK OFFICE
CERTIFICATE OF CORRECTION

PATENT NO. : 6,801,247 B1  
APPLICATION NO. : 08/989762  
DATED : October 5, 2004  
INVENTOR(S) : Sueyuki Ohishi et al.

Page 1 of 1

It is certified that error appears in the above-identified patent and that said Letters Patent is hereby corrected as shown below:

Column 50, Line 17, delete "output" and insert -- operation -- therefor.
Column 51, Line 4, delete "for compensating" and insert -- which compensates -- therefor.
Column 51, Line 5, delete "signals" and insert -- signal -- therefor.
Column 51, Lines 30-31, delete "a controller which controls said output signal generator based on said operation output signal; and".
Column 51, Line 33, after "generator" delete "," and insert -- ; and -- therefor.
Column 51, Line 34, before "wherein" insert -- a controller which controls said output signal generator based on said operation output signal -- , --.
Column 52, Line 43, delete "based on" and insert -- by -- therefor.
Column 52, Line 45, delete "based on" and insert -- by -- therefor.
Column 56, Line 31, delete "output" and insert -- operation -- therefor.

Signed and Sealed this

Twenty-first Day of November, 2006

JON W. DUDAS  
*Director of the United States Patent and Trademark Office*